United States Patent [19]

Wason

[11] Patent Number: 4,968,728

[45] Date of Patent: Nov. 6, 1990

[54] SYNTHETIC ALKALI METAL ALUMINO-SILICATES, METHODS AND USES, COMPOSITIONS AND THEIR METHODS OF PREPARATION

[75] Inventor: Satish K. Wason, Macon, Ga.

[73] Assignee: J.M. Huber Corporation, Rumson, N.J.

[21] Appl. No.: 298,719

[22] Filed: Jan. 19, 1989

Related U.S. Application Data

[60] Division of Ser. No. 116,805, Nov. 3, 1987, Pat. No. 4,821,299, Continuation-in-part of Ser. No. 875,120, Jun. 17, 1986, abandoned.

[51] Int. Cl.[5] .......................... C08L 7/26; C08L 9/00; C08L 19/00
[52] U.S. Cl. .................................. 523/216; 524/446; 524/447; 524/450; 524/571
[58] Field of Search .................. 524/446, 447, 450; 523/216

[56] References Cited

U.S. PATENT DOCUMENTS

| | | | |
|---|---|---|---|
| 2,699,432 | 1/1955 | Marra | 524/447 |
| 4,400,485 | 8/1983 | Mukamal | 524/447 |
| 4,612,342 | 9/1986 | Kostinko | 524/450 |
| 4,812,299 | 3/1989 | Wason | 423/328 |
| 4,879,323 | 11/1989 | Wason | 524/450 |
| 4,888,120 | 12/1989 | Mueller | 524/446 |

FOREIGN PATENT DOCUMENTS 59-126442 7/1984 Japan .................................. 524/450

Primary Examiner—C. Warren Ivy
Attorney, Agent, or Firm—Harold H. Flanders; Alec H. Horn; Robert L. Price

[57] ABSTRACT

A family of novel and unique synthetic alkali metal alumino-silicates (SAMS) are produced by the hydrothermal reaction between kaolin clay and alkali metal silicates. The integrated composition of the SAMS products is a unique entity having an overall composition of $$xM_2O:Al_2O_3:ySiO_2:zH_2O$$

where x is the number of moles of alkali metal oxide and is an integer from 0.01 to 2.0, M is an alkali metal, y is the number of moles of $SiO_2$ in the unique SAMS composition, and z is the number of moles of bound water and is an integer ranging from 1.0 to 5.0. The composition essentially comprises altered kaolin clay platelets with an integral rim or protuberance of essentially amorphous alkali metal silicate-kaolin reaction product. The unique SAMS compositions are structured materials in which the structure can be controlled, and are therefore useful as functional fillers, as $TiO_2$ extenders, as silica extenders or as reinforcing agents for paper, paint, rubber, plastics and specialty products.

12 Claims, 43 Drawing Sheets

ZEOLITE X

SAMS (EX. TWO)

FIGURE 15: ZEOLEX 23  156,000 X

FIGURE 16: HI-SIL 233    156,000 X

FIGURE 17: HYCAL 73,000 X

FIGURE 18: SAMS FROM EXAMPLE ONE 73,000 X .1μ

FIGURE 19: SAMS FROM EXAMPLE ONE 73,000 X

FIGURE 20: SAMS FROM EXAMPLE TWO 73,000 X

FIGURE 21: SAMS FROM EXAMPLE TWO 73,000 X

FIGURE 22: SAMS FROM EXAMPLE FIVE 156,000 X

FIGURE 23: SAMS FROM EXAMPLE FIVE    156,000 X

FIGURE 24: OMNIFIL 73,000 X

FIGURE 25: HYDRAGLOSS 90    73,000 X

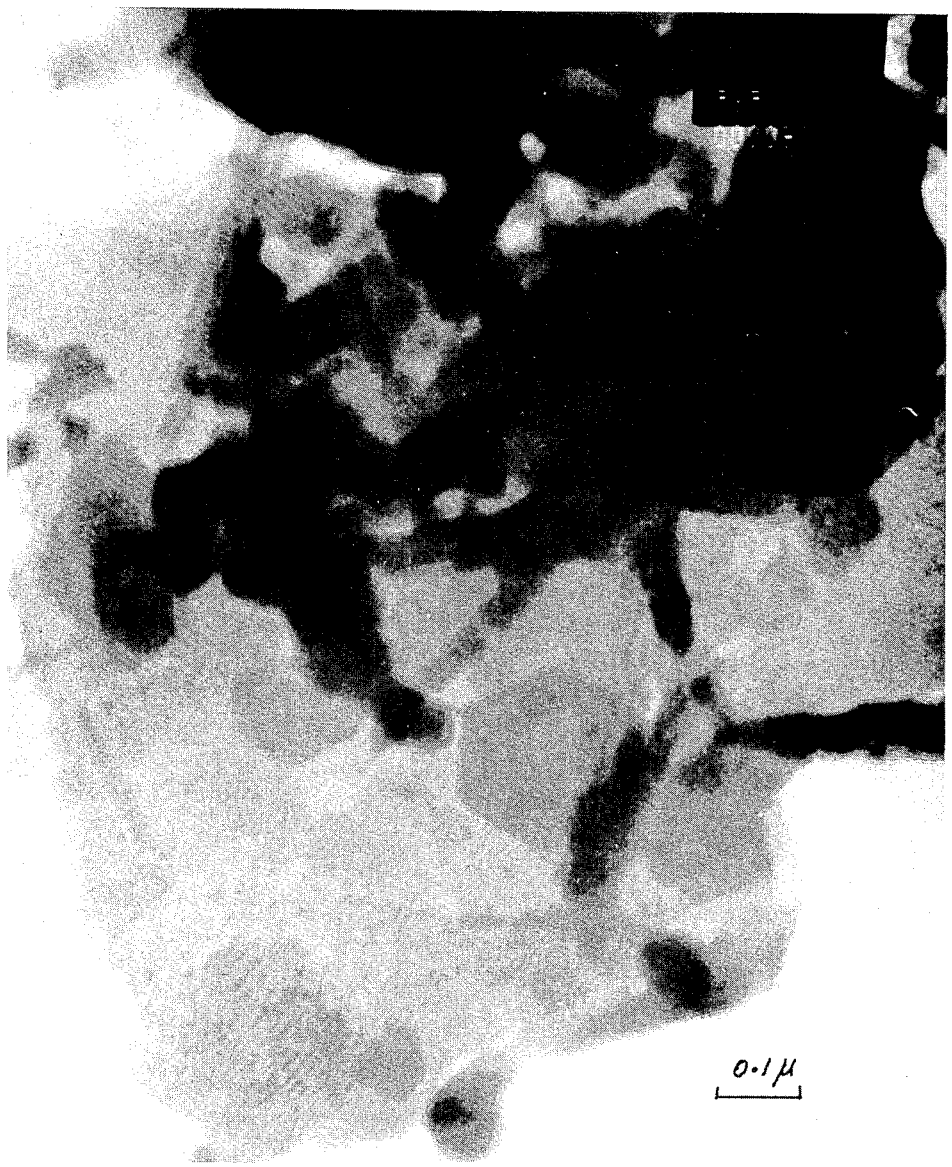
FIG. 43 Lithium SAMS of 0.75 B/C (Example Twelve) x159,000

SYNTHETIC ALKALI METAL ALUMINO-SILICATES, METHODS AND USES, COMPOSITIONS AND THEIR METHODS OF PREPARATION

CROSS REFERENCE TO RELATED APPLICATIONS

This is a division of application Ser. No. 07/116,805, now U.S. Pat. No. 4,812,299, filed Nov. 3, 1987, which is a continuation-in-part of Ser. No. 06/875,120, filed Jun. 17, 1986, now abandoned.

FIELD OF THE INVENTION

This invention relates to novel and unique synthetic alkali metal alumino-silicate (SAMS) compositions and, more particularly, to synthetic alkali metal alumino-silicates produced by the hydrothermal reaction of kaolin clays and alkali metal silicates. The preferred method entails the hydrothermal treatment of an aqueous dispersion of a clay pigment with an alkali metal silicate at molar ratios of alkali metal silicate base (B) to clay (C) of less than 1.0, but SAMS compositions and mixtures of SAMS and zeolites can be formed at B/C ratios greater than 1.0. The SAMS compositions have specific advantages as reinforcing extenders or functional pigments for paper, paints, rubber and polymer systems among its many uses. The SAMS compositions are particularly useful in paper filling compositions and in paper coating compositions.

BACKGROUND OF THE INVENTION

Alkali metal silicate materials, such as sodium aluminosilicates, are well known. Broadly speaking, there are two kinds of alkali metal alumino silicate materials known in the prior art—the natural and the synthetic alkali metal alumino-silicates.

The alkali metal alumino-silicates known as natural zeolites are mined products which are crystalline in nature. Synthetic alkali metal alumino-silicate products are either amorphous or crystalline reaction products. The crystalline synthetic alkali metal alumino-silicates are also called synthetic zeolites. Various types of amorphous synthetic alkali metal alumino-silicates are known as well as synthetic silicas and alumino-silicates.

In order to fully appreciate the present invention it is necessary to draw the appropriate distinctions between the unique compositions of the present invention and the prior art compositions of specific silicas and synthetic silicates referred to in general above.

Zeolites

The prior art description of the nature of zeolites can be found in the U.S. Pat. No. 3,702,886 and is incorporated herein by reference.

Both natural and synthetic zeolites can be broadly classified as crystalline alkali/alkaline earth metal alumino-silicates having unique properties. Synthetic zeolites are ordered, porous crystalline alumino-silicates having a definite crystalline structure within which there are a large number of mall cavities which are interconnected by a number of still smaller channels. The cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline alumino silicates, both natural and synthetic. These alumino silicates can be described as a rigid three dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra-containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation can be exchanged either in entirety or partially by another type of cation utilizing ion exchange techniques in a conventional manner. By means of such cation exchange, it has been possible to vary the size of the pores in the given alumino-silicate by suitable selection of the particular cation. The spaces between the tetrahedra are occupied by molecules of water prior to dehydration.

Prior art techniques have resulted in the formation of a great variety of synthetic crystalline alumino-silicates. These alumino-silicates have come to be designated by letter or other convenient symbol, as illustrated by zeolite A (U.S. Pat. No. 2,882,243); zeolite X (U.S. Pat. No. 2,882,244); zeolite Y (U.S. Pat. No. 3,130,007); zeolite K-G (U.S. Pat. No. 3,051,655); zeolite ZK-5 (U.S. Pat. No. 3,247,195); zeolite Beta (U.S. Pat. No. 3,308,069); and zeolite ZK-4 (U.S. Pat. No. 3,314,752), merely to name a few.

Zeolite Identification

Zeolites A and X may be distinguished from other zeolites and silicates on the basis of their x-ray powder diffraction patterns and certain physical characteristics. The composition and density are among the characteristics which have been found to be important in identifying these zeolites.

The basic formula for all crystalline sodium zeolites may be represented as follows:

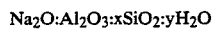

$$Na_2O:Al_2O_3:xSiO_2:yH_2O$$

In general, a particular crystalline zeolite will have values for x and y that fall in a definite range. The value x for a particular zeolite will vary somewhat since the aluminum atoms and the silicon atoms occupy essentially equivalent positions in the lattice. Minor variations in the relative numbers of these atoms does not significantly alter the crystal structure or physical properties of the zeolite. For zeolite A, an average value for x is about 1.85 with the x value falling within the range 1.85 ±0.5. For zeolite X, the x value falls within the range 2.5±0.5.

The value of y is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for y determined for zeolite A is 5.1. For zeolite X it is 6.2.

In zeolites synthesized according to the preferred prior art procedure, the ratio of sodiumoxide to alumina should equal one. But if all the excess sodium present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio of zeolite A lies in the range of $$\frac{\text{Sodium oxide}}{\text{Alumina}} = 1.0 \pm 0.2$$

The ratio of zeolite X lies in the range of $$\frac{\text{Sodium oxide}}{\text{Alumina}} = 0.9 \pm 0.2$$

Thus the formula for zeolite A may be written as follows:

1.0±0.2Na$_2$O:Al$_2$O$_3$:1.85±0.5SiO$_2$:yH$_2$O

Thus the formula for zeolite X may be written as follows:

0.9±0.2Na$_2$O:Al$_2$O$_3$:2.5±0.5SiO$_2$:yH$_2$O y may be any value up to 6 for zeolite A and any value up to 8 for zeolite X.

The pores of zeolites normally contain water. The above formulas represent the chemical analysis of zeolites A and X. When other materials as well as water are in the pores, chemical analysis will show a lower value of y and the presence of other adsorbates. The presence in the crystal lattice of materials volatile at temperatures below about 600 degrees Celsius does not significantly alter the usefulness of the zeolite as an adsorbent since the pores are usually freed of such materials during activation.

Prior Art Patents

Synthetic alkali metal silicates, such as sodium alumino-silicates, are generally produced by the reaction of alum with alkali metal silicates. The resulting product usually has a silica to alumina molar ratio of about 11. Amorphous products of this type are known. For example, amorphous products of this type are sold by the J. M. Huber Corporation under the trademark ZEOLEX ®. Specific examples of these products, as well as methods of their preparation are disclosed in U.S. Pat. Nos. 2,739,073; 2,8483,46 and 3,582,379.

None of these patents teach or even suggest the synthesis of the unique compositions of the present invention by the hydrothermal reaction between alkali metal silicate bases and clay at preferred molar ratios of silicate base to clay of less than 1.0.

Synthetic silicas are also known which are produced by the reaction of sodium silicates and sulfuric acid at temperatures of about 80 degrees C. The products usually have fixed molar ratios. Various products of this type are known in U. S. patents of Satish K. Wason under U.S. Pat. Nos. 3,893,840; 4,067,746; 4,122,160 and 4,422,880. Products of this type are sold by J. M. Huber Corporation under the ZEO ®, ZEOSYL ®, ZEOFREE ® and ZEODENT ® trademarks.

None of the above mentioned patents teach or even suggest the synthesis of the unique compositions of the present invention by the hydrothermal reaction between alkali metal silicate base (B) and clay (C) at preferred molar ratios of B/C or silicate base to clay of less than 1.0. A comparison of the Fourier Transform infrared (FT-IR) spectra of an amorphous synthetic silicate (ZEOLEX 23), an amorphous silica (Hi-Sil 233) and a synthetic alkali metal alumino-silicate (SAMS) of the instant invention is shown in FIG. 1.

Various zeolite products are also known which are produced synthetically by the reaction of sodium aluminate and sodium silicates at temperatures of less than 100 degrees C. This reaction, in general, proceeds to form an intermediate gel or amorphous material which then crystallizes. Zeolites of this type are sold commercially under the designations, zeolite A, zeolite X, zeolite Y, as well as others. These zeolites find use as absorbents, ion exchange agents, in catalysts and in other areas. A detailed discussion of this art is provided in U.S. Pat. Nos. 4,443,422 and 4,416,805 and is hereby incorporated herein by reference.

None of these patents teach or remotely suggest the synthesis of the unique compositions of the present invention by the hydrothermal reaction between alkali metal silicate base (B) and clay (C) at preferred molar ratios in the batch reaction of B/C or silicate base to clay, of less than 1.0. A comparison of the infrared spectra FT-IR) of zeolites A, X, and Y with a synthetic alkali metal alumino-silicate (SAMS) prepared by the method described in the instant invention is shown in FIG. 2.

The reaction of sodium silicate with kaolin clays has been studied under various hydrothermal conditions, as reported by Kurbus, et al, *Z. Anorg. Allg. Chem.*, 1977, Volume 429, pages 156–161. These reactions were studied under hydrothermal conditions using essentially equivalent molar ratios of the kaolin and sodium silicate with the reaction being carried out in an autoclave. The products of the reactions, as identified by x-ray, electron microscope, and infrared methods, showed that sodium silicate reacts with kaolin to form an aluminosilica gel or a crystallized zeolite mineral analcime of the formula:

Na$_2$O:Al$_2$O$_3$:4SiO$_2$:2H$_2$O.

In the reaction, the kaolin dissolves and alpha-quartz simultaneously appears in the product of reaction.

Kurbus reference specifically teaches the synthesis of a prior art crystalline zeolite mineral called analcime. This reference does not even remotely suggest the synthesis of the unique compositions of the present invention.

For simplicity, the unique compositions of the instant Invention are described as x-ray amorphous materlals having attenuated kaolin peaks. The materials will be described in greater detail under the summary of the invention. An FT-IR comparison of analcime with a SAMS composition of the present invention is also given in FIG. 2.

Various reactions of kaolin clays with basic reagents have been studied, including reactions with sodium hydroxide, calcium hydroxide, and the like.

U.S. Pat. Nos. 3,765,825 and 3,769,383 to Hurst, for example, studied the high temperature, high pressure reaction of slurries of clay with alkali metal hydroxides, such as sodium hydroxides. In this reaction, the kaolinite was decomposed and transformed into alumino-silica materials. None of these patents even remotely suggest about the synthesis of the unique composition of the present invention by the hydrothermal reaction between an alkali metal silicate and kaolin clay at preferred molar ratios of silicate to clay of less than 1.0.

Various synthetic amorphous sodium alumino-silicate materials have been produced, as described in U.S. Pat. No. 4,213,874, by the reaction of sodium silicate and sodium aluminate. This patent does not teach or even suggest the synthesis of the unique composition of the present invention by the hydrothermal reaction between an alkali metal silicate and kaolin clay.

In U.S. Pat. No. 3,264,130, a hydroxide of barium or calcium is reacted with a siliceous material. This patent does not teach about the hydrothermal reaction between an alkali metal silicate and kaolin clay.

An amorphous precipitated sodium alumino-silicate pigment is produced in U.S. Pat. No. 3,834,921 by the reaction of sodium silicate and aluminum sulfate. The example of U.S. Pat. No. 3,834,921 teaches about the synthesis of an alumino-silicate pigment of the silica to alumina ratio of about 11.5. The product is produced by reaction of aluminum sulfate and sodium silicate.

None of the above mentioned patents teach or remotely suggest about the synthesis of the unique compositions of the present invention by the hydrothermal reaction between alkali metal silicate base (B) and clay (C) at preferred molar ratios of silicate base to clay, or B/C, of less than 1.0.

In U.S. Pat. No. 4,075,280, zeolite A is produced by the reaction of a calcined clay with sodium hydroxide. This patent teaches about a new process for the preparation of well known prior art zeolite A of well defined x-ray pattern.

Rod-shaped microcrystalline particulates are produced in U.S. Pat. No. 3,837,877 by the reaction of the kaolin clay and an alkali metal hydroxide at molar ratios of hydroxide to clay of at least 2:1. This patent does not even remotely suggest about the synthesis of unique compositions of the instant invention from the hydrothermal reaction between an alkali metal silicate and kaolin clay.

In U.S. Pat. No. 3,784,392, a method is described for preparing finely divided alumino-silicate pigments from kaolin clays by the hydrothermal treatment of kaolin clay dispersions with an alkaline earth metal hydroxide, usually calcium hydroxide. The reaction is carried out using a molar ratio of the hydroxide to the kaolin pigment of at least 1:1 at temperatures of 50 to 200 degrees C under hydrothermal conditions. The product produced is an amorphous alumino-silicate pigment having increased brightness and having particular utility in coating paper. This patent does not even remotely suggest a reaction between an alkali metal silicate and kaolin to produce unique compositions of the present invention.

None of the prior art patents teach the synthesis of novel alkali metal alumino silicate compositions described herein. The products of the present invention are unique and their preparation under the disclosed reaction conditions is truly unexpected. For the sake of brevity, the synthetic alkali metal alumino-silicates of the instant invention are referred to as SAMS throughout the body of this patent.

A further background concept necessary to fully appreciate the present invention is that of "structure." As used herein, in relation to alkali metal alumino-silicates, the structure concept is as follows:

It is possible to synthesize alkali metal alumino silicate or SAMS products with varying structure levels in analogy to the structure definition set forth in U.S. Patent No. 3,893,840 to S. K. Wason of J. M. Huber Corporation. Since no universally accepted industrial method for particle size determination of Synthetic fillers exists and since it is common practice of filler suppliers to perform the rub-out oil absorption test, ASTM-D.281, on their products, the definition of structure is arbitrarily based on the oil absorption values rather than the filler particle size. Conforming to the same definition as in use for silica structure, e.g., S. K. Wason, "Cosmetic Properties and Structure of Fine Particle Synthetic Precipitated Silica," *J. Soc. Cosmet. Chem.* 29, 497–521 (August 1978), the synthetic alkali metal alumino-silicates or SAMS products are called VHS (very high structure) type when the oil absorption values are above 200 ml/100 g and VLS (very low structure) type when the oil absorption values are below 75 ml/100 g. The classification of the synthetic alkali metal alumino-silicate or SAMS compositions based on "structure" is shown in Table I as it relates to oil absorption.

TABLE I

DEFINITION:
SAMS STRUCTURE VERSUS OIL ABSORPTION

| Structure Level | Oil Absorption (ml/100 g) |
| --- | --- |
| VHS (Very High Structure) | Above 200 |
| HS (High Structure) | 175–200 |
| MS (Medium Structure) | 125–175 |
| LS (Low Structure) | 75–125 |
| VLS (Very Low Structure) | Less than 75 |

The present invention provides novel synthetic alkali metal alumino-silicate or SAMS compositions and methods for their preparation which are unique and unexpected in view of the knowledge of the prior art involving the reaction of clays and alkali metal silicates.

SUMMARY OF THE INVENTION

The present invention relates to a novel family of unique synthetic compositions hereinafter designated as synthetic alkali metal alumino-silicates or "SAMS" or simply SAMS. The products of the instant invention relate to a novel family of unique synthetic materials which are shown by transmission electron microscopy (TEM), Fourier Transform-Infrared spectroscopy (FT-IR), x-ray diffraction (XRD), and electron diffraction (ED) to be unique in composition and morphology and which characteristically contain as a minor portion partially altered kaolin particles which give the characteristic peaks for kaolin seen in the x-ray diffraction patterns of the SAMS compositions, but which also contain as the major portion a non-diffracting amorphous or microcrystalline reaction product primarily around the edges, but also to some extent over the face of the altered kaolin particle as illustrated by TEM FIGS. 18 through 23.

The TEM FIGS. 18 to 23 show the SAMS product to be altered kaolin platelets having an integrated rimmed area of amorphous, non-diffracting alkali metal silicate-kaolin reaction product. The integrated composition of the SAMS product is a unique entity having an overall composition of:

where x is the number of moles of alkali metal oxide and M is the alkali metal, y is the number of moles of $SiO_2$ in the SAMS composition, and z is the number of moles of bound water.

The unique products are further characterized by X-ray diffraction (XRD) as being essentially amorphous and having attenuated kaolin peaks as illustrated by FIGS. 33, 34, 35 and 36. The SAMS products are also characterized as having infrared spectra (IR) which differ from the IR spectra of the starting clays, zeolites, and both crystalline and amorphous silicas and silicates. FIG. 1 compares the infrared spectrum of a SAMS composition with the spectra of an amorphous synthetic silicate (Zeolex 23) and silica (Hi-Sil 233), and with calcined kaolin clay. FIG. 2, likewise compares the infrared spectrum of a SAMS composition with the spectra of zeolites A, X, Y, and analcime. In both FIGS. 1 and 2 the infrared spectrum of the SAMS composition is considerably different than the spectra of the other materials. In FIGS. 3 and 4, the infrared spectra of the SAMS compositions of Example One and Two are compared with their respective starting clays. In both cases, the spectra of the SAMS compositions are considerably different from the spectra of the starting clays, even though the area in the 800-400 wavenumber region is quite similar for both clay and SAMS. The major spectral different is the 1200-875 wavenumber region where the SAMS compositions exhibit a broader, less detailed Si—O stretching peak 1200-950 cm$^{-1}$).

For simplicity, the SAMS compositions will be described as being essentially multicomponent materials comprising altered kaolin clay platelets integrated with one or more adjacent areas of essentially amorphous alkali metal silicate-kaolin clay reaction product.

The preferred unique compositions of the present invention are prepared by the hydrothermal reaction of an alkali metal silicate and clay making sure that he B/C ratio of the batch compositions are less than 1.0, but by no means limited to values less than 1.0, where B represents the moles of alkali metal silicate and C represents the mol of kaolin clay in a batch composition While the preferred SAMS compositions are produced at B/C ratios of less than 1.0 unique SAMS products can also be produced at a B/C ratio substantially greater than 1.0 by adjusting the batch composition, pressure, temperature, and reaction time of the hydrothermal reaction This unique batch composition is heated in a stirred reactor using a steam pressure of 50 psi to 360 psi and preferably between 90 to 150 psi for a reaction time of 15 minutes to four hours and more preferably between 45 minutes to two hours. At the end of the desired reaction period, the reactor is cooled and the unique SAMS product is filtered, washed, dried and milled to the desired degree of fineness The alkali metal silicate referred to as base in the SAMS reaction has a $SiO_2$ to alkali metal oxide ratio of 1-6. When the alkali metal silicate is sodium silicate, the $SiO_2:Na_2O$ ratio is preferably 2.0-3.3, and a preferred sodium form of SAMS composition is produced which can be expressed in terms of mole ratio of the oxides as follows:

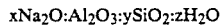
$xNa_2O:Al_2O_3:ySiO_2:zH_2O$ where x is an integer with a value from 0.01 to 2.0, y is an integer with a value greater than 2.0, and z is an integer from 0 to 10 and preferably 0 to 5.0. Correspondingly, when the alkali metal silicate is potassium silicate, the preferred $SiO_2:K_2O$ ratio is 2.8-3.9, and when the alkali metal silicate is lithium silicate, the preferred $SiO_2:Li_2O$ ratio is 4.8-5.6.

It is, accordingly, one object of the present invention to provide novel synthetic alkali metal alumino-silicate (SAMS) products or pigments which are useful as reinforcing agents, reinforcing extenders, functional fillers, and/or opacifiers for paper, paints, plastics, and other specialty products.

A further object of the invention is to provide a method for the production of novel synthetic alkali metal alumino-silicate products by the reaction of clays and alkali metal silicates under hydrothermal conditions using unique batch composition and controlled reaction time, temperature and pressure conditions.

It is a general object of the present invention to produce value added unique compositions from relatively inexpensive kaolin or related materials, which products are controlled structure synthetic alkali metal aluminosilicate products made from mined and refined kaolin.

Yet another object of the invention is to produce unique kaolin based compositions of higher brightness and significantly higher opacity than the starting kaolin products.

Another objective of the instant invention is to provide unique SAMS compositions of very low abrasion properties when compared which calcined clays, and to provide synthetic pigments of superior paper coating properties over calcined clays. Another object of the instant invention is to provide unique synthetic products which can extend expensive functional fillers, extenders, pigments and value added products such as calcined clays, fumed silicas and silica gels, synthetic silicates, synthetic calcium silicates and related compounds.

Yet another important and particular object of the invention is to provide unique SAMS compositions of high scattering coefficient and excellent opacifying properties for use in extending the expensive titanium dioxide compositions in such end-use applications as paper, paints, rubber and plastic concentrates.

A still further object of the invention is to provide articles of manufacture comprising paper, latex paints, plastics, paint flatting, rubber, dry liquid carrier, defoamers, antiblocking, and other products containing, as a reinforcing agent or functional filler or extender, a novel synthetic alkali metal alumino-silicate product produced by the hydrothermal reaction of clays and alkali metal silicates.

Other objects and advantages of the present invention will become apparent as the description thereof proceeds.

In satisfaction of the foregoing objects and advantages, there is provided by this invention synthetic alkali metal aluminosilicates (SAMS) which comprise altered kaolin clay platelets integrated with one or more adjacent areas of essentially amorphous alkali metal silicate base-kaolin clay reaction product, and which are of the general formula $xM_2O:Al_2O_3:ySiO_2:zH_2O$, wherein x is the number of moles of alkali metal oxide, M is the alkali metal, y is the number of moles of $SiO_2$, and z is the number of moles of bound water. These products may be characterized as substantially amorphous with attenuated kaolin peaks as characterized by the present state of the art x-ray diffraction, and yet may h=considered micro-crystalline at a future date as the learning curve in the characterization of SAMS type products increases. The present invention provides unique SAMS products which are shown by TEM to be amorphous compositions integrated with altered kaolin platelets. The SAMS products have oil absorption values ranging from 40 to above 200 ml/100g, surface areas ranging from 2 to 300 m²/g, high monovalent cation exchange capacities of the order of up to 200 milliequivalent/100g and very low abrasion characteristics.

Also provided by the present invention is a method for production of these synthetic alkali metal aluminosilicate products which comprises the hydrothermal reaction of a slurry of a clay with an alkali metal silicate wherein the preferred molar ratio of alkali metal silicate base (B) to clay (C) in the starting reaction mixture is less than 1.0, although unique SAMS compositions can be produced at ratios higher than 1.0 under preselected reaction conditions.

There is also provided by the present invention compositions comprising paper, paints, plastics, rubber, defoamer, and specialty products, which contain the novel synthetic alkali metal alumino-silicate materials of this invention.

BRIEF DESCRIPTION OF THE DRAWINGS

In order to facilitate the understanding of this invention, reference will now be made to the appended drawings. The drawings should not be construed as limiting the invention but are exemplary only.

FIG. 43 shows the TEM photograph of lithium SAMS composition derived from Lithsil 4 lithium silicate and Hydragloss 90 at a B/C ratio of 0.75 (Example Fourteen, Test No. 3).

DESCRIPTION OF PREFERRED EMBODIMENTS

Figure 1:
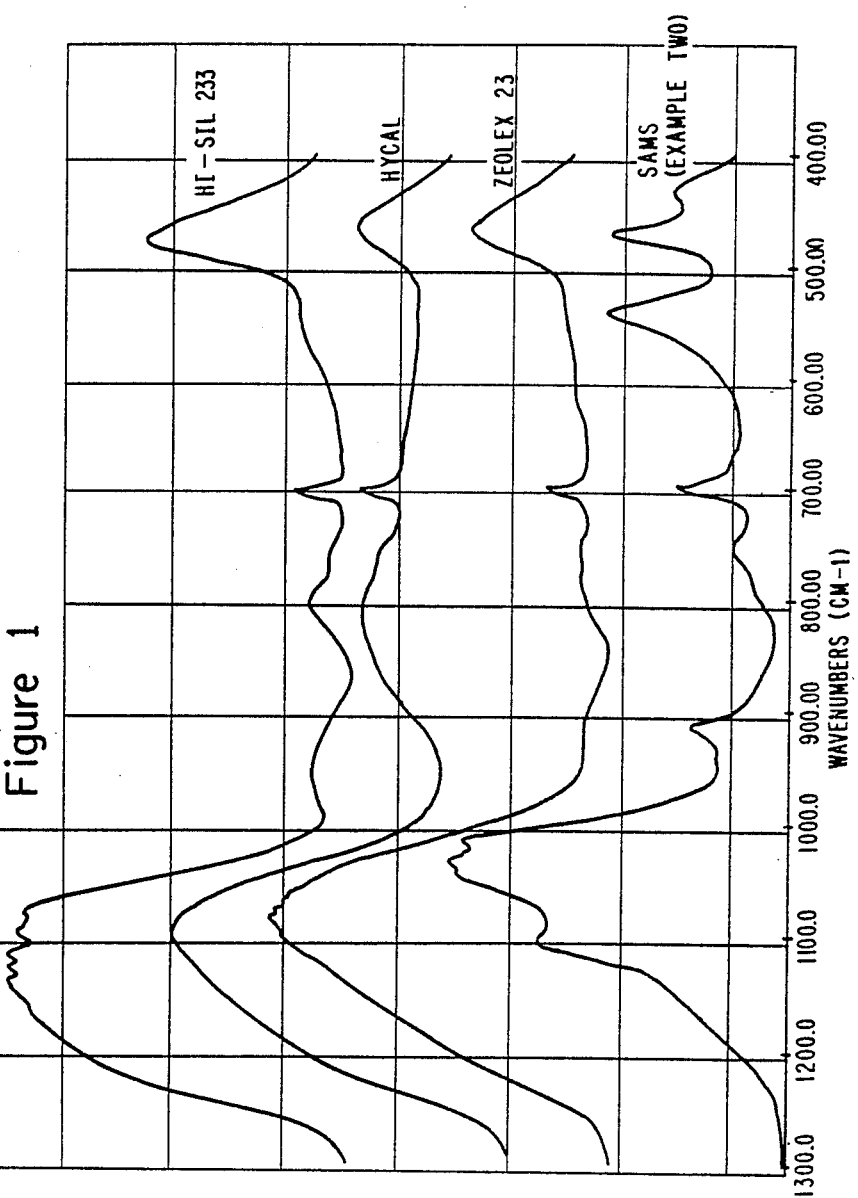
FIG. 1 Shows a comparison of the FT-IR scans of Zeolex 23, an amorphous sodium alumino-silicate, Hi-Sil 233, an amorphous synthetic silica, Hycal, a calcined kaolin, and the SAMS composition from Example Two FIG. 2 Shows a comparison of the FT-IR scans of zeolites A, X, Y and analcime with that of the SAMS composition from Example Two FIG. 3 Shows a comparison of the FT-IR scans of the SAMS composition from Example One with the starting Omnifil clay FIG. 4 Shows a comparison of the FT-IR scans of the SAMS composition from Example Two with the starting Hydragloss 90 clay FIG. 5 Shows the comparison of the FT-IR of scans of Hydragloss 90 and SAMS compositions prepared at B/C ratios of 0.5 (Example Two), 1.0 and 2.0 (Example Five, Tetts No. 1 and 2, respectively)

The synthetic alkali metal alumino-silicates (SAMS) of the present invention are unique products which are eminently useful as reinforcing agents or functional fillers for paper, paints, plastics, rubber and specialty materials. The products are particularly characterized as being rimmed alkali metal alumino-silicate compositions which have increased opacity and structure, and unique morphology when compared with the starting clay material. Further, the brightness of the resulting product is substantially higher than the starting clay and comparable or superior to various clay materials now used as reinforcing agents or functional fillers for paper, paints, plastics, and the like. It is truly unexpected that the opacity and brightness of the SAMS compositions would be significantly increased over the starting materials.

The alkali metal alumino-silicate products of the present invention also have unexpectedly high oil absorption characteristics, the oil absorption in milliliters of oil per 100 grams of the SAMS product ranging from about 40 to above 200 ml/100g. This is quite remarkable in that a hydrous clay of very low oil absorption of about 30 ml/100g has been transformed into a SAMS product of low to high structure (LS to HS) by the instant invention. For definition of structure, see Table I.

In this specification, the SAMS products are defined as structured agglomerates wherein the primary particles comprise altered kaolin clay platelets integrated with one or more adjacent areas of essentially amorphous alkali metal silicate base-kaolin clay reaction product, and wherein the primary particles of said SAMS products have attenuated kaolin clay peaks in x-ray diffraction patterns from kaolin remnants in the composition, and have the characteristic IR scan shown in FIGS. 3-6, and which are shown by TEM FIGS. 13-23 and 43.

The morphology and particle size of the structured agglomerates varies depending on the specific reaction conditions and components employed. For example, the agglomerated SAMS products formed by the reaction of alkali metal silicate and a fine particle size clay (like hydragloss 90) usually have a steroidal-like morphology, while those from a coarse particle size delaminated clay (like Hydraprint) have a platelet morphology. The products produced from sodium silicate and potassium silicate form rimmed materials having attenuated kaolin peaks, whereas the products produced from lithium silicate form materials having protuberances on the surface and having attenuated kaolin peaks. By the term "rimmed" is meant that the altered primary particles are comprised of a core material having an integral border or outer edge material of different constitution from the core. The lithium silicate products have protuberances rather than rims, the protuberances being integral with the core. The rim areas or protuberances appear to be not only x-ray amorphous but also electron diffraction amorphous, whereas the core appears to have attenuated kaolin peaks on x-ray diffraction. The primary particles are generally in the form of lamella (irregular to pseudo hexagonal shaped plates). The rim is an outer edge or border which usually substantially encompasses the plate perimeter The rims and protuberances generally have an annular width or diameter of 20Å to 1200Å, respectively, as measured from the outer surface of the particle to the beginning of hte core area. By the term "amorphous" is meant that the material does not have a characteristic x-ray diffraction pattern. By the term "attenuated kaolin peaks" is meant that on x-ray diffraction, the material exhibits peaks located in the characteristic position of kaolin, but which are depressed or weakened from the normal peaks found for kaolin in x-ray diffraction. In this specification, the term "functional pigment" means a non-color bearing material which enhances desired properties in other materials and in same cases, reduces costs of the resulting mixture.

In the specification the term "hydrothermal" means that the action is carried out under aqueous conditions of elevated temperatures and pressures of greater than atmospheric. The preferred temperatures range from 140-250° C. The preferred pressure conditions comprise pressures ranging from 50 to 360 psig. The reaction is conducted under conditions of agitation, the speed of agitation depending on the reaction.

The specific SAMS products of this invention may be prepared by the following reaction:

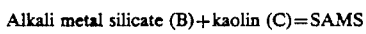

Alkali metal silicate (B)+kaolin (C)=SAMS

The B/C ratio, which is the molar ratio of alkali metal (B) to molar ratio of kaolin clay (C) in the batch composition, determines the variety of SAMS compositions which can be produced by the teachings of the instant invention as can be seen in TEM FIGS. 18 through 23. A B/C ratio of less than 1.0 is the pre[erred embodiment of the instant invention. Generally, at B/C ratios higher than 1.0, and especially higher than 5.0 using sodium silicate, zeolites are in some cases produced along with SAMS products, although SAMS of desired morphology and preferrably composition can also be produced without the presence of zeolitic species by using special reaction conditions.

The preferred raw materials for the preparation of unique SAMS compositions are alkali metal silicate and kaolin clay. Typically, the alkali metal silicate is of the composition:

M₂O:rSiO₂ where M is the alkali metal and r is the number of moles of SiO₂ bound to a mole of alkali metal oxide. When M is sodium, the alkali metal silicates are called sodium silicates and the value of r is the SiO₂/Na₂O mole ratio. Typically, the alkali metal silicates used in the SAMS reaction have an r value of 1.0–6.0; the sodium silicates, the preferred reactants, will have an r value of 1.0.4.0.

The kaolin clay used in the SAMS reaction may be represented by the formula Al₂O₃:2SiO₂:2H₂O. In calculation of the B/C ratio, the bound water portion (LOI=13.4%) of the kaolin clay is accounted for in the molecular weight used for kaolin. The molecular weight of pure kaolin is therefore 258. Other ingredients which may be present as impurities, such as TiO₂ and Fe₂O₃, are normally not included in the clay's MW, but are later accounted for in the % activity assigned to the starting clay material.

In this reaction, the alkali metal silicates which may be used are sodium silicate, potassium silicate and lithium silicate. In the reaction of kaolin clay with sodium silicate, there is produced a SAMS product whose primary particles have the characteristic core and rim combination in all cases. In this product, the rimmed area is highly concentrated in silica vs. the core as determined by STEM/EDAX (Scanning Transmission Electron Microscopy/Electron Dispersive Analysis). This type of analysis determines the relative distribution of given elements within a material (i.e., it provides elemental mapping). In addition, this analysis indicates that sodium is generally well distributed throughout the entire altered particle, both in the core and in the rim.

This kind of product is obtained in all ratios of base to clay, except that at high B/C ratios, the likelihood of zeolite formation increases. Therefore, in this invention, when the reaction includes that of kaolin clay with sodium silicate, it is preferred that the B to C ratio be no higher than 5.0, preferably range from 0.1 to 5.0, and more preferably) range from 0.25 to 0.9. Further, in B/C ratios of less than 1, the product has amorphous rims concentrated in silica and contains some residual kaolin. In B/C ratios of greater than 1, the reaction is prone to zeolite formation of the crystalline type, such as the P type and S type zeolite. Also, as the $SiO_2/Na_2O$ ratio decrease was in the sodium silicate, there is a tendency for increased zeolite formation in this reaction. Therefore, the preferred $SiO_2/Na_2O$ molar ratio in the sodium silicate is at least 2.0 and preferably is 2.5 to 3.3. The N brand and RU brand of commercially available sodium silicates (obtainable from PQ Corp.) are preferred.

In the formation of SAMS products by the reaction of kaolin clay and potassium silicate, the altered primary particles of the resulting SAMS product will exhibit rims in all cases, although the amorphous rims formed in the potassium silicate SAM3 product differs from the sodium silicate product in that the rims will be concentrated in both silica and potassium. The acceptable (/C ratios using potassium silicate and kaolin range from 0.10 to 5.0, and more preferably from 0.1 to 0.9, and no substantial zeolite formation will be noted even at molar ratios as high as 5.0. As indicated above, rim alteration occurs during these reactions and the rim material is concentrated in silica and potassium (versus the core material). The morphology of the potassium silicate agglomerates is usually similar to that of the sodium silicate product. However, as the ratio of $SiO_2/K_2O$ increases in the potassium silicate used to react with the kaolin clays, the reactions are prone to producing a product whose agglomerate structure closely resembles a coral-like material. At lower ratios, the material is more similar to that produced from sodium silicate. The preferred $SiO_2/K_2O$ ratios will range from 2.8 to 3.9 with the commercial potassium silicate products KASIL 1, 6 and 42 being preferred reactants.

The products produced from the lithium silicate and clay comprise a core material having protruberances or raised masses integral with the core. Electron diffraction analysis indicates that these protuberances are totally amorphous, while the remaining platelet areas show the typical diffraction pattern for kaolinite. Most importantly, it should be noted that the protuberances or raised masses did not form exclusively on the clays platelet edges, but appear in a more or less random fashion about the platelets. Several pseudohexagonal clay platelets are still clearly evident in the TEM photographs which indicates great heterogeneity of reaction. Elemental mapping of the Si and Al content within a lithium SAMS material, by STEM/EDAX analysis, has indicated that the alteration product (i.e., the protruberances) is much higher in silicon and deficient in aluminum relative to the unaltered kaolinite regions. Elemental mapping of lithium was not possible because its atomic weight is below the detection limit of the instrument.

The SAMS compositions are produced by the reaction of clays and alkali metal silicates under hydrothermal conditions. The clays which may be used include allkaolin-type clays, including crude, air-floated and water-washed clays, as well as mixtures of clays and equivalent materials. Pure clays, as well as impure clays, may be used. Some of the preferred clays are kaolin clays sold commercially under the trademarks OMNIFIL, HYDRASPERSE HYDRAPRINT and HYDRAGLOSS. Other mineral sources corresponding to the silica-alumina values present in clays and alkali metal silicates may be used. Sources of alumina such as alumina, sodium aluminate, aluminum hydroxide or other aluminum sources may be used without deviating from the spirit of the instant invention. Silica sources may include synthetic silica, reactive silica, sodium silicate or equivalent materials.

The alkali metal silicate can be any of the types of materials known to the art, but preferably sodium silicate, potassium silicate, lithium silicate, or mixtures thereof, or compositions which can react to give equivalent compounds should be used.

A critical feature of the invention is the molar ratio developed in the system between the amount of alkali metal silicate and the amount of clay used. It is necessary to control the molar ratio of alkali metal silicate to clay, otherwise a zeolitic crystal-line product or mixtures of amorphous and crystalline species will be produced. The products of the present invention are typically rimmed compositions as depicted in TEM FIGS. 18 through 23. It is preferred that the molar ratio of alkali metal silicate to clay be controlled to produce the desired SAMS product.

Further, the reaction of the present invention is carried out in an aqueous system using an aqueous slurry of the clay which is mixed with an aqueous solution of alkali metal silicate. The resulting clay and alkali metal silicate slurry preferably has a concentration of 1 to 20 weight percent, preferably 5 to 15 percent.

In a preferred operation of the process, the aqueous slurry of the starting clay material and the alkali metal silicate is formed, the system is closed and heat applied to gradually raise the temperature. In general, the pressure in the system will range from about 50 to 360 psig at temperatures ranging from about 140 to 250 degrees C. A specifically preferred range of conditions is to operate the process at pressures of 100 to 200 psig and temperatures of 164 to 194 degrees C. The temperatures are preferably correlated to the pressure such as that provided by steam. The reaction time is about 0 25 to 4 hours. After completion of the reaction, heat is removed and the mixture is allowed to cool, after which the system is opened, the product separated by filtration or centrifugation, washed with water, and dried. SpraY drying is preferred at inlet temperatures of 1000° F. (538° C.) and outlet temperature of 250° F. (121° C.).

The resulting product may be characterized as having oil absorption values ranging from about 40 to 220 ml/100 g. The surface area ranges from about 2 to 300 $m^2/g$. More preferably, the product will have an oil absorption value ranging from 80 to 160 ml/100 g and surface areas ranging from 10 to 30 $m^2/g$.

Particularly preferred SAMS products are those produced by reaction of delamination clays with alkali metal silicates. A suitable delaminated clay for reaction with the alkali metal silicate is that delaminated clay sold commercially as Hydraprint by J. M. Huber Corporation. Hydraprint is a coarse particle size delaminated clay produced by delamination of a cretaceous Middle Georgia Clay. The SAMS product formed by reaction of the alkali metal silicate and delaminated clay has a platelet morphology which makes the product, referred to herein as a plated material, superior for light weight coating applications in that it provides excellent sheet smoothness. These platey materials are also especially useful for incorporation into plastics, such as high density polyethylene, since they provide excellent impact strength to the polyethylene.

EXAMPLES

The following examples are presented to illustrate the invention, but it is not considered to be limited thereto In the examples and throughout the specification, parts are by weight unless otherwise indicated.

EXAMPLE ONE

SYNTHESIS OF SAMS FROM OMNIFIL CLAY

Water, 1,508 gallons (12,629 pounds), was added to a 2,500 gallon pressure reactor. To the water was added 101.3 gallons (1,458 pounds) of a 67.7% solids kaolin clay slurry which is sold commercially as Omnifil by the J. M. Huber Corporation. This is a water-refined kaolin clay produced from the East Georgia deposit having the properties shown in Table II. To the clay-water slurry was added 1472 gallons of a fresh water sodium silicate solution (1,700 pounds) of 34.9% solids having a $SiO_2/Na_2O$ molar ratio of 2.5. Under these conditions, the final product solids will be approximately 10% and the batch composition will have a base to clay molar ratio of approximately 0.75. The batch composition for the reaction can be expressed as $$Na_2O:1.33Al_2O_3:5.21SiO_2:278H_2O$$

and has an H/N (moles water/moles $Na_2O$) ratio of 278 a S/N (moles $SiO_2$/moles $Na_2O$) ratio of 5.2 and a S/A (moles $SiO_2$/moles $Al_2O_3$) ratio of 3.9.

The batch was heated to a reaction pressure of 120 psig and a temperature of 172 degrees C. The mixture was allowed to react for one hour under continuous agitation. At the end of the one-hour reaction time, the mixture was vented into a drop tank and the resulting mixture was then filtered, washed and spray dried.

The product of Example One was evaluated and characterized by various test methods The physical properties of the resulting synthetic alkali metal alumino- silicate composition, or SAMS, representing the present invention are listed in Table II. The properties of the starting Omnifil clay control are also listed in Table II for comparative purposes.

TABLE II

| SYNTHESIS OF SAMS FROM OMNIFIL CLAY | | |
|---|---|---|
| | SAMS from Omnifil Clay | Omnifil Clay Control: |
| Chemical Analysis, % | | |
| $TiO_2$ | 1.43 | 2.12 |
| $Fe_2O_3$ | 0.81 | 1.11 |
| $SiO_2$ | 52.82 | 44.33 |
| $Al_2O_3$ | 24.32 | 37.60 |
| $Na_2O$ | 7.35 | 0.03 |
| Physical Properties: | | |
| Loss on Ignition, % | 10.90 | 13.40 |
| Pore Volume, cc/g (Mercury Intrusion) | 3.10 | 1.10 |
| Surface Area, $m^2/g$ | 19.8 | 20.0 |
| pH (at 20% Solids) | 10.8 | 6.5 |
| Oil Absorption, ml/100 g | 136 | 37 |
| Valley Abrasion, (mg of wire loss) | 8.7 | 10.5 |
| Cation Exchange Capacity, | | |
| meq/100 g $NH^+$, $K^+$ | 186 | 2-3 |
| meq/100 g $Ca^{+2}$, $Mg^{+2}$ | 45 | 1-2 |
| Brightness, % | 86.1 | 82.0 |

TABLE II-continued

| SYNTHESIS OF SAMS FROM OMNIFIL CLAY | | |
|---|---|---|
| | SAMS from Omnifil Clay | Omnifil Clay Control: |
| Sedigraph Particle Size, %: | | |
| +10 microns | 0.5 | 1.8 |
| +5 microns | 3.0 | 4.0 |
| -2 microns | 58.5 | 89.0 |
| -1 micron | 34.0 | 82.9 |
| -0.5 micron | 15.0 | 68.1 |

EXAMPLE TWO

SYNTHESIS OF SAMS FROM HYDRAGLOSS 90 CLAY

A second reaction was conducted in which 1,500 gallons (12,562 pounds) of water was used with 110 gallons (1,613 pounds) of a 70.1% solids kaolin clay slurry sold commercially as Hydragloss 90 by J. M. Hube, Corporation having the properties shown in Table III. To the clay-water slurry was added 112.4 gallons of a fresh water sodium silicate solution (1,298 pounds) of 34.9% solids having a $SiO_2/Na_2O$ molar ratio of 2.5. Under these conditions, the final product solids will be approximately 10% and the batch composition will have a base to clay molar ratio of approximately 0.50 The batch composition for the reaction can be expressed as $$0.76Na_2O:1.52Al_2O_3:4.94SiO_2:278H_2O$$

and has an H/N of 366, an S/N of 6.5 and an S/A of 3.25.

The batch was heated to a reaction pressure of 120 psig and a temperature of 172 degrees C. The mixture was allowed to react for one hour under continuous agitation. At the end of the one-hour reaction time, the mixture was vented into a drop tank and the resulting mixture was then filtered, washed, and spray dried.

The product of Example Two was subjected to various tests. Set forth hereinafter in Table III are the physical properties of the resulting synthetic alkali metal alumino-silicate composition, or SAMS, representing the present invention and the kaolin clay control from which the SAMS composition was prepared.

TABLE III

| SYNTHESIS OF SAMS FROM HYDRAGLOSS 90 CLAY | | |
|---|---|---|
| | SAMS from Hydragloss 90 | Hydragloss 90 Clay Control |
| Chemical Analyses, %: | | |
| $TiO_2$ | 0.51 | 0.94 |
| $Fe_2O_3$ | 0.83 | 0.98 |
| $SiO_2$ | 54.57 | 44.79 |
| $Al_2O_3$ | 27.95 | 38.37 |
| $Na_2O$ | 6.75 | 0.03 |
| Physical Properties: | | |
| Loss on Ignition, % | 10.71 | 13.86 |
| Pore Volume, cc/g (Mercury Intrusion) | 3.56 | 0.86 |
| Surface Area, $m^2/g$ | 21.5 | 22.0 |
| pH (at 20% solids) | 11.2 | 6.8 |
| Oil Absorption: ml/100 gm | 156 | 43 |
| Valley Abrasion, (mgs of wire loss) | 6.8 | 7.5 |
| Cation Exchange Capacity: | | |
| meq/100 g - $NH^{+4}$, $K^+$ | 183 | 2-3 |
| meq/100 g - $Ca^{+2}$, $Mg^{+2}$ | 48 | 1-2 |
| Brightness, % | 92.6 | 91.0 |
| Sedigraph Particle Size, %: | | |
| +10 microns | 0.0 | 0.0 |

TABLE III-continued
SYNTHESIS OF SAMS FROM HYDRAGLOSS 90 CLAY

|  | SAMS from Hydragloss 90 | Hydragloss 90 Clay Control |
|---|---|---|
| +5 microns | 0.0 | 0.0 |
| −2 microns | 61.0 | 98.0 |
| −1 micron | 37.0 | 96.1 |
| −0.5 micron | 18.0 | 84.7 |

The following procedures were used for characterizing the data listed in Tables II and III.

Chemical analyses (% $TiO_2$, % $Fe_2O_3$, % $SiO_2$, % $Al_2O_3$) were determined by x-ray fluorescence. The sodium content ($Na_2O$) of the final product was determined by atomic absorption.

Ignition loss was determined by pre-drying the SAMS product to a constant weight at 110 degrees C., heating to 925 degrees C. for one hour and cooling. Calculations of ignition loss were made as follows:

$$\text{Ignition Loss} = \frac{\text{(Weight of ignited sample)}}{\text{(Weight of dried sample)}} \times 100$$

The pH was measured using a standard pH meter on a 20% solids (by weight) mixture of the product with water.

The specific surface area was determined by the nitrogen absorption method described by Brunauer, Emett, and Teller (BET) in the "Journal of the American Chemical Society," Volume 60, page 309, published in 1938. A single point surface area determination was made on the SAMS compositions using outgassing conditions of three hours at 300 degrees C.

The oil absorptions of the beginning and end products from Examples One and Two were determined by the oil rub-out method. This method is based on a principle of mixing linseed oil with the product by rubbing with a spatula on a smooth surface until a stiff putty-like paste is formed which does not break or separate. By measuring the quantity of oil required to give a paste mixture which will curl when spread out, one can calculate the oil absorption value of the product--a value which represents the volume of oil required per unit weight of product to saturate the product sorptive capacity. Calculation of oil absorption value was done as follows:

$$\text{Oil Absorption} = \frac{\text{(ml oil absorbed)}}{\text{(weight of product, g)}} \times 100$$
$$= \text{ml oil/100 g product}$$

Cation exchange capacity was determined by adding the products (0 25g-weighed to 0.1 mg) to tarred, screw-cap, 15-ml centrifuge tubes. The samples were centrifugally washed three times with 10-ml of a 0.5M solution of the saturating cation. The samples were subsequently washed five times with a 0.05 M solution of the saturating cation. Following the fifth washing and decantation of the supernatant solution, the tubes were capped and weighed. This weight, less the ° ample weight, represents the amount of excess 0.05M saturating solution. The occluded (soluble) and exchangeable cations were then displaced by washing three times with a 0.5M solution of a displacing cation, collecting the washings in 100 ml volumetric flasks. The amount of the saturating cation was determined by atomic absorption spectroscopy with the exception of ammonium ($NH^+_4$) which was determined by potentiometric titration. The net amount of exchangeable cations was calculated by subtracting the amount of soluble, occluded cations (wet weight times 0.05 M) from the total analyzed amount.

Brightness measurements were performed by the standard TAPPI (Technical Association of Pulp and Paper Industry) procedure T-534 pm-76, published in 1976.

Particle size was determined using a Sudigraph 5000 ET Particle Size Analyzer from Micromeritics Instrument Corporation, Norcross, Georgia. This instrument uses a sedimentation technique which measures the particle size distribution as a modification of Stokes Law. The procedure is described in "Instrument Manual-Sedigraph 5000 ET Particle Size Analyzer," published May 3, 1983.

The Fourier Transform-Infrared spectroscopy (FT-IR), transmission electron microscopy (TEM), scanning electron microscopy (SEM and x-ray diffraction (XRD) scans were determined using standard techniques.

From the above data, it will be seen that the process of the invention yields new products having novel combinations of physical and chemical properties.

As shown in Tables II and III, the synthetic alkali metal alumino-silicates of the present invention prepared from the commercial kaolin clays exhibit substantial improvements in cation exchange capacity, oil absorption and brightness. This is quite astonishing in that a hydrous clay product of relative worth has been converted into a synthetic product of greatly added value by the relatively simple procedure of the present invention. Of particular interest is the significant improvement in oil absorption which indicates that a higher structure product has been formed as a result of this invention.

Figure 3:
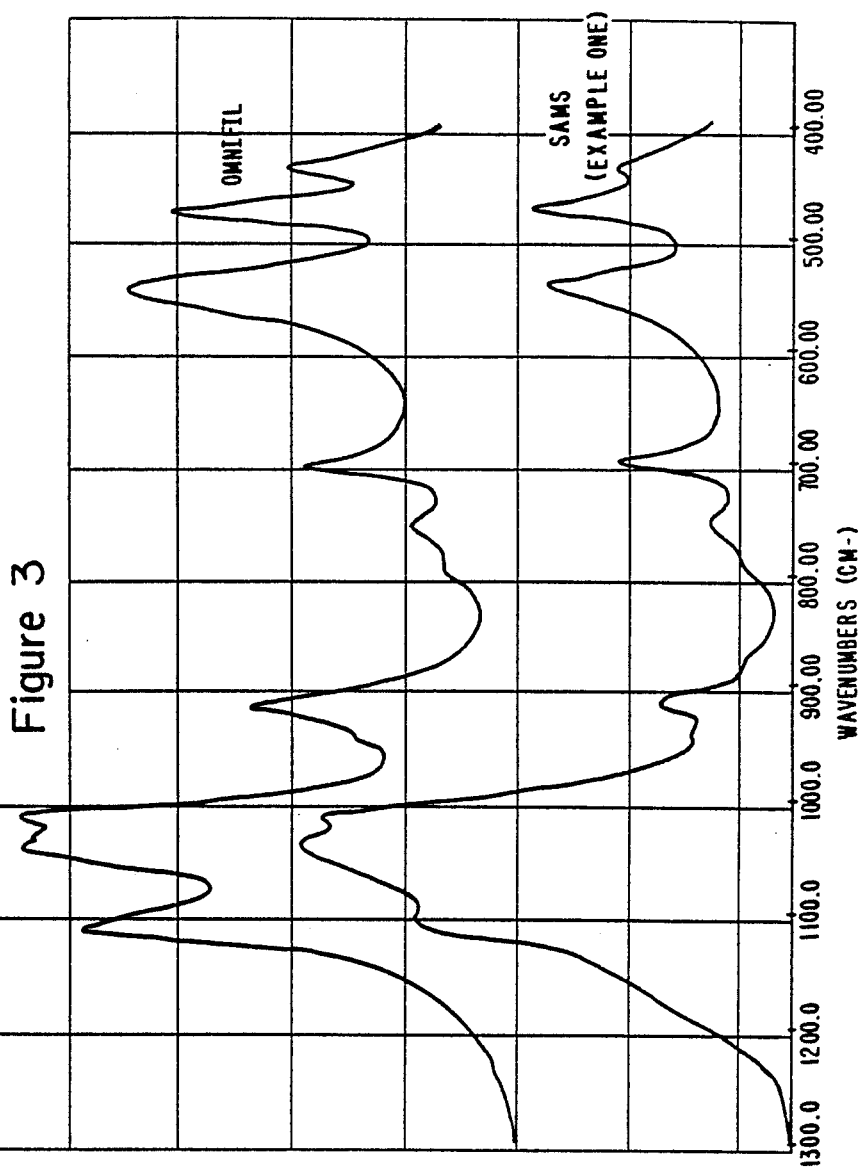
Figure 4:
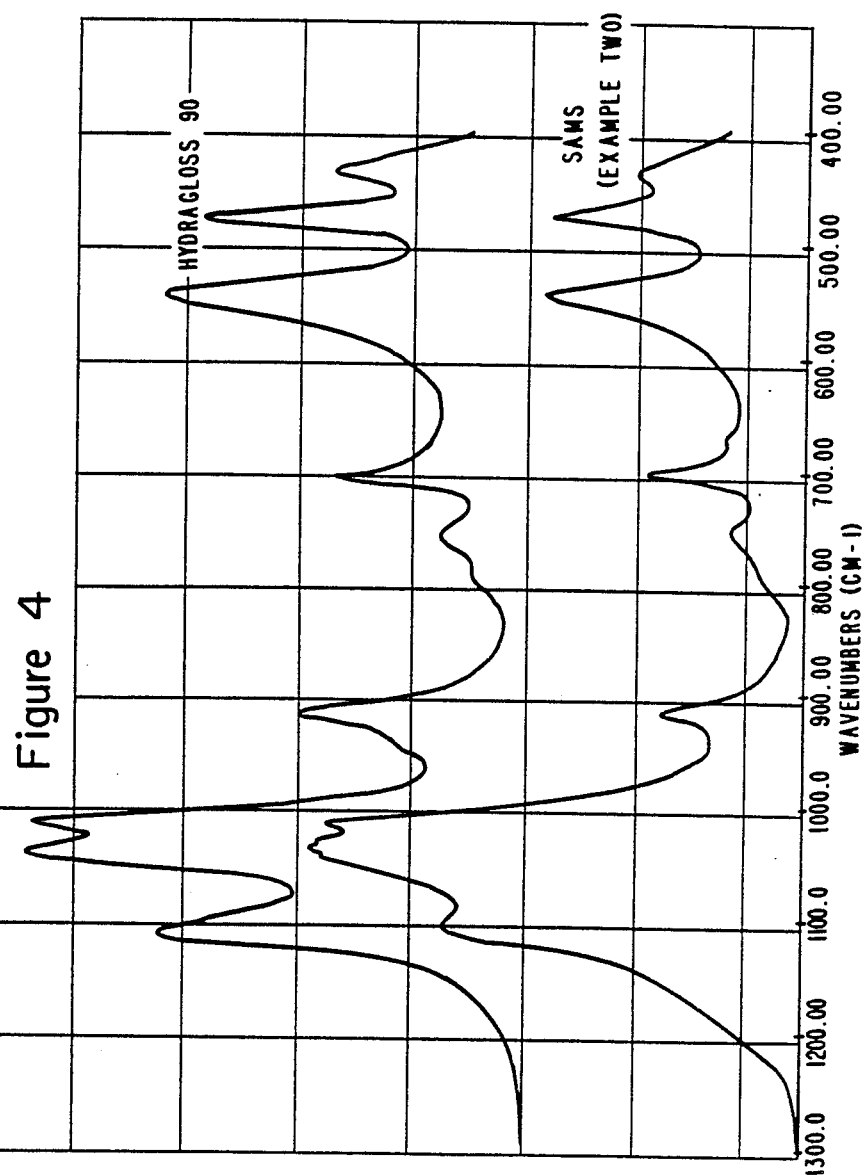

The infrared spectra of the SAMS compositions of Examples One and Two are compared with the infrared spectra of their respective base clays in FIGS. 3 and 4, respectively As anyone skilled in infrared spectroscopy can see, the IR spectra of SAMS compositions are considerably different from those of their respective base clays, especially in the 1200-875 wavenumber ($cm^{-1}$) absorption region. The Si—O stretching band between 1200 and 950 wavenumbers is much broader and less well defined for the SAMS than for the control clays, indicating that the compositions contain considerable amorphous material. In addition, the aluminum O-H vibration band between 950 and 875 wavenumbers are essentially identical for the SAMS compositions and their base clays, with the SAMS composition showing only a slight decrease in peak intensity.

In FIG. 1, the FT-IR scan of the SAMS composition of Example Two is compared with the FT-IR scans of an amorphous synthetic silicate (Zeolex 23), a calcined kaolin (Hycal) and an amorphous synthetic silica (Hi-Sil 233). The spectrum of the SAMS composition is similar to those of Zeolex 23, Hycal, and Hi-Sil in the 1200-950 wavenumber Si—O stretching region but is considerably different in the 950-400 wavenumber region. Only the SAMS composition has the aluminum O-H vibration band between 950 and 875 wavenumbers.

Figure 2:
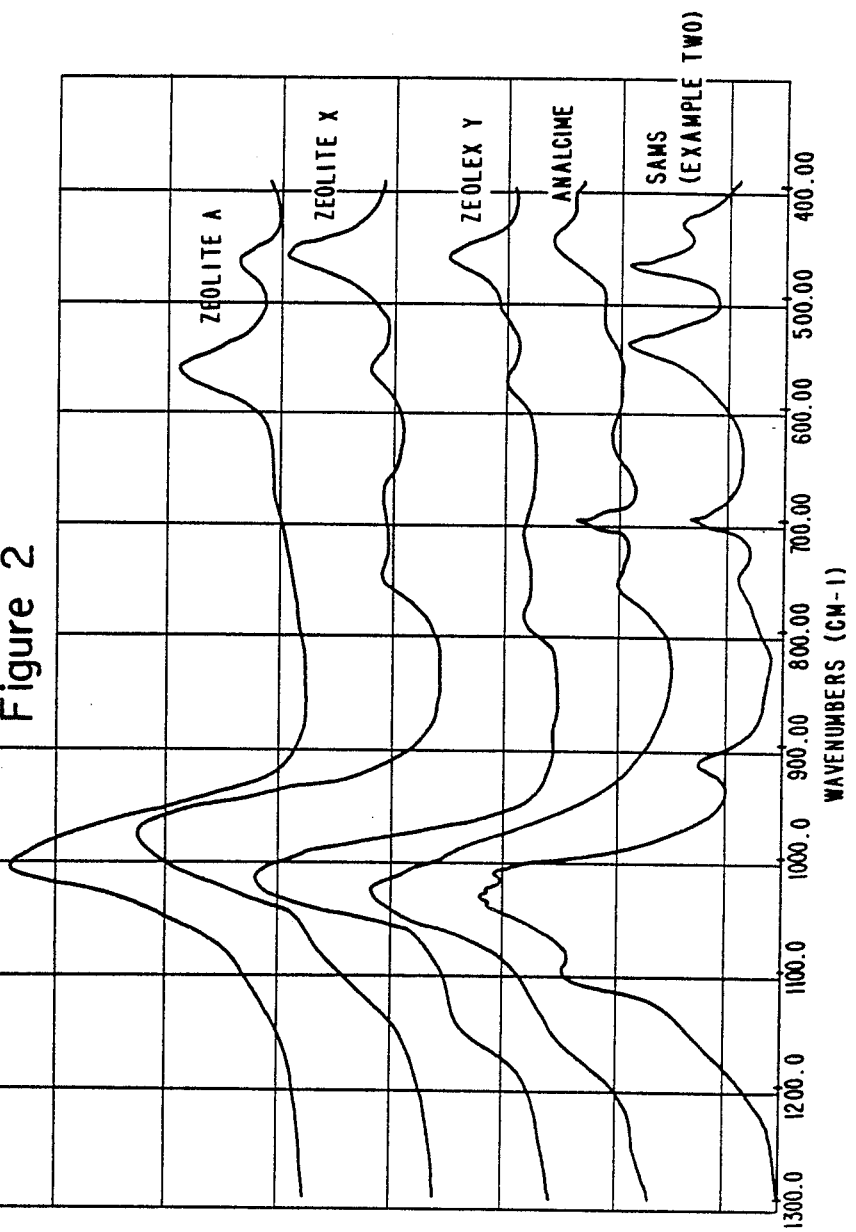

In FIG. 2 the FT-IR spectrum of the SAMS composition of Example Two is compared with the spectra of zeolites A, X, Y and analcime. The spectrum of the SAMS composition differs from the spectra of the crystalline zeolites across the entire IR spectrum. The Si—O band (1200-950 cm$^{-1}$) for the zeolites is v sharp, indicating good crystallinity, while that of the SAMS is broad. Again, only the SAMS spectrum shows the aluminum O-H vibration band.

Based on the infrared spectra, it must be concluded that the SAMS compositions of the instant invention are unique entities that differ significantly from the starting clays as well as from crystalline and amorphous zeolites, synthetic Silicates and synthetic silicas of prior art.

The unique characteristics of the synthetic alkali metal alumino-silicates (SAMS) of the instant invention can also be seen by comparing the SEM photographs of the SAMS compositions of Example One and Two (FIGS. 13 and 14, respectively) with those of prior art zeolites A, X, Y and analcime (FIGS. 9, 10, 11 and 12, respectively). The SEM photographs show the prior art zeolites to be large, well crystallized materials, while the SAMS compositions appear to be structured agglomerates composed of small flat platelets.

Figure 24:
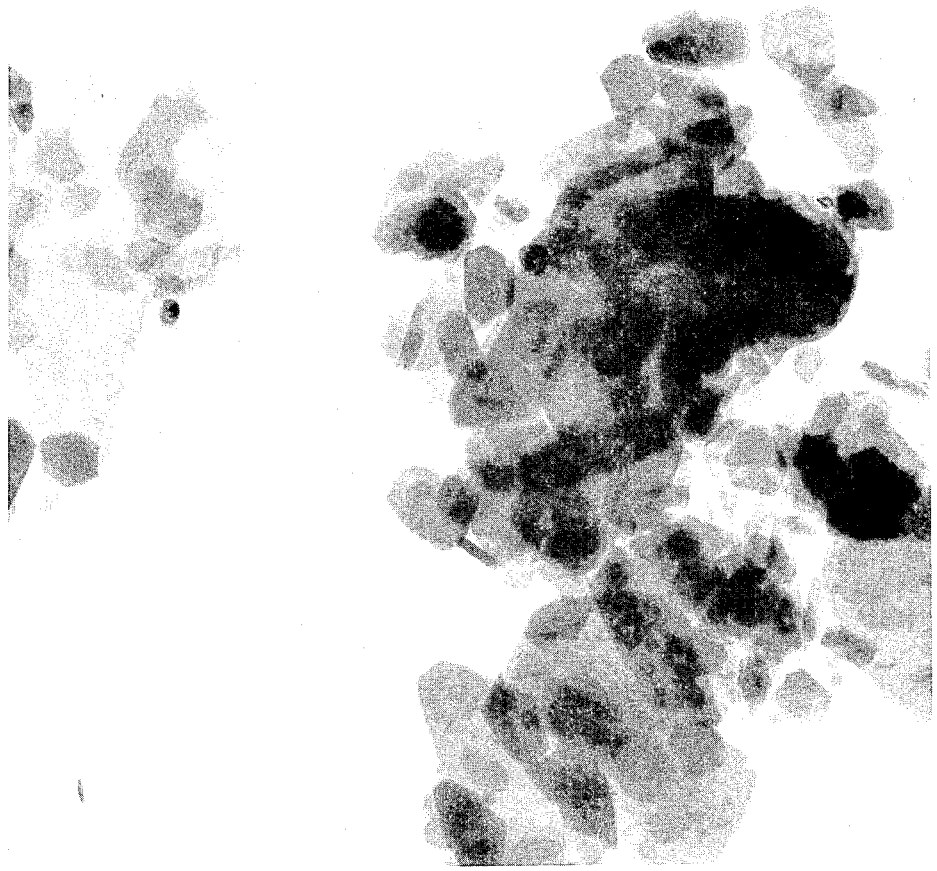
FIG. 24 Shows the TEM photograph of the control Omnifil clay
Figure 25:
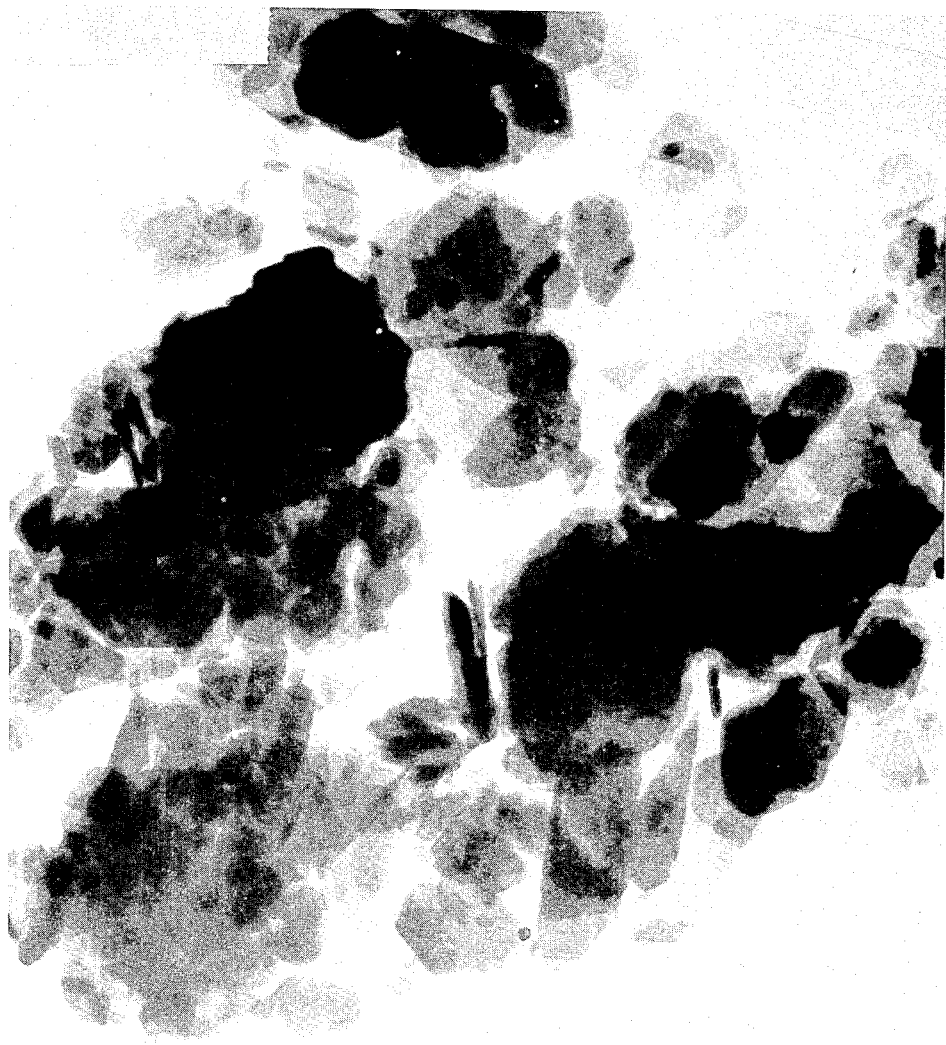
FIG. 25 Shows the TEM photograph of the control HydraglosS 90 clay
Figure 26:
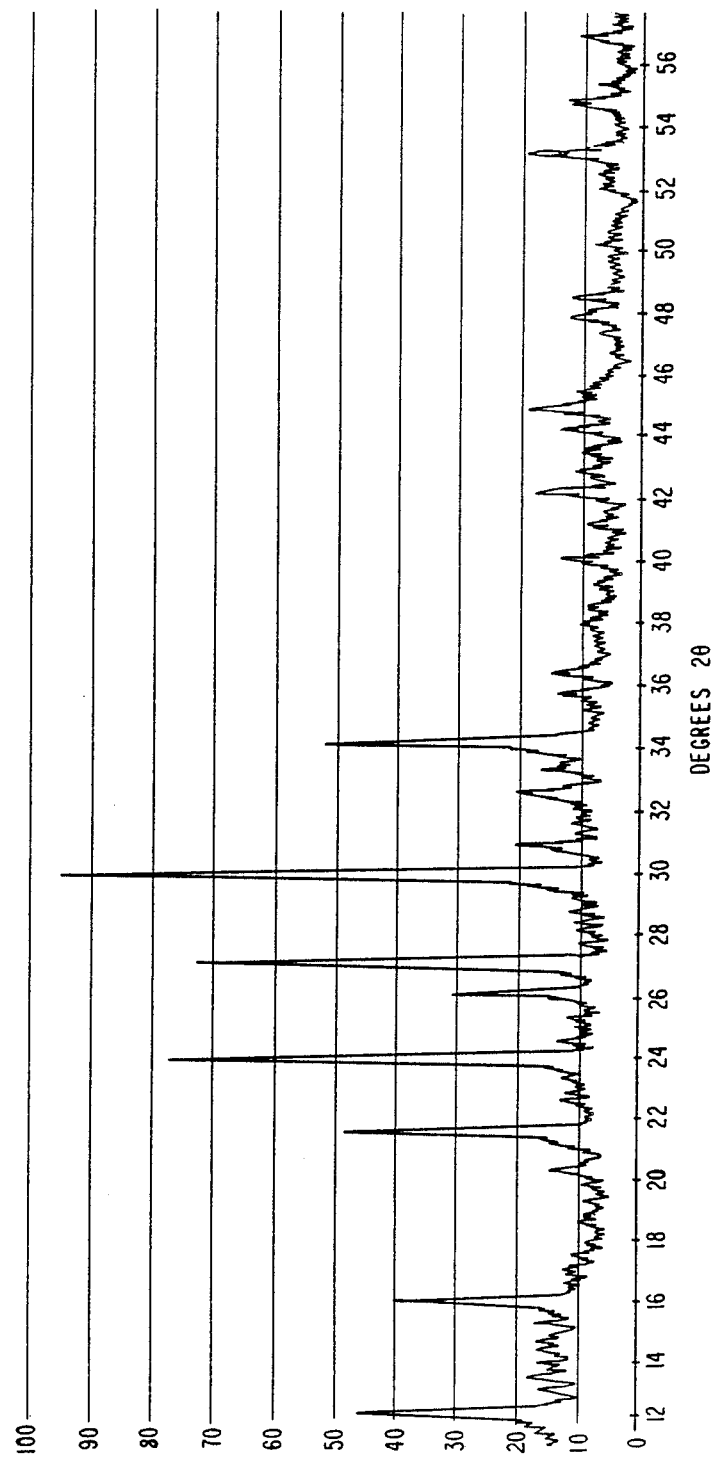
FIG. 26 Is the XRD scan of zeolite A
Figure 27:
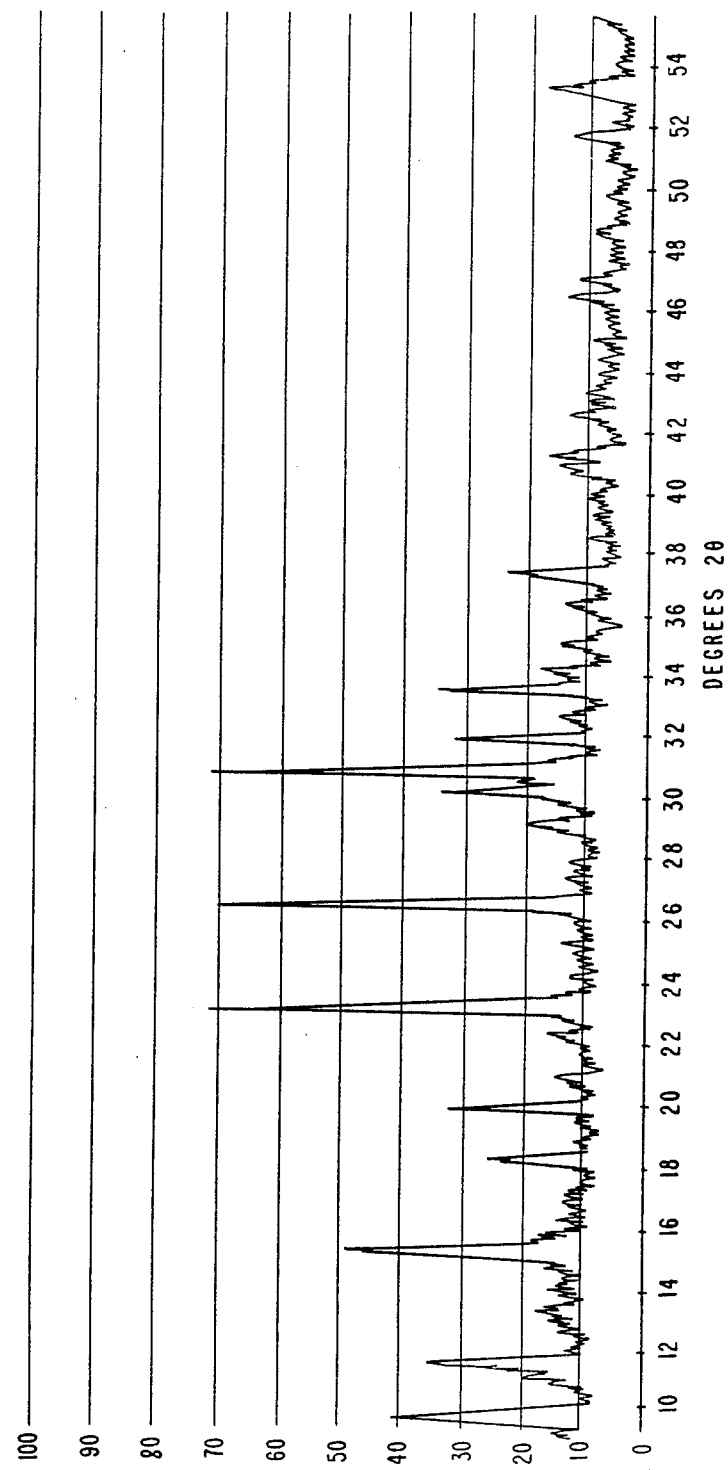
FIG. 27 Is the XRD scan of zeolite X
Figure 28:
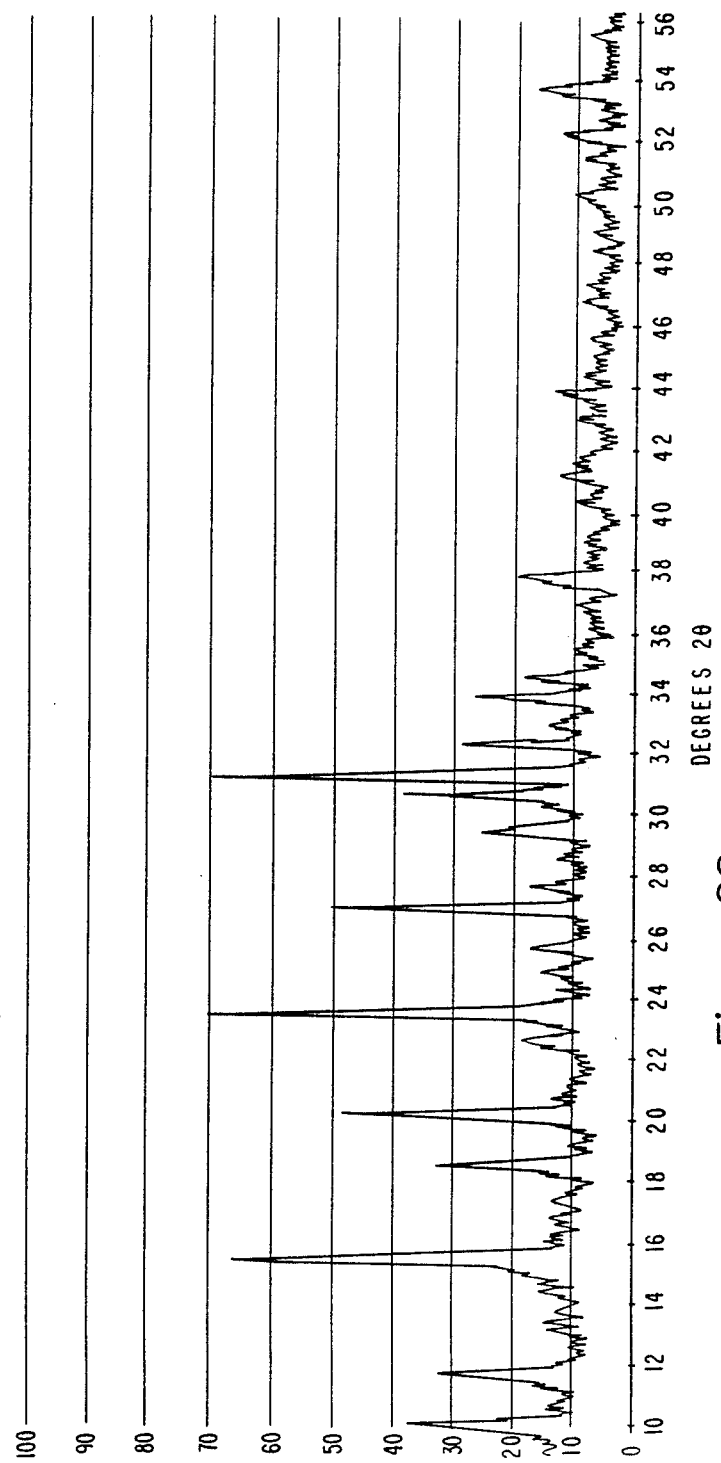
FIG. 28 Is the XRD scan of zeolite Y
Figure 29:
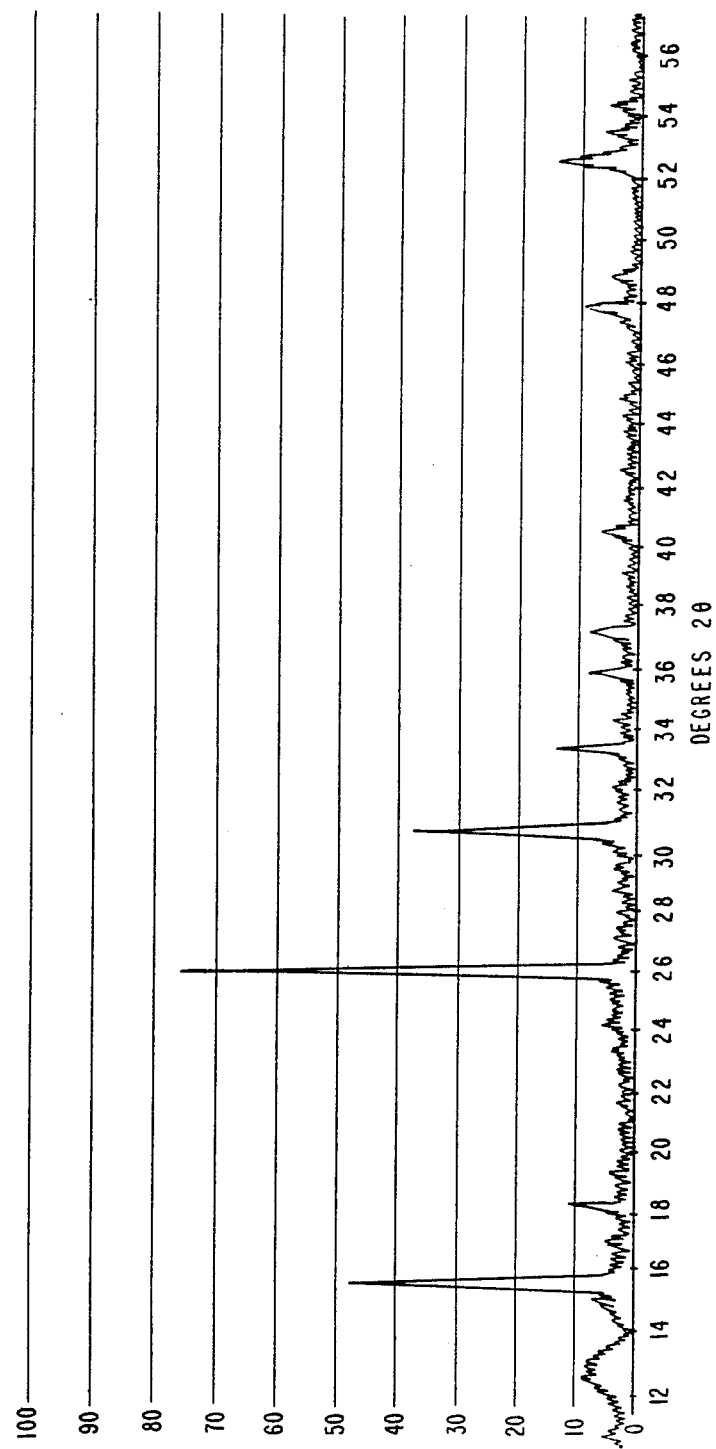
FIG. 29 Is the XRD scan of analcime
Figure 30:
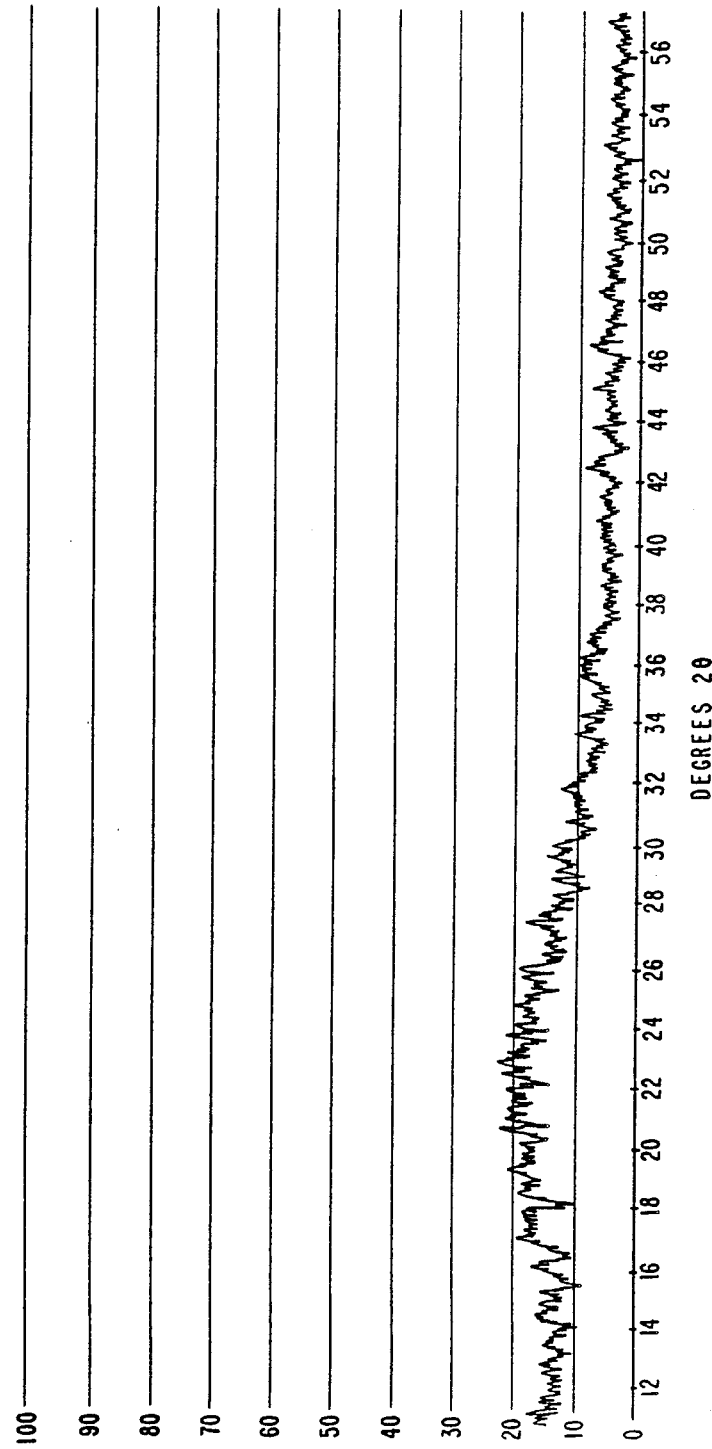
FIG. 30 Is the XRD scan of Zeolex 23
Figure 31:
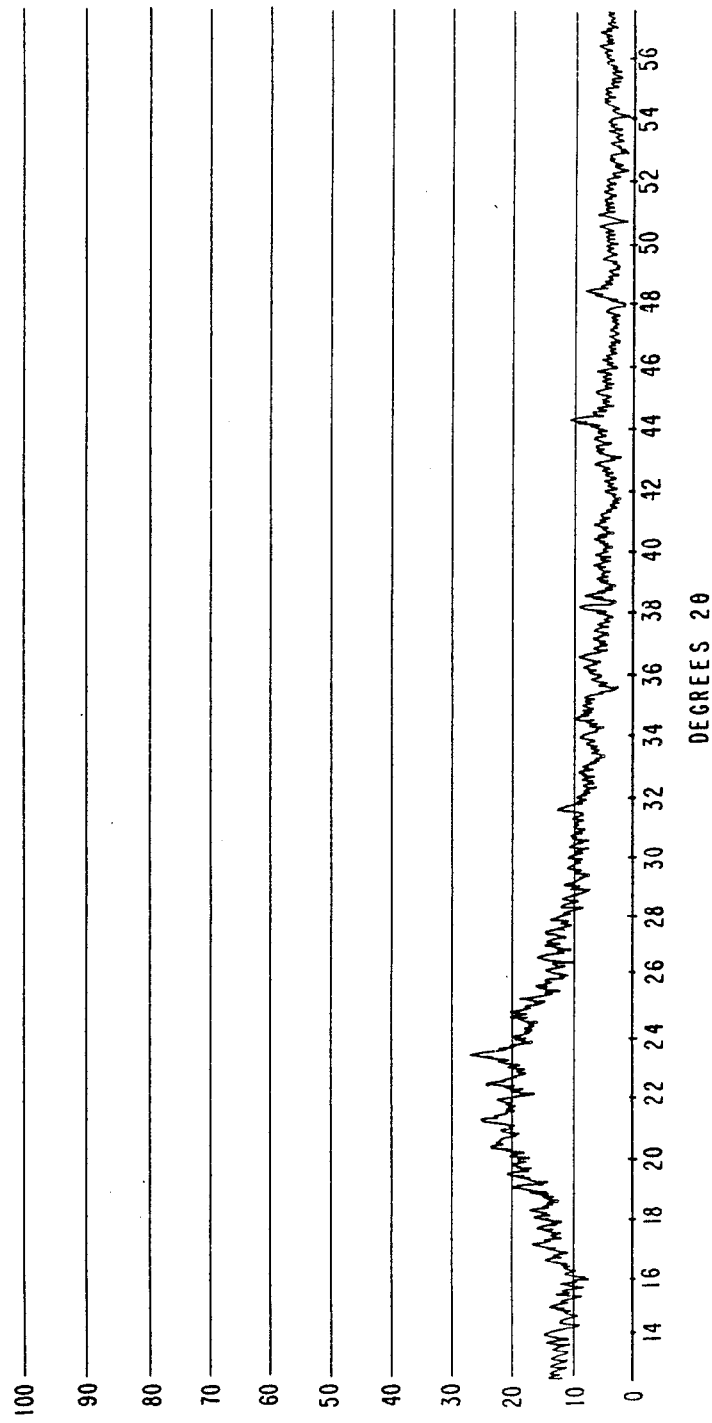
FIG. 31 Is the XRD scan of Hi-Sil 233
Figure 32:
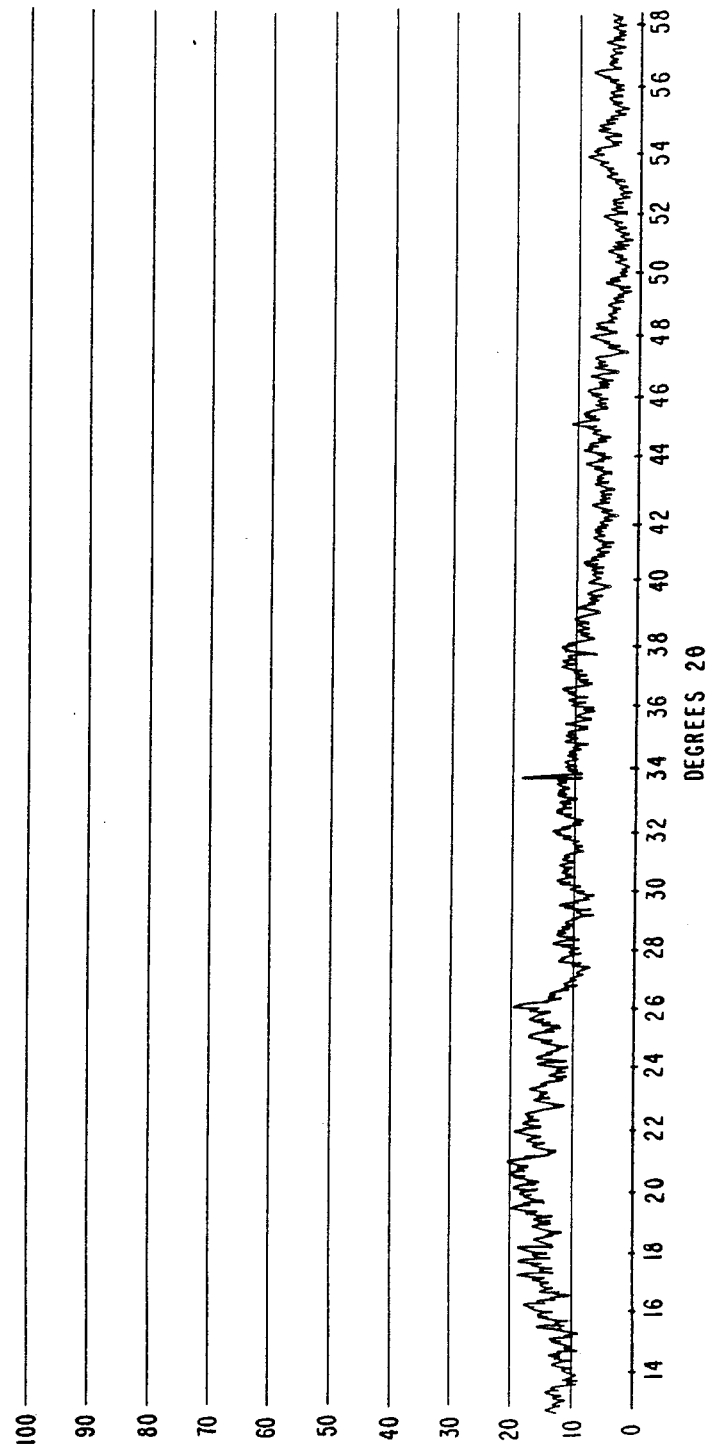
FIG. 32 Is the XRD scan of Hycal
Figure 33:
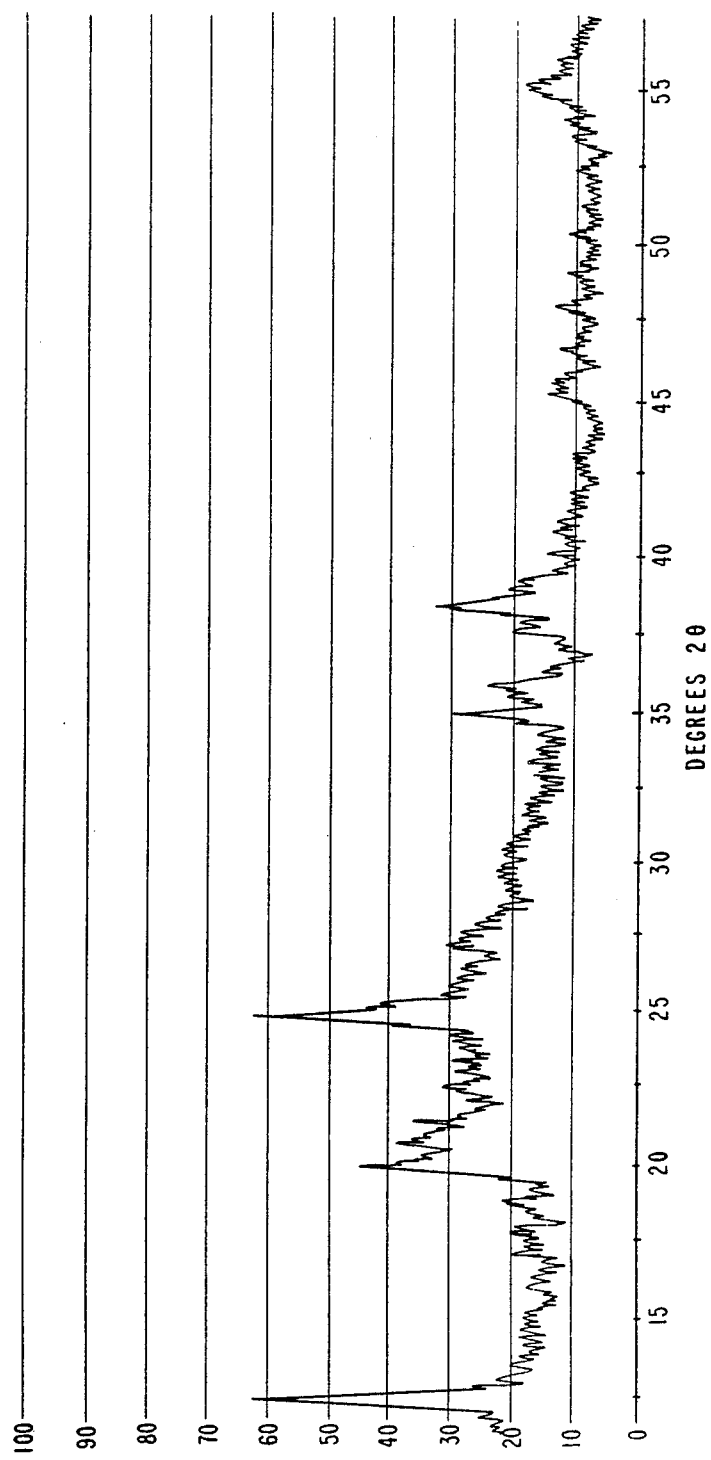
FIG. 33 Is the XRD scan of the SAMS composition of Example One showing only attenuated kaolin peaks FIG. 34 Is the XRD scan of the SAMS composition of Example Two showing only attenuated kaolin peaks FIG. 35 Is the XRD scan of the SAMS composition of Example Five Test 1 showing only attenuated kaolin peaks FIG. 36 Is the XRD scan of the SAMS composition of Example Five Test 2 showing only attenuated kaolin peaks FIG. 37 Is the XRD scan of the starting Omnifil clay FIG. 38 Is the XRD scan of the starting Hydragloss 90 clay
Figure 34:
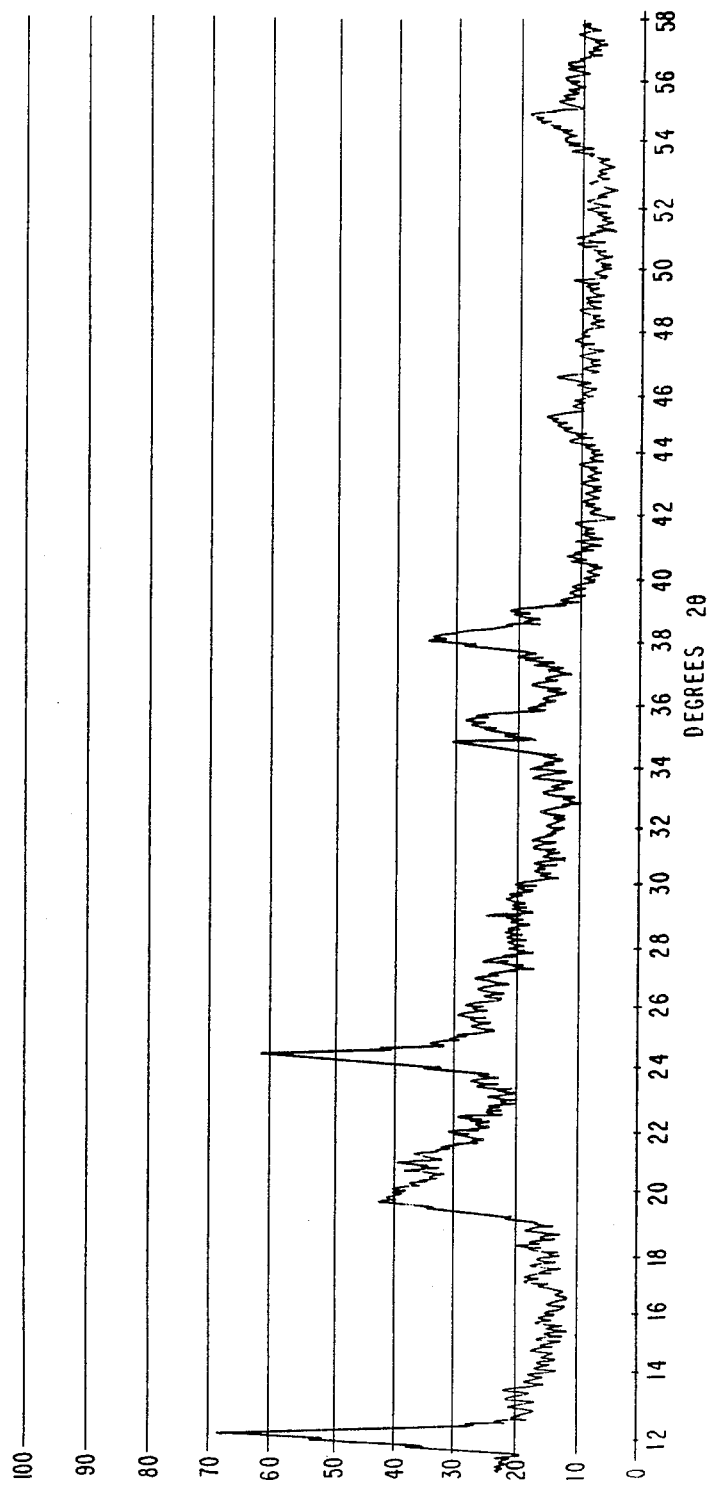
Figure 35:
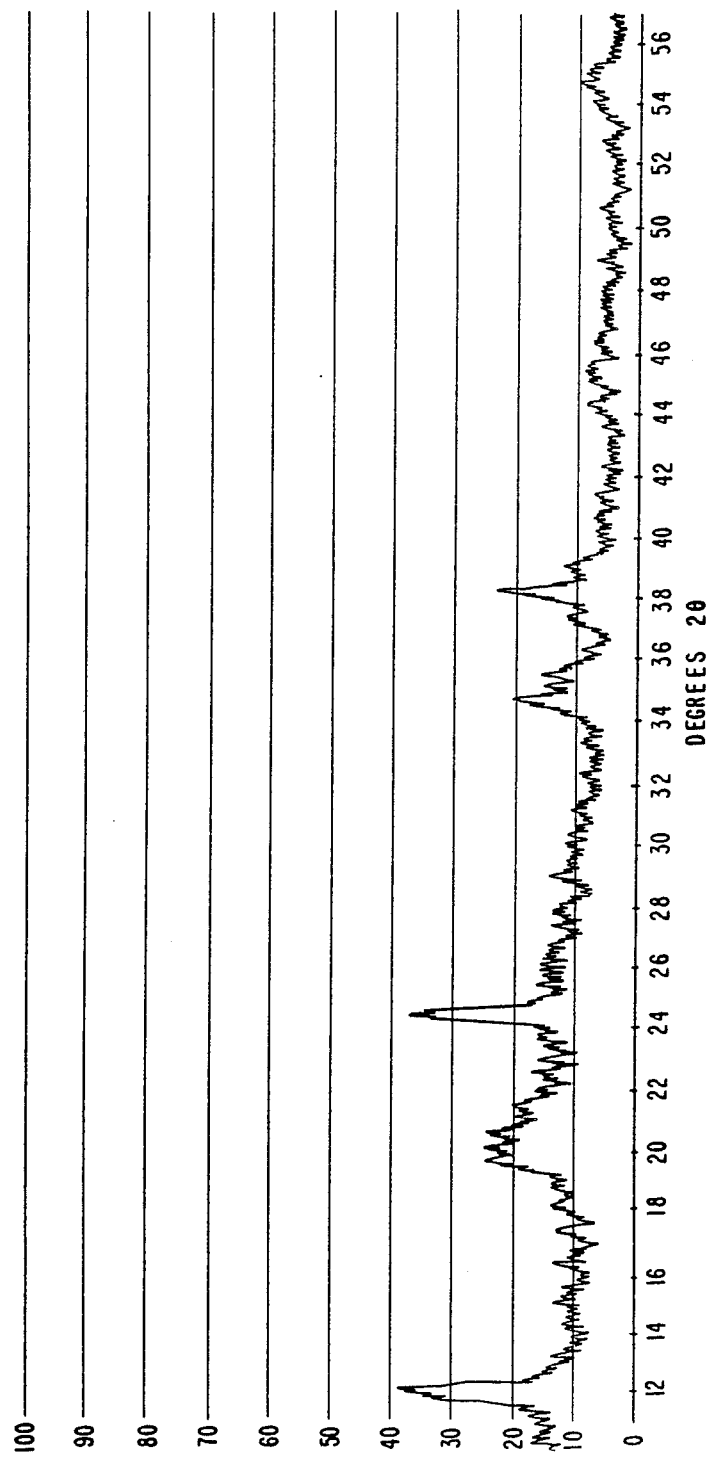
Figure 36:
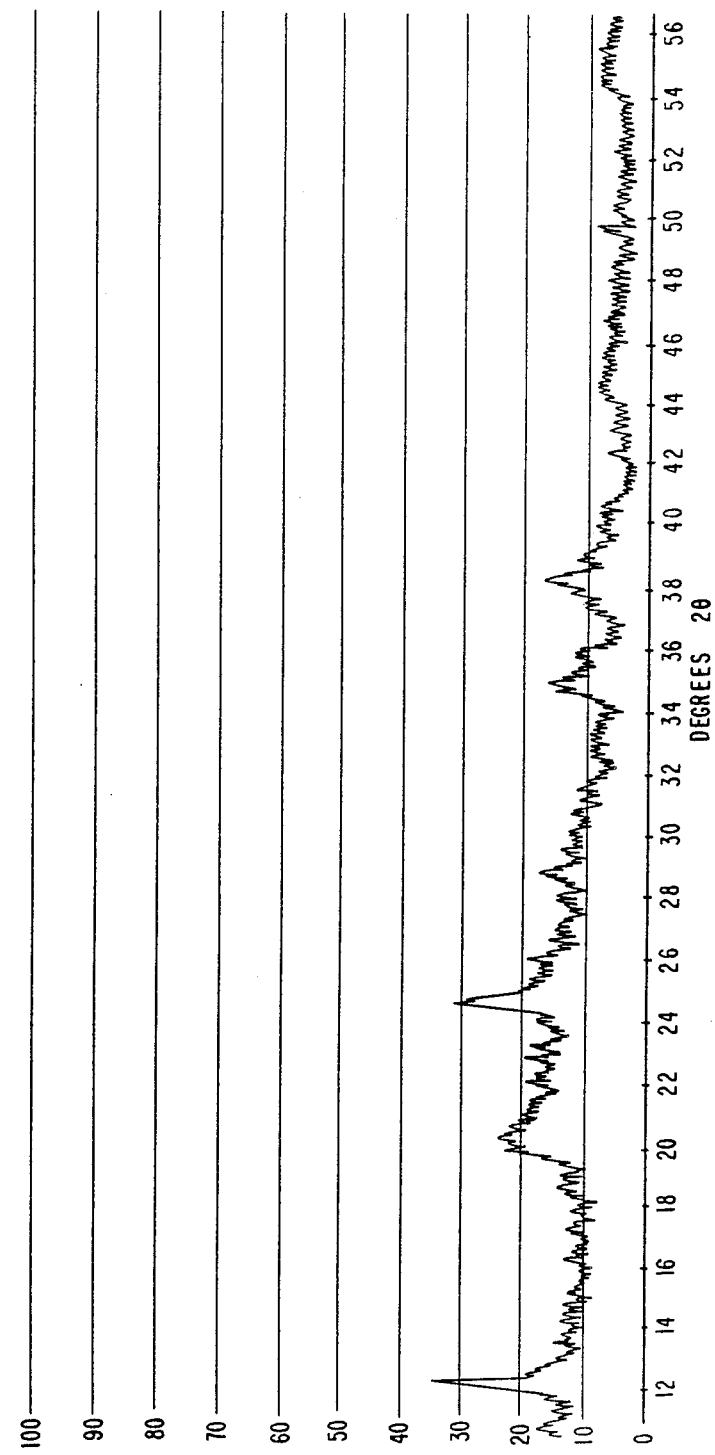
Figure 37:
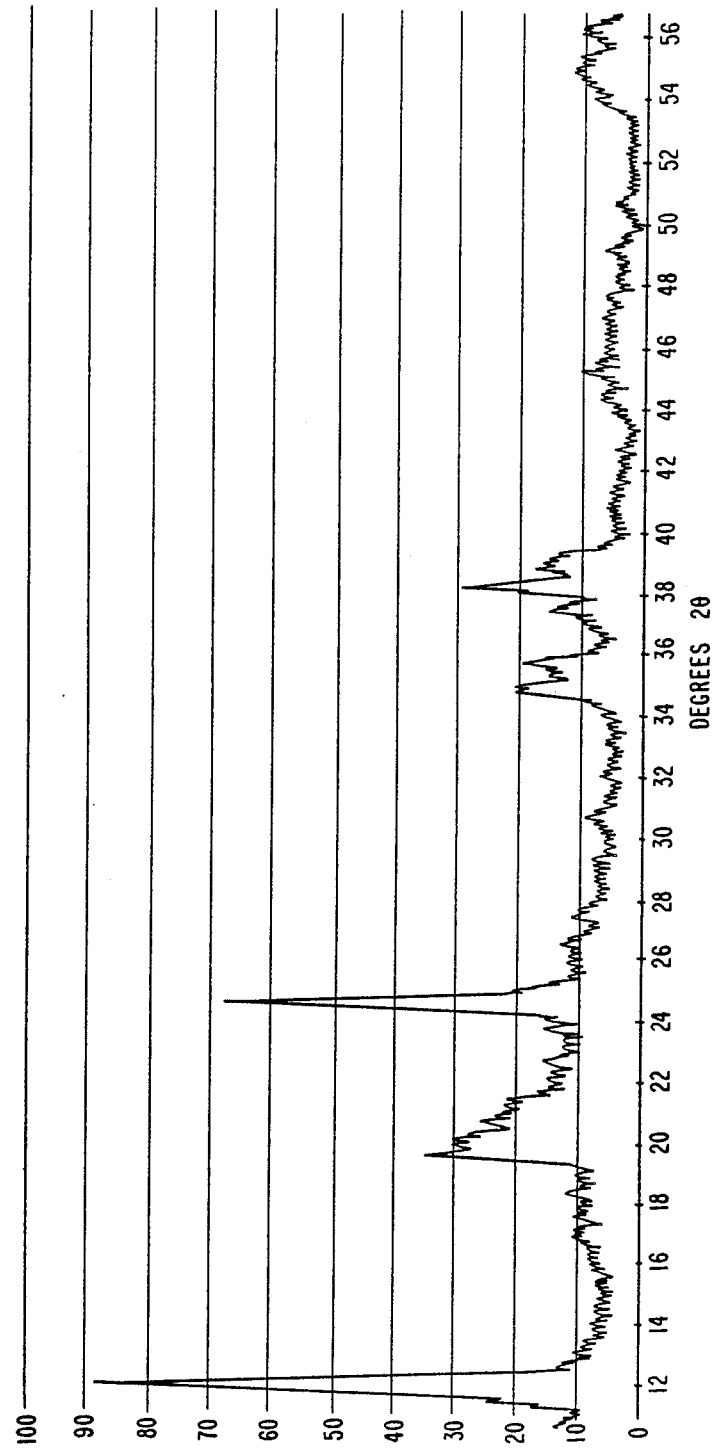
Figure 38:
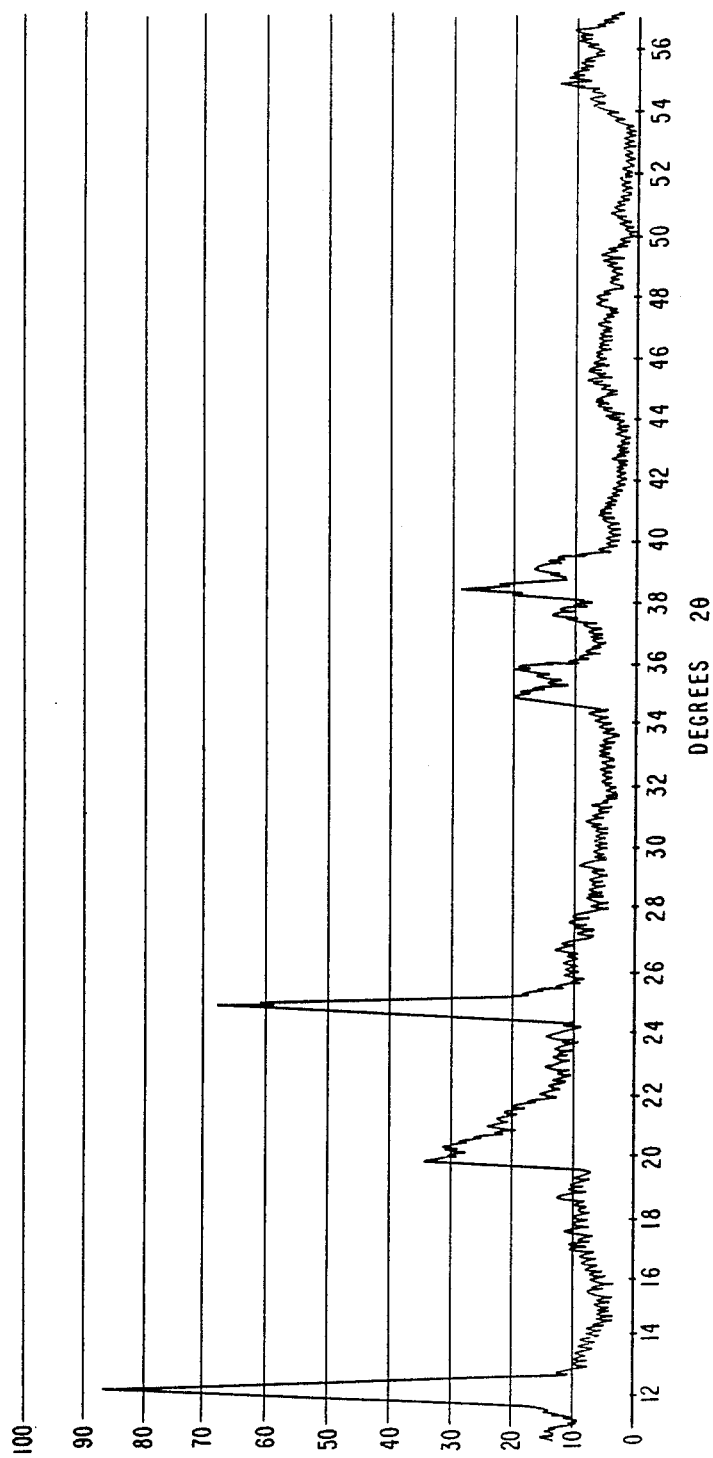

The TEM photographs of the SAMS compositions of Example One and Two, prepared by following the preferred teachings of the instant invention (B/C less than 1.0), and the photographs of SAMS compositions prepared at B/C ratios equal to and greater than 1.0 can be seen in FIGS. 18 through 23, respectively, and show the SAMS to be unique in composition and morphology. The TEM photographs FIGS. 18-23) show the SAMS compositions to contain remnants of altered clay platelets having an integrated rimmed area of alkali metal silicate-kaolin reaction product. The rimmed area can be shown by electron diffraction (ED) to be amorphous and non-diffracting. The SAMS compositions shown in FIGS. 18-23, are unique and considerably different in appearance than the starting Omnifil and Hydragloss 90 clay (FIGS. 24 and 25, respectively), as well as the prior art silicates, silicas, and calcined clays shown in FIGS. 15-17, When comparing the x-ray diffraction patients of the SAMS compositions of Examples One, Two and Five (FIGS. 33-36) with the XRD patterns of the starting clays (FIGS. 37 and 38), only attenuated kaolin peaks from the kaolin remnants can be observed. The XRD patterns of the SAMS compositions are also obviously different than the XRD patterns of the prior art zeolites, silicates, silicas and calcined clay shown in FIGS. 26-32.

coating composition and evaluation data are shown in Table IV.

A coating is applied to a paper substrate primarily to improve printing quality, although improvements in optical properties such as brightness or sheet gloss may also be obtained. The SAMS product made from Hydragloss 90 in Example Two was included at low levels in coating compositions and compared with a composition using only a commercial grade of delaminated kaolin clay (Hydraprint), and a composition containing the delaminated clay and a low level of a commercially available, high brightness, low abrasion calcined clay (Hycal), in an application for lightweight publication grade paper. The end-use of this particular paper and its coating formulation was in the art of printing by the rotogravure method. Coatings were applied to a commercially produced paper substrate :t a coat weight typical to the grade using the Keegan Laboratory Blade Coater. Following supercalendering, coated sheets were tested for optical properties in accordance with the following TAPPI (Technical Association of Pulp and Paper Industry) standards:

T-452: Brightness of Pulp, Paper and Paperboard

T-480; Specular Gloss of Paper and Paperboard at 75 degrees Rorogravure printability was determined using the Diamond National Print Smoothness Tester. The procedure followed is to coat, calender and print paper samples by the rotogravure method With a series of lines composed of dots. The dots are the result of printing cells engraved on the rotogravure printing cylinder, each of identical diameter and depth. The number of dots which do not transfer to the sheet is determined, with the greater number of misusing dots being interpreted as poorer rotogravure printability.

As noted from Table IV, when used as one-half the loading level of calcined clay, the product of the current invention unexpectedly produced a sheet of equivalent rotogravure printability, and clearly superior to that where only delaminated clay was used. Thus, one part of the product of the current invention can replace two parts of calcined clay resulting in substantial cost savings for those skilled in the art of paper coating. Furthermore, when used at an equal loading level with the expensive calcined clay, the SAMS product of this invention yielded a sheet of comparable optical properties, and clearly superior rotogravure printability.

TABLE IV

| PAPER COATING COMPOSITIONS CONTAINING SAMS: | | | |
|---|---|---|---|
| | 100% Hydraprint | 90% Hydraprint 10% Calcined Clay | 90% Hydraprint 10% SAMS from Example Two | 95% Hydraprint 5% SAMS from Example Two |
| Brightness, % | 68.2 | 69.2 | 69.0 | 68.7 |
| 75 Degree Gloss, % | 43.7 | 45.0 | 45.5 | 44.0 |
| Missing Dots/Sheet* | 31 | 22 | 15 | 23 |

*Diamond National smoothness test

END-USE APPLICATIONS

The novel SAMS products of the present invention were evaluated in a variety of end-use application compositions. Truly remarkable performance of SAMS products are documented below.

1. PAPER COATING COMPOSITIONS

The SAMS product of Example Two derived from Hydragloss 90 clay was evaluated in a typical paper

2. FINE PAPER FILLER COMPOSITIONS

Pigments are used as fillers in paper sheets for many reasons, among which are the improvement of optical properties such as brightness and opacity. The most efficient pigment for this purpose is titanium dioxide; however, its price is prohibitive for its sole use in this application. A class of pigments, known as titanium dioxide extenders, are less expensive, but still quite costly. When used in combination with titanium dioxide, these pigments allow for reduced titanium dioxide use while maintaining optical properties. Two pigments from this group which are quite effective are calcined kaolin clay and amorphous sodium silico-aluminate (Hydrex) pigments. The SAMS product made from Hydragloss 90 in Example Two was substituted directly for the titanium dioxide extender pigments, calcined clay (Hycal) and sodium silico aluminate (Hydrex), in a filler furnish containing 50% No. 2 grade clay (Hydrasperse), 17% titanium dioxide (DuPont LW), and 33% extender pigment. Handsheets were formed using the British Standard Handsheet Mould, weighed to assure uniform basis weight, and tested according to the prescribed TAPPI standards:

T-425: Opacity of Paper
T-452: Brightness of Pulp, Paper, and Paperboard

Additionally, the scattering and absorbance coefficients (S and K, respectively) were determined using the Kubelka-Munk equation. The value K/S was then determined, and presented as the scattering efficiency. Greater efficiency is noted as the K/S value approaches zero. The comparative evaluation data of SAMS and other extender pigments used in the paper filler composition is given in Table V.

It will be noted from Table V that the product of the current invention compares favorably to the expensive extender pigments in all parameters at each filler loading level. This is quite surprising in that the SAMS products of the present invention can be a match for the most expensive extender pigments normally used by the paper industry.

TABLE V
FINE PAPER FILLER COMPOSITIONS CONTAINING SAMS

| | Filler, % | Brightness, % | Opacity, % | Light Scattering Efficiency, K/S × $10^{-2}$ |
|---|---|---|---|---|
| Unfilled Control | 0 | 82.5 | 71.8 | 1.87 |
| 50% No. 2 Clay | 2 | 84.3 | 74.4 | 1.46 |
| 17% Titanium Dioxide | 4 | 85.4 | 78.5 | 1.25 |
| 33% Calcined Clay (Hycal) | 8 | 86.0 | 81.2 | 1.14 |
| 50% No. 2 Clay | 2 | 84.8 | 73.9 | 1.36 |
| 17% Titanium Dioxide | 4 | 85.5 | 78.2 | 1.23 |
| 33% Hydrex | 8 | 86.2 | 81.6 | 1.10 |
| 50% No. 2 Clay | 2 | 85.0 | 75.2 | 1.32 |
| 17% Titanium Dioxide | 4 | 85.4 | 78.1 | 1.25 |
| 33% SAMS from Example Two | 8 | 86.0 | 81.5 | 1.14 |

3. NEWSPRINT PAPER COMPOSITIONS CONTAINING SAMS

Another function of fillers in uncoated paper is to retard the amount of ink which penetrates the sheet, causing discoloration to the other side of the paper. This problem, frequently referred to as "print showthrough" or "print through," is generally encountered in newspaper printing. Improvement in this property is of more concern as quality standards for newsprint and similar grades continue to tighten.

The SAMS products made from Omnifil and Hydragloss 90 clays in Examples One and Two are compared with their respective starting materials, to a commercial grade of high brightness, low abrasion calcined kaolin clay (Ansilex), and to a high brightness sodium silicoaluminate (Zeolex 23P) in their ability to reduce showthrough. Handsheets were prepared from commercial newsprint pulp using a Noble and Wood sheet machine, and tested in accordance with the following TAPPI standards:

T-410: Basis Weight of Paper and Paperboard
T-425; Opacity of Paper
T-452; Brightness of Pulp, Paper and Paperboard Additionally, printing tests were performed at standard conditions of temperature and humidity on a Universal No. 1 Vandercook Proof Press using a standard newsprint ink and a printing plate mounted type high. The plate was designed for printing a solid area 4 inches by 4¼ inches. Prints were made with 4 mils impression by press bed adjustment, and the ink pickup determined by weighing each sheet before and after printing. Variations in printing and ink pickup necessitated printing each ash level at three ink levels, and obtaining printing values at exactly 2.0 g/m² ink pickup graphically.

Printed sheets were conditioned overnight at 73 degrees F. and 50% relative humidity prior to evaluation by a brightness tester at 457 nm on the side opposite the printing surface. Show-through was determined in accordance with Larocque's equation:

$$\text{Show Through} = \frac{(100 - \text{Reflectance (Printed)})}{(\text{Reflectance (Unprinted)})} \times 100$$

Comparative data on the newsprint evaluation of SAMS and other expensive extender pigments are given in Table VI.

TABLE VI
NEWSPRINT EVALUATION OF SAMS AND OTHER EXTENDER PIGMENTS

| Filler Pigment | Filler Level, % | Basis Weight, #/ream | TAPPI Brightness, % | Opacity, % | Show-Through @ 2 g/m² Ink, % | Show-Through Reduction, % |
|---|---|---|---|---|---|---|
| Unfilled | None | 30.6 | 52.9 | 85.1 | 10.8 | — |
| Omnifil (Control) | 2 | 30.3 | 52.9 | 85.1 | 12.6 | (16.7) |
| | 4 | 30.4 | 60.0 | 85.5 | 11.7 | (8.3) |
| Hydragloss 90 (Control) | 2 | 30.5 | 59.4 | 85.1 | 13.1 | (21.3) |
| | 4 | 30.1 | 60.6 | 85.4 | 12.8 | (18.5) |
| Ansilex (Calcined Clay) | 2 | 29.8 | 60.5 | 85.6 | 10.8 | 0 |
| | 4 | 30.1 | 62.0 | 87.4 | 9.1 | 15.7 |
| Zeolex 23P (Sodium Silico-Aluminate) | 2 | 30.4 | 60.2 | 85.5 | 9.1 | 15.7 |
| | 4 | 30.4 | 61.3 | 86.5 | 6.4 | 40.7 |
| SAMS from Example One | 2 | 30.3 | 59.9 | 86.3 | 9.6 | 11.1 |
| | 4 | 30.7 | 61.9 | 88.0 | 7.0 | 35.2 |
| SAMS from Example Two | 2 | 30.3 | 60.5 | 86.4 | 8.7 | 19.4 |
| | 4 | 30.6 | 62.0 | 88.5 | 6.8 | 37.0 |

It is seen in Table VI that the SAMS product from Example Two performs as well as the calcined clay and superior to the other pigments in brightness improvement and is also the superior pigment in opacity improvement. The SAMS product from Example One is surprising in its performance as well. Its opacity is second only to the product made from Example Two, exceeding both of the other higher brightness pigments, Ansilex and Zeolex 23. Concerning show-through, it can be noted from Table VI that the use of the starting hydrous clay materials (Omnifil and Hydragloss 90) actually result in more show-through than observed with the unfilled sample. The use of calcined clay, while improving show-through modestly at 4% filler loading, leaves the sheet unchanged from unfilled at the 2% filler level. When the products of the current invention are substituted directly at the 2% filler level for the Zeolex 23 pigment, that pigment being the product of choice for this purpose in commercial applications, the results were indeed surprising. The SAMS products from Example Two actually surpasses the Zeolex 23 pigment, while that made in Example One is only slightly deficient. Although the product of the current invention are slightly less efficient than the Zeolex 23 at the higher loading level, they are clearly superior to their starting inexpensive clay controls and to the expensive calcined clay. Furthermore, due to the high cost of the Zeolex 23 pigment, it can be easily shown that the cost per unit of strike-through reduction for the products of the present invention is much more favorable than that of the Zeolex 23. Thus, if used at quantities sufficient for equal strike-through reduction, the products of the current invention would provide significant cost savings in this application.

4. LATEX PAINT COMPOSITIONS CONTAINING SAMS

In the past, functional extender pigments were primarily used in paint as adulterants to replace more expensive prime pigments and binders; thereby resulting in a lower cost paint formulation. However, with the advent of new and improved functional extender pigments, the use of these pigments has grown. They are now incorporated into the paint formulations to improve optical properties such as whiteness, hiding power contrast ratio, and tinting strength.

In this regard, the SAM product made from Hydragloss 90 in Example Two was compared with the kaolin clay from which the SAMS composition was prepared and leading commercial pigments used as functional extenders in latex-based paints.

Whiteness (directional reflectance, Y-value) and contrast ratio were determined by making drawdowns of the paints containing control clay (Hydragloss 90), the SAM product from Example Two made from Hydragloss 90, a commercial extender pigment (Hi-Sil 422), and calcined clay (Huber 90C), on opacity charts having a simple combination of black and white areas large enough for reflectance measurements. Such charts are supplied by the Leneta Company, Ho-Ho-Kus, New Jersey. Directional reflectance, Y values, are determined using a Gardner XL-20 Tristimulus Colorimeter on the dried paint films over both the black and white areas of the charts. Whiteness is reported as the Y value determined over the white area. Contrast ratio is determined by dividing the Y values over black areas by the Y values over the white areas of the charts and is n measure of the relative opacity of the paint.

Relative tint strength was determined by blending 1%, by weight, of a lamp black colorant to each paint, making drawdowns on the opacity charts and then determining Y values of the dried paint films over the white areas of the charts. Relative tint strength is reported as this Y value.

Comparative paint performance results of unique SAMS products and other expensive extender pigments are contained in Table VII.

TABLE VII

LATEX PAINT EVALUATION OF SAMS AND OTHER PIGMENTS

| Pigment | Whiteness (Directional Reflectance, Y-Value, %) | Contrast Ratio | Relative Tint Strength, % |
|---|---|---|---|
| Hydragloss 90, Control | 87.9 | .944 | 38.8 |
| SAMS from Example Two | 88.8 | .958 | 41.0 |
| Hi-Sil 422 | 88.7 | .947 | 40.8 |
| Huber 90C | 88.6 | .949 | 40.5 |

Regarding Table VII, it will be noted that the control clay Hydragloss 90 and the commercial products, Hi-Sil 422(fine particle hydrated silica pigment), and Huber 90C (high brightness, low abrasion calcined clay) are compared with the Hydragloss 90 product of Example Two with respect to whiteness, contrast ratio and tint strength. The various pigments were evaluated in a typical high pigment volume concentration, interior, flat, vinyl acrylic paint. Pigmentation of the paint consisted of 17.6% rutile titanium dioxide, 19.6% standard calcined clay, 58.8% coarse particle-size calcium carbonate, and 4.0% of the evaluated pigment. It will be noted from Table VII that the SAMS product of this invention produces significant improvements over the kaolin clay from which the product of this invention was prepared in whiteness, contrast ratio and relative tint strength. Even more unexpectedly, the product of this invention gave an enhanced contrast ratio and superior tint strength to the more costly functional extender Hi-Sil 422.

Additionally, as can be seen from Table VII SAMS products of the present invention exhibit the best whiteness, contrast ratio (or hiding power) and tint strength when compared with expensive commercial extender pigments. It is truly remarkable how the inexpensive starting clay has been converted into a functional product SAMS by the teachings of the present invention.

5. NATSYN 2200 RUBBER COMPOSITIONS CONTAINING SAMS

Fillers are added to rubber compounds to provide reinforcement or act as a diluent. Small particle substances are considered to reinforce rubber if they give to the vulcanizate high abrasion resistance, high tear and tensile strength, and some increase in stiffness.

The most important characteristic required of a reinforcement agent is a fine particle size. Among non-black fillers, the best modulus and tensile strength are produced by precipitated silica (Hi-Sil), followed by synthetic sodium silico-aluminate (Zeolex). Fine particle size fillers that are approximately spherical in shape, such as many silicas, give better tear resistance and abrasion resistance to rubber than do needle-shaped or plate-like particles.

SAMS from Examples One and Two were evaluated in rubber compositions and their performance compared with the more expensive fine particle precipitated, hydrated amorphous silica product, Hi-Sil 233.

The rubbers which can be employed in the invention include both natural and synthetic rubbers. Exemplary of suitable synthetic rubbers are styrene-butadiene, butyl rubber, nitrile rubber, neoprene rubber, polybutadiene, polyisoprene, ethylene propylene, acrylic, fluorocarbon rubbers, polysulfide rubbers, and silicone rubbers. Mixtures of copolymers of the above synthetic rubbers can be employed alone or in combination with natural rubber. The most preferred rubbers are natural rubber, polyisoprene, nitrile rubber, styrene-butadiene, and mixtures thereof.

The SAMS product made from Hydragloss 90 in Example Two was evaluated against a fine particle precipitated, hydrated amorphous silica product (Hi-Sil 233) in a non-black synthetic polyisoprene (Natsyn 2200) rubber formulation.

The SAMS and silica products were used at a 38–40 part level per 100 parts rubber. The filler products were compared with respect to modulus and tensile strength (ASTM D1456), heat buildup (rectangular block oscillating horizontally between two weights), compression set (ASTM 395—ability of rubber compounds to retain elastic properties after prolonged action of compressive stresses), and tear strength (ASTM 624).

Evaluation results of the reinforcing properties of SAMS and a commercial expensive synthetic silica, Hi-Sil 233, are listed in Table VIII.

TABLE VIII

NATSYN RUBBER REINFORCING PROPERTIES OF SAMS

|  | Hi-Sil 233 | SAMS from Example Two |
|---|---|---|
| 300% Modulus, psi* | 460 | 630 |
| Tensile Strength, psi* | 2,850 | 2,870 |
| Heat Buildup, Degrees F. | 267 | 136 |
| Tear Strength, ppi | 140 | 155 |
| Compression Set, % | 41.6 | 23.2 |

*10 Minute cure

It will be noted from the Table VIII that the SAMS product of this invention is superior to the amorphous silica product in modulus, compression set, and heat buildup, where the silica product has twice the heat buildup when compared with SAMS products of the present invention. It is truly remarkable that the inexpensive clay has been converted into a unique functional SAMS composition. This unique property of low HBU (heat buildup) causes the product to have particular utility for use in tires, hoses, and belts where lower heat generation from friction will substantially prolong the longevity of these products. In this regard, the synthetic alkali metal alumino-silicates of this invention can also be used gainfully in elastomeric applications where exposure to high temperatures can cause severe deterioration of standard elastomeric systems.

The tire industry has been looking for a reinforcing filler which will provide low heat buildup in rubber formulations. As data clearly shows in Table VIII, the heat buildup imparted by SAM of the present invention is almost one-half that of the commercial expensive silica, Hi-Sil 233. The control structure of the unique SAMS compositions is responsible for providing excellent rubber reinforcing properties.

6. GIANT TIRE RUBBER COMPOSITIONS CONTAINING SAMS

The SAMS products made from Omnifil and Hydragloss 90 in Example One and Two were evaluated against a line particle, precipitated, hydrated amorphous silica product (Hi-Sil 233) in an off-the-road giant tire tread natural rubber formulation containing N220 carbon black. The SAMS and silica products were used at a 15 part level and the N220 carbon black at a 40 part level per 100 parts of rubber.

The filler products were compared with respect to modulus, tensile strength, tear strength, heat buildup, and a flex fatigue failure test (ASM D1052—Ross flexing machine that allows a pierced rubber specimen to bend freely over a rod through an angle of 90 degrees for the number of cycles required for specimen failure). It will be noted from the test results of Table IX that the SAM products of this invention from Omnifil and Hydragloss 90 are equal or superior to the high-priced amorphous silica product in modulus, tensile strength, tear strength, heat buildup, and flex fatigue. Of particular interest is the startling increase in flex fatigue property which should be very important in elastomeric systems in which a great deal of bending and stretching stresses are involved, such as shock suppressors, hoses and tubing, bushings, etc.

By examining the evaluation data in Table IX, it can be clearly seen that the unique SAM products provide excellent file fatigue protection to rubber compositions. Then compared with the expensive commercial silica products, Hi-Sil 233.

It is quite remarkable that the inexpensive clay products have been converted to more useful value-added materials called SAMS by the teachings of the instant invention. The performance properties of SAMS in rubber compositions are unique and quite unexpected. It appears that the novel SAM compositions of the present invention are controlled structures in nature and provide optimum filler-polymer interaction in rubber compositions.

TABLE IX

GIANT TIRE RUBBER REINFORCING PROPERTIES OF SAMS

|  |  | SAMS From | |
|---|---|---|---|
|  | Hi-Sil 233 | Example One | Example Two |
| 300% Modulus, psi* | 1,360 | 1,490 | 1,500 |
| Tensile Strength, psi* | 3,700 | 3,780 | 3,870 |
| Tear Strength ppi | 605 | 575 | 625 |
| Heat Buildup, Degrees F. | 278 | 267 | 260 |
| Flex Fatigue, (Cycles To Failure × 1000) | 471 | 835 | 666 |

*90 Minutes Cure

7. COLOR CONCENTRATE PLASTICS COMPOSITIONS

Pigments, fillers and extenders are mixed with plastics resins to produce color concentrates. Titanium dioxide and colored pigments are widely used to produce pigmented plastics concentrates.

A study was undertaken in which a 50% $TiO_2$ concentrate was produced in high density polyethylene (HDPE) resin. This concentrate was called the control concentrate.

The SAMS product from Example Two was used to extend $TiO_2$ of the control concentrate by replacing 10 and 20% by weight of the TiO$_2$ with SAMS. The following plastic compositions were used to produce the various concentrates.

| Ingredients | Control | Concentrate A | Concentrate B |
|---|---|---|---|
| HDPE | 50 | 50 | 50 |
| R-101 (TiO$_2$) | 50 | 45 | 40 |
| SAMS (from Example Two) | — | 5 | 10 |

The control and concentrates A and B containing 5% and 10% SAMS were compounded in the 3# Farrel Banbury. Each sample was then granulated, extruded and pressed out for testing. The optical properties of the various concentrates were then evaluated.

The opacity and brightness of the control and SAM containing concentrates are listed in Table X. This study suggests that SAMS of the instant invention can be used in color concentrates without loss in opacity and brightness.

Data are listed in Table X.

TABLE X

PLASTIC COLOR CONCENTRATES CONTAINING SAMS

| Concentrate | Elrepho Brightness, % | Opacity, % |
|---|---|---|
| TiO$_2$ - Control | 89.1 | 0.980 |
| Concentrate A (w/SAMS) | 91.8 | 0.985 |
| Concentrate B (w/SAMS) | 91.4 | 0.990 |

8. DEFOAMER COMPOSITIONS

Defoamer compositions are used to suppress foam formation in the paper, paint, food and many specialty industries.

Defoamer compositions were prepared by using the following formulations:

| Ingredients | Parts (by weight) |
|---|---|
| Dow 3011 Antifoam Chemical | 4.0 |
| Ammonium Carbonate | 1.0 |
| Mineral Oil | 200.0 |
| HG 90 or SAMS (from Example Two) | 10.0 |

The mineral oil called for in the above formulation was weighed out and placed in a stainless steel cup. Control clay or SAMS from Example Two was hand-mixed with the mineral oil. This mixture was dispersed on a Hockmeyer mixer for five minutes at 2300 rpm speed. The antifoam chemical was then added, followed by ammonium carbonate. The whole composition was mixed for an additional three minutes.

The contents of the stainless steel cup were transferred into a 500 ml flask and heated at 80 degrees C until the foaming stopped. The temperature was then increased to 105 degrees C and the composition maintained at this temperature for two hours. The flask was removed from the hotplate and after cooling, the contents were transferred to a one-half pint can for storage. At this point the defoamer composition is ready for evaluation.

The defoamer composition was checked for foam suppression properties. One liter of black kraft liquor (15% solids) was poured into a 2500 ml burette which was hooked up to a gravity feed circulating pump flowing at the rate of five liters per minute.

While the black liquor was at rest, 0.02g (or two drops) of the defoamer composition was added to the burette. The pump and a stop watch were simultaneously started to record the time it takes the foam height to reach six inches from starting point of liquor at rest. A defoamer composition which suppresses the foam from reaching a six-inch height for the longest time is considered the best defoamer compound.

Defoamer efficiency data are given in Table XI.

TABLE XI

DEFOAMER COMPOSITIONS

| Defoamer Compositions | Six-Inch Suppression Time |
|---|---|
| Compound w/HG-90 - Control | 27 seconds |
| Compound w/SAMS (from Example Two) | 233 seconds |

From data in Table XI, it is clear that SAMS makes an excellent defoamer when compared with the starting clay. In fact, the defoaming efficiency of SAMS from Example Two is about 762% better than the Hydragloss 90 control. It is truly remarkable that the present invention has converted the Hydragloss 90 clay into a valued added SAMS product of unique efficiency for use in defoamer compositions.

9. DRY-UP LIQUID/CARRIER COMPOSITIONS

Liquids, active subtrates and rubber chemicals are dried up on fine particle carriers The dry, free flowing powders are produced by adding the powder to the liquid while mixing in a Hobart mixer until a dry, free-flowing powder is produced. From the weight of the liquid carried on a carrier solids, one can calculate the carrying capacity of the carrier powder.

The SAMS product from Example Two was compared with the control clay (Hydragloss 90) in terms of the carrying capacity of mineral oil and Flexon (Exxon) processing oil. These liquids were converted to dry, free-flowing powders with the carrying capacity expressed as the percent by weight of liquid (% active) present. The carrying capacity data is given in Table XII.

TABLE XII

CARRYING CAPACITY OF SAMS

| Carrier Powder | % Active |
|---|---|
| Liquid: Mineral Oil | |
| Control Clay | 10 |
| SAMS from Example Two | 58 |
| Liquid: Flexon Oil | |
| Control Clay | 10 |
| SAMS from Example Two | 60 |

From data in Table XII, it can be readily seen that SAMS of the instant invention has excellent carrying capacity when compared with the clay control. It is quite remarkable that clay has been converted into the functional carrier SAMS by the teachings of the instant invention.

10. PAINT COATING COMPOSITIONS

In order to provide protection and to produce a pleasing appearance, a variety of surfaces, such as wood, metal fabric, paper, or plastics, are coated with clear flatting compositions containing dispersed or suspended particles of a flatting agent which reduces the gloss or sheen of the coating and the coated substrate, preferably without substantially reducing the transparency of the flat coating. For example, wood finishes which serve to protect the surface against abrasion and stain, yet do not conceal the beauty of the grain, are made to simulate desirable hand-rubbed finishes by incorporating flatting agents therein which normally are dispersed fine particles of such materials as silicas. The best effects are obtained with silicas of uniform particle size down to the submicron range. Small size and uniformity are necessary to achieve a smooth coating without white specks or without a graying effect which would detract from the appearance of the coating.

For paint flatting application, 10 grams of SAMS from Example Two of the instant invention was mixed with 350 grams of nitrocellulose lacquer conforming to Military specification MIL-L-10287A-amendment 2, Type 11, of issue 27, Aug. 1959), and mixed for three minutes using the low speed setting of the Hamilton Beach #30 mixmaster. The lacquer containing dispersed SAMS was tested for Hegman fineness of grind.

The lacquer containing dispersed SAMS from Example Two was evaluated for paint flatting properties. A drawdown was made on Carrara glass using a #34 wire coatings application rod. The Carrara glass drawdowns were allowed to dry for 45 minutes under dust-free conditions. Using the above method, drawdowns were also made by using a control synthetic silica normally used in this application.

Using the Gardner multi-angle gloss meter, the gloss and sheen values of the various drawdowns were measured at 60 degrees and 85 degrees, respectively. These values were compared with measured values obtained when a control silica was dispersed in the lacquer.

SAMS of the present invention result in cleaner Hegman grinds and exhibit better clarity when dispersed in the lacquer.

Flatting data listed in Table XIII suggests that the novel SAMS of the present invention exhibit lower gloss and sheen values than the control silicas. Lower gloss and sheen values are preferred and advantageous for paint flatting applications.

TABLE XIII

PAINT FLATTING EVALUATION

| Flatting Agent | 60 Degree Gloss | 85 Degree Sheen |
|---|---|---|
| SAMS (Example One) | 10 | 21 |
| SAMS (Example Two) | 8 | 16 |
| Control Silica (Zeothix 95) | 15 | 45 |

A close examination of the data in Table XIII clearly shows the SAMS compositions of the instant invention as having superior flatting properties compared with the synthetic silica control. It is quite remarkable that clay has been converted into a value added functional product by the teachings of the instant invention.

11. DETERGENT COMPOSITIONS

Typical home laundry detergents are generally formulated as a 50–60% solids slurry and spray dried to give the familiar powdered products. A typical some laundry detergent consists of the following ingredients;

| Ingredient | Percent, by weight |
|---|---|
| Sodium Tripolyphosphate | 12–50 |
| Surface Active Agents | 10–20 |
| Liquid Sodium Silicate | 5–8 |
| Soil Redeposition Agents | 0.5–1.5 |
| Fluorescent Dyes | 0.05–1 |
| Water | 2–12 |
| Sodium Sulfate | Balance |

Surface active agents mainly consist of an ionic linear alkyl benzene sulfonate (LAS) and non-ionic alcohol based ethoxylates (AEO). A surfactant is needed in the detergent to extend the functional performance of the detergent builder.

Non-ionic surfactants are added at a level of 4–6% (typical non-ionic surfactants currently being used are Shell's Neodol 25-7 and 45-11) based on the weight of other ingredients of the detergent compositions The resulting slurry is spray dried. Non-ionic surfactants contain small fractions of short-chain molecules called "light ends." During the spray drying step, the "light ends" do not incorporate into the finished detergent bead and go out of the dryer exhaust and result in a white cloud referred to as "plume."

Detergent producers are anxious to cut down this "plume" and several mechanical advances have been made to scrub the stack gases but the scrubbing process is not 100% effective. Also, the equipment required to clean the stack gases is very expensive.

We have found an inexpensive solution to the problem in which SAMS of the present invention can be used to convert the liquid non-ionic surfactants to dry, free-flowing particulates so that dried-up surfactant can be post added to the spray dried detergent formulation. Thus, SAMS compositions of the instant invention are useful for drying-up non-ionic surfactants in the free-flowing form. Thus, SAMS can be used in the detergent compositions to solve an air pollution problem called "pluming."

Neodol 25-9 surfactant (manufactured by Shell Chemical Company) was dried-up on SAMS from Examples One and Two. The maximum amount of Neodol that can be dried up is listed in Table XIV.

TABLE XIV

DRYING-UP NEODOL 25-9 ON SAMS PRODUCTS

| Carrier | Flow Time (seconds) | % Active Surfactant |
|---|---|---|
| SAMS (Example One) | 18 | 51.2 |
| SAMS (Example Two) | 15 | 55.9 |
| Clay Control | 86 | 10.0 |

From data in Table XIV above, it is clear that SAMS compositions of Examples One and Two exhibit superior flow properties and drying capacity when compared with the corresponding control clay used in Example Two.

Thus, the method of drying up non-ionic surfactants results in superior free flowing surfactant powders. These surfactant powders can be efficiently used by post-adding to detergent compositions.

Thus, SAMS of the instant invention are useful in detergent compositions and these SAMS pigments impart superior properties which help in solving an important air pollution problem.

12. PLASTIC FILM ANTIBLOCK COMPOSITIONS

Low density polyethylene (LDPE) and polypropylene (PP) film have a tendency to stick together This phenomenon is called "blocking." SAMS pigments of the instant invention were evaluated to determine if SAMS could be used as antiblocking agents in LDPE, PP and other plastics films.

Approximately 1300 gram batches of LDPE and SAMS compositions from Examples One and Two, as well as the control clay from Example Two, were compounded in the 3# Banbury. Each sample was then granulated and extruded through the one and one-half inch Davis Standard Extruder using a 20/100/60 mesh screen pack. Each sample extruded contained 90% LDPE Gulf Resin 5200 and 10% of either the SAMS composition from Example One and Two, or the control clay from Example Two. Press-outs from each concentrate were made from each sample to determine the quality and dispersion of each material.

Film was then produced on the one-inch Killion extruder. All film samples were produced on the same machine on the same day at a constant rpm, identical temperature profile, and constant film thickness.

Film samples were heated after 24 hours of film aging to let the antiblock additive migrate to the surface of the film. The blocking force, coefficient of friction (COF) and percent haze were determined on each film sample. These results are summarized in Table XV.

TABLE XV

| ANTIBLOCK COMPOSITION (FILM THICKNESS: 2 MILS) | | | | |
|---|---|---|---|---|
| Compound | Antiblock Agent | Blocking Force, gm | COF, g | % Haze |
| Gulf Resin 5200 | None | 76 | 0.6 | 11 |
| Gulf Resin 5200 | HG-90 Clay | 74 | 0.5 | 12 |
| Gulf Resin 5200 | SAMS from Example One | 38 | 0.5 | 10 |
| Gulf Resin 5200 | SAMS from Example Two | 45 | 0.4 | 9 |

Data in Table XV clearly show that SAMS have better antiblocking properties than the starting resin and the clay control. Also, the COF and the haze properties of he film containing SAMS are definitely superior to the film containing the clay control.

SYNTHESIS OF SAMS AS A FUNCTION OF B/C RATIO

Except as expressly noted below the procedures of Example One and Two were followed using laboratory reactors of two-liter, one-gallon or two-gallon capacity in carrying out the examples below which are otherwise abbreviated to focus on the variables changed. Experimentation was performed on a laboratory scale.

EXAMPLE THREE

A reaction in accordance with Example Two was carried out at 135 psi, for one hour of reaction time using Hydragloss 90 and a 2.5 mole ratio sodium silicate to illustrate the novelty of the invention over a wide range base to clay ratios. Conditions and results are shown below in Table XVI.

TABLE XVI

| SAMS SYNTHESIS AS A FUNCTION OF B/C RATIO | | |
|---|---|---|
| Base to Clay Ratio B/C | Oil Absorption, ml/100 g | Monovalent Cation Exchange Capacity, meq/100 g |
| Clay Control | 30 | 2 |
| .20 | 89 | 72 |
| .35 | 127 | 123 |
| .50 | 164 | 170 |
| .70 | 124 | 189 |
| .90 | 122 | 186 |

This clearly points to the fact that a wide variety of SAMS compositions of high oil absorption and high ion exchange capacity, when compared with control clay, can be prepared by the teachings of the present invention.

EXAMPLE FOUR

To illustrate the present invention in regard to the use of different alkali metal silicates, reactions of potassium silicates (Kasil 42 and Kasil 1, respectively) with Hydragloss 90 clay were conducted at 120 psig over 1.5 hours using 10% solids. Reactions conducted at B/C ratios ranging from 0.25 to 5.0 yielded the results set forth in Table XVII.

TABLE IVII

| SAMS Synthesis from Potassium Silicate | | | | | |
|---|---|---|---|---|---|
| Starting Silicate* | B/C Ratio | Oil Absorption ml/100 g | BET S.A., m²/g | Brightness, % | XRD |
| — | HG-90 (control) | 43 | 22.0 | 91.0 | Kaolin |
| Kasil 42 | 0.25 | 146 | 27.1 | 90.0 | Attenuated Kaolin |
| " | 0.50 | 170 | 22.2 | 90.3 | " |
| " | 0.75 | 166 | 19.3 | 91.0 | " |
| " | 1.00 | 166 | 18.3 | 91.8 | Amorphous |
| " | 1.50 | 152 | 15.2 | 92.5 | " |
| " | 3.00 | 143 | 11.7 | 92.6 | " |
| " | 5.00 | 142 | 10.4 | 92.8 | " |
| Kasil 1 | 0.25 | 159 | 29.9 | 90.2 | Attenuated Kaolin |
| " | 0.50 | 167 | 26.6 | 90.9 | " |
| " | 0.75 | 170 | 21.9 | 91.9 | Kaolin (trace) |
| " | 1.00 | 170 | 19.7 | 92.4 | Amorphous |
| " | 1.50 | 155 | 13.4 | 91.8 | " |

TABLE IVII-continued

| | SAMS Synthesis from Potassium Silicate | | | | |
|---|---|---|---|---|---|
| Starting Silicate* | B/C Ratio | Oil Absorption ml/100 g | BET S.A., m²/g | Brightness, % | XRD |
| " | 3.00 | 116 | 6.8 | 90.6 | " |

*The SiO$_2$/K$_2$O mole ratio compositions of the starting silicates were:
Kasil 42 = 2.8
Kasil 1 = 3.9
Silicates are commercially available from PQ Corporation.

Figure 39A:
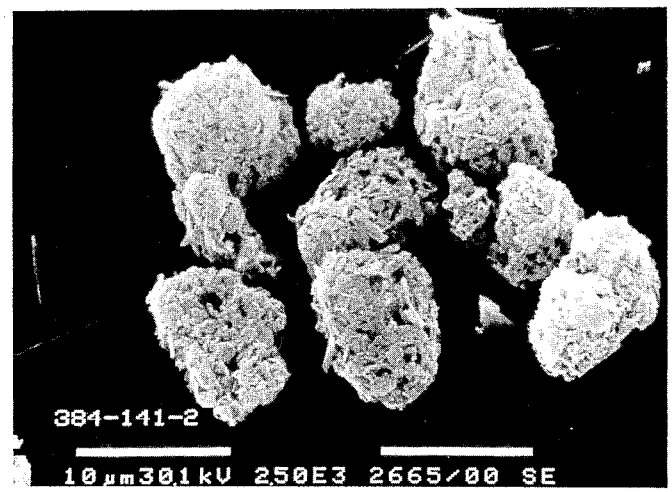
FIGS. 39A and 39B show the SEM photograph of potassium SAMS compositions of Example Four. Test 2 (FIG. 39A) and Test 4 (FIG. 39B)
Figure 39B:
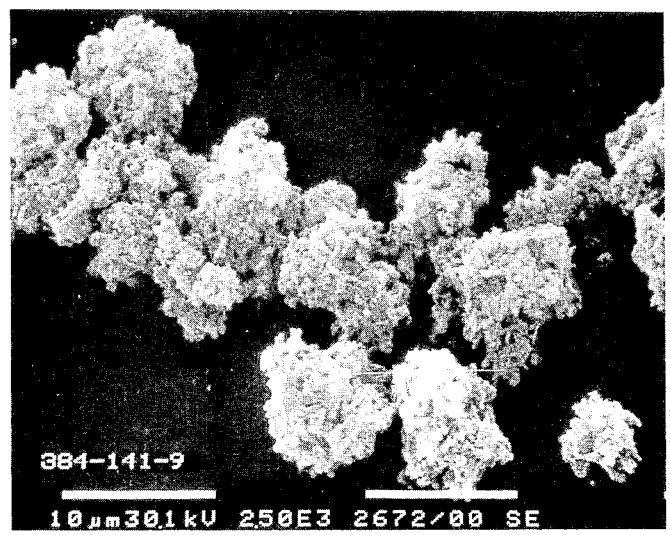

The data in Table XVII clearly shows that potassium silicates can also be used in the synthesis of unique SAMS compositions. A unique characteristic of SAMS products prepared from potassium silicates is the absence of zeolite formation even at B/C ratios as high as 5.0. At high B/C ratios (i.e., B/C>1), the potassium silicate/clay reactions were found to always yield completely amorphous materials rather than any zeolite. Under similar reaction conditions, sodium silicate/clay reactions typically produce zeolite (see Example Nine for comparison). Another interesting feature of potassium SAMS products, is an observed change in their morphology as the SiO$_2$/K$_2$O mole ratio of the potassium silicate used for reaction is increased from 2.8 to 3.9. SEM photographs comparing the potassium SAMS prepared from Kasil 42 and Kasil 1, both at B/C ratio of 0.5, are shown in FIG. 39. A change in the agglomerate morphology of the products, from generally spheroidal to coral-like, is apparent when Kasil 1 rather than Kasil 42 was used.

EXAMPLE FIVE

In accordance with the teachings of this invention, Example Five shows the formation of SAMS compositions at B/C ratios of 1.0 to 2.0, using alkali metal silicate bases of different SiO$_2$/Na$_2$O molar ratios. To exemplify this aspect of the invention, a Hydragloss 90 clay was reacted with 2.5 and 3.3 mole ratio sodium silicate at approximately 100 psi for one hour at 10% solids. The results are set forth in Table XVIII.

TABLE XVIII

| SYNTHESIS OF SAMS AT HIGH B/C BATCH COMPOSITIONS | | | | | | |
|---|---|---|---|---|---|---|
| Test No. | Base to Clay Ratio (B/C) | Oil Absorption, ml/100 g | Structure | Surface Area, m/g | Cation Exchange Capacity, meg/100 g | Brightness % |
| Hydragloss 90 Control | | 30 | VLS | 20 | 2–3 | 91.0 |
| 1* | 1 | 162 | MS | 24 | 141 | 91.7 |
| 2* | 2 | 193 | HS | 19 | 191 | 93.0 |
| 3** | 1 | 187 | HS | 16 | 159 | 92.6 |
| 4** | 2 | 115 | LS | 11 | 136 | 91.2 |

*2.5 Silicate Mole Ratio (SiO$_2$/Na$_2$O)
**3.3 Silicate Mole Ratio (SiO$_2$/Na$_2$O)

Data in Table XVIII clearly show the formation of SAMS compositions at B/C ratios equal to and greater than 1.0 using alkali metal silicate bases of different SiO$_2$/Na$_2$O molar ratios. The SAMS compositions had oil absorption values which would correspond to materials having from low (LS) to high (HS) structure. TEM FIGS. 22 and 23 also show the same unique SAMS composition and morphology of SAMS compositions prepared at B/C ratios of 0.5 and 0 75 (FIGS. 18 through 21).

Figure 5:
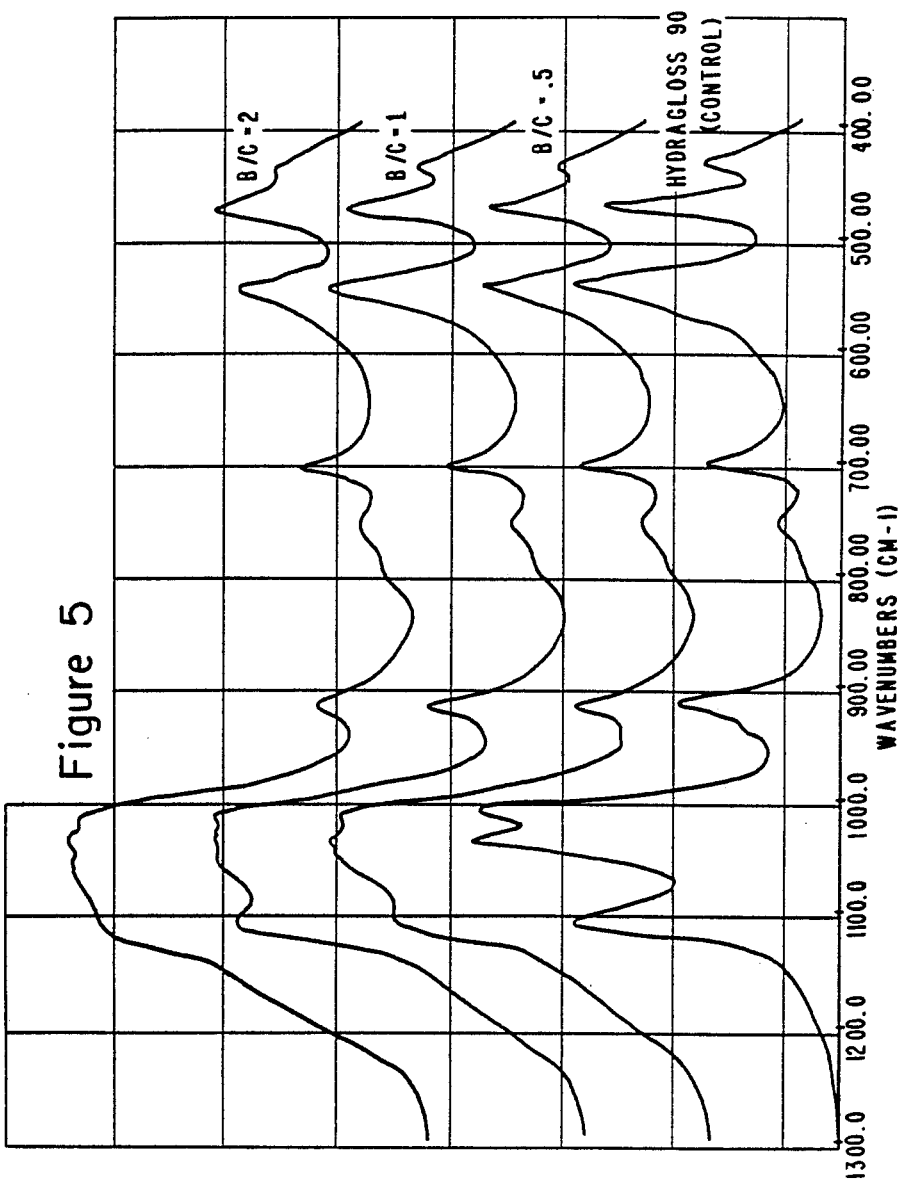

FIG. 5 shows a comparison of the FT-IR spectra of Hydragloss 90 control clay, SAMS from Example Two prepared at a B/C of 0.5, and SAMS from Example Five prepared at a B/C of 1.0 and 2.0. A sodium silicate having an SiO$_2$/Na$_2$O mole ratio cf 2.5 was used in the SAMS synthesis. The only difference observed in the IR spectra of the SAMS compositions occurred in the 1200-950 wavenumber region in the Si—O stretching peak. As the B/C of the SAMS composition increased the peak became broader and less detailed. This would indicate an increase in the amount of amorphous material present in the SAMS compositions. The TEMS's and FT-IR spectra clearly show that the unique SAMS compositions can be formed at B/C ratios of one and greater.

To further demonstrate the functionality feature of the variety of SAMS compositions prepared at different B/C ratios, the products from Tests 1 through 4 were evaluated as functional extenders in a typical paint formulation similar to that described earlier. In Table XIX the products from Tests 1 through 4 were compared in contrast ratio with Zeolex 80, Hydragloss 90 and Satin tone 5, a commercial, high brightness calcined clay.

TABLE XIX

| PAINT PROPERTIES OF SAMS VERSUS B/C OF BATCH COMPOSITION | | | | |
|---|---|---|---|---|
| Test No. | B/C | Silicate Mole Ratio | Structure | Contrast Ratio |
| 1 | 1 | 2.5 | MS | .977 |
| 2 | 2 | 2.5 | HS | .978 |
| 3 | 1 | 3.3 | HS | .975 |
| 4 | 2 | 3.3 | LS | .970 |
| Satintone 5 | — | | VLS | .975 |
| Hydragloss 90 | — | | VLS | .976 |
| Zeolex 80 | — | | LS | .973 |

As noted in Table XIX, the SAMS compositions having medium to high structure produced excellent contrast ratio values which equalled or surpassed values for commercially available calcined clays or silicas in paint properties.

EXAMPLE SIX

To illustrate the present invention in regard to the use of silicates comprised of various SiO$_2$/Na$_2$O ratios,, a reaction of Omnifil and various silicates at a pressure of 120 psi for one hour of reaction time at 10% solids yields the results set forth in Table XX.

TABLE XX
SYNTHESIS OF SAMS AS A FUNCTION OF SILICATE MOLE RATIO

| Test No. | Base to Clay Ratio (B/C) | Silicate Mole Ratio ($SiO_2$/$Na_2O$) | Oil Absorption, ml/100 g | Monovalent Cation Exchange Capacity, meq/100 g | Surface Area, $m^2/g$ | Brightness, % | Structure |
|---|---|---|---|---|---|---|---|
| 1 | .50 | 3.33 | 161 | 115 | 24 | 83.5 | MS |
| 2 | .75 | 3.33 | 167 | 149 | 20 | 85.8 | MS |
| 3 | .50 | 2.50 | 156 | 143 | 25 | 85.5 | MS |
| 4 | .75 | 2.50 | 148 | 175 | 21 | 85.9 | MS |
| 5 | .50 | 1.00 | 123 | 148 | 28 | 84.0 | LS |
| 6* | .75 | 1.00 | 83 | 216 | 28 | 85.1 | LS |
| Omnifil (Control) | — | — | 37 | 2–3 | 20 | 82.0 | VLS |

*XRD pattern showed presence of zeolitic material

Figure 6:
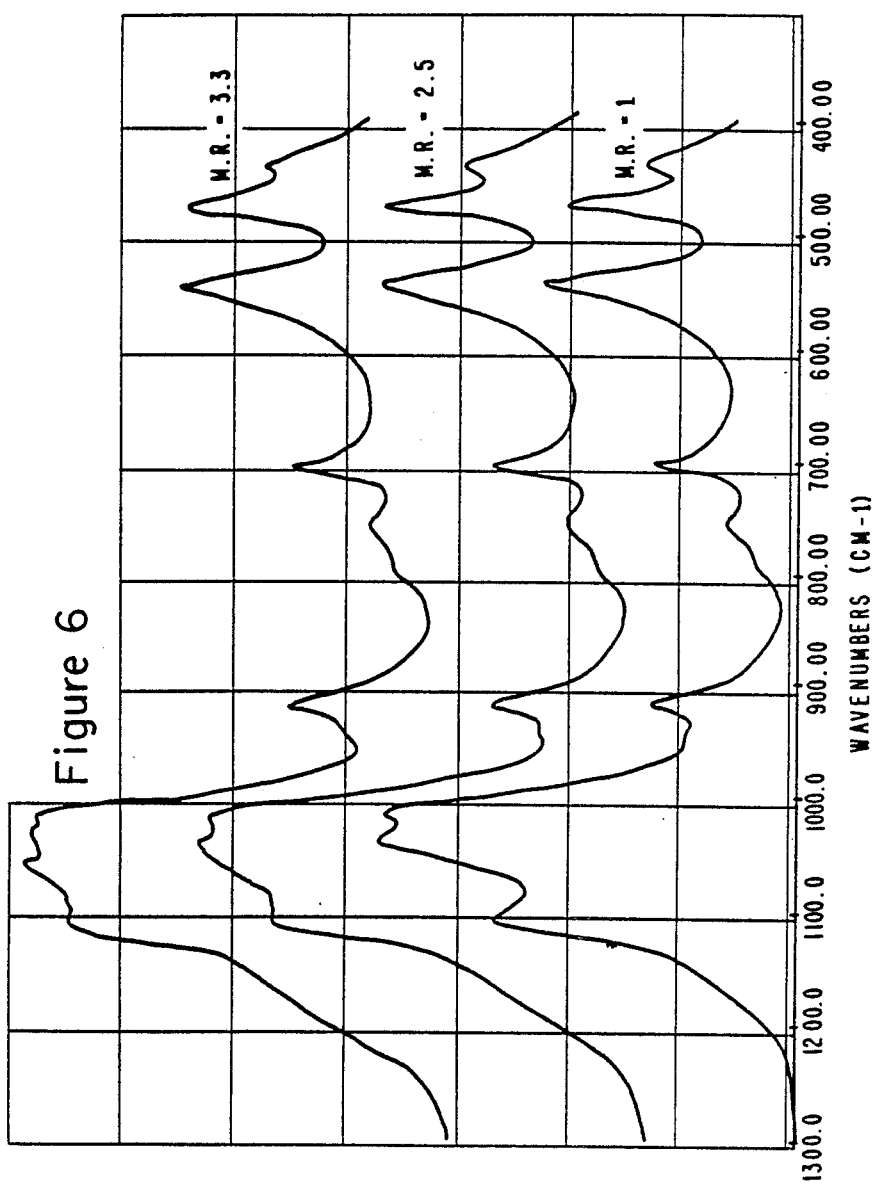
FIG. 6 Shows a comparison of the FT-IR scans of the SAMS compositions of Example Six prepared from Omnifil clay and different mole ratio sodium silicate bases using a B/C ratio of 0.5

As can be seen from the data in Table XX, SAMS compositions having low to medium structure were formed under the preferred conditions of B/C less than 1.0 using alkali metal silicate bases of varying $SiO_2$/$Na_2O$ molar ratios. Low structured SAMS compositions prepared in Tests No. 5 and 6 using sodium metasilicate. The XRD pattern of Test 6 showed the presence of a zeolitic material. FIG. 6 shows a comparison of the infrared spectra of the SAMS compositions of Example Six prepared at a B/C ratio of 0.5 using the different molar ratio sodium silicates. The IR spectra of the SAMS prepared from the 2.5 and 3.3 mole ratio silicate are essentially identical and closely resemble the IR pattern of the SAMS compositions of Example One, Two and Five (FIGS. 3, 4 and 5). The IR spectrum of the SAMS prepared with meta silicate more closely resembles that of the starting clay (FIG. 3), reflecting the lower silicate content of the starting reaction mixture. This is especially true in the 1200-950 wavenumber Si—O stretching region. It must be concluded, based on the physical and analytical data, that unique SAMS compositions similar to those produced in Example One and Two were formed by reacting clay with sodium silicates of $SiO_2$/$Na_2O$ molar ratios of 1.0 to 3.3 at B/C ratios less than 1.0.

EXAMPLE SEVEN

To illustrate the effectiveness of the present invention on a clay pigment produced from another locale, a delaminated Central Georgia clay (Hydraprint) having the properties shown in Table XXI was employed for a three-hour reaction time at 120 psi and 10% solids, using a 3.33 mole ratio sodium silicate. Results of the reactions are shown in Table XXI.

TABLE XXI
SYNTHESIS OF SAMS FROM CENTRAL GEORGIA CLAY

| Base to Clay Ratio (B/C) | Oil Absorption ml/100 g | Surface Area, $m^2/g$ | Structure |
|---|---|---|---|
| Hydraprint (Control) | 49 | 13 | VLS |
| 0.25 | 153 | 19 | MS |
| 0.50 | 179 | 14 | HS |
| 0.75 | 171 | 14 | MS |

The oil absorption data shown in Table XXI would suggest that unique SAMS compositions of medium to high structure can be produced by the reaction of a relatively coarse particle size, low surface area clay such as Hydraprint with an alkali metal silicate base.

EXAMPLE EIGHT

To illustrate the importance of controlling reaction time and pressure/temperature in the SAMS synthesis, a series of SAMS reactions was conducted in which pressure and reaction time were varied between 100-150 psi and one to three hours, respectively. Results of the tests are shown in Table XXII. The reactions were conducted at 10% solids using a Hydraprint, middle Georgiz delaminated clay, and a B/C ratio of 0.8. A 3.3 mole ratio sodium silicate was used in the tests.

TABLE XXII
SYNTHESIS OF SAMS AS A FUNCTION OF REACTION, PRESSURE AND TIME

| Pressure,* psi | Time, hrs | Brightness % | Oil Absorption ml/100 g | XRD | SA, $m^2/g$ |
|---|---|---|---|---|---|
| 100 | 1 | 89.2 | 134 | SAMS | 13 |
|  | 2 | 90.0 | 135 | SAMS | 11 |
|  | 3 | 90.3 | 145 | SAMS | 11 |
| 120 | 1 | 89.9 | 131 | SAMS | 11 |
|  | 2 | 90.6 | 133 | SAMS | 11 |
|  | 3 | 91.1 | 157 | SAMS + Trace Z** | 112 |
| 135 | 1 | 90.3 | 137 | SAMS | 9 |
|  | 2 | 91.2 | 156 | SAMS + Trace Z | 33 |
|  | 3 | 91.3 | 161 | SAMS + Z | 91 |
| 150 | 1 | 90.6 | 144 | SAMS | 10 |
|  | 2 | 91.5 | 158 | SAMS + Trace Z | 49 |
|  | 3 | 91.5 | 150 | SAMS + Z | 124 |
| Hydraprint (Control) |  | 87.5 | 42 |  | 14 |

*Corresponding temperatures can be found in steam table
**Zeolite

The above tests illustrate the wide variety of SAMS compositions that can be produced by reacting clay and alkali metal silicate. Brightness, oil absorption and surface area of the resulting SAMS compositions can be changed by varying reaction time and steam pressure (temperature). The data show that if the presence of zeolitic material in the SAMS composition is undesirable, it can be eliminated by reducing reaction pressure and/or time.

EXAMPLE NINE

To illustrate the uniqueness of the clay-sodium silicate reaction, tests were conducted in which Hydragloss 90 east Georgia clay was reacted with both a 2.5 molar sodium silicate and sodium hydroxide at B/C ratios of 0.75 to 5.0. The reactions were conducted at 10% solids at 120 psi for two hours. Results of the tests are given in Table XXIII.

TABLE XXIII
COMPARISON OF SODIUM SILICATE WITH SODIUM HYDROXIDE AS BASE IN THE SAMS SYNTHESIS

| Base to Clay Ratio, (B/C) | Base | Brightness, % | OA, ml/100 g | SA, $m^2/g$ | XRD |
|---|---|---|---|---|---|
| 0.75 | Silicate | 92.1 | 147 | 90 | SAMS |
| 1 | Silicate | 90.9 | 102 | 228 | SAMS + trace Zeolite |
| 3 | Silicate | 92.0 | 90 | 246 | Trace SAMS + Zeolite |
| 5 | Silicate | 93.5 | 104 | 7 | Amorphous |
| 0.75 | NaOH | 81.0 | 82 | 20 | Hydroxy sodalite* |
| 1 | NaOH | 74.6 | 78 | 15 | Hydroxy sodalite* |
| 3 | NaOH | 83.5 | 64 | 17 | Hydroxy sodalite |
| 5 | NaOH | 81.5 | 60 | 21 | Hydroxy sodalite |
| Hydragloss 90 | | 91.0 | 43 | 22.0 | |

*XRD also showed presence of kaolinite.

The reaction with sodium hydroxide formed only hydroxy sodalite. In addition, the low brightness, oil absorption and surface area values also show that no SAMS compositions were formed. In contrast, the sodium silicate reaction produced SAMS compositions having increased brightness, structure (oil absorption) and surface area. The XRD analysis of the silicate reaction products showed the presence of zeolites at B/C ratios of 1.0 and higher. The amorphous character and low surface area of the B/C=5 silicate reaction indicated the formation of a new phase.

Figure 7:
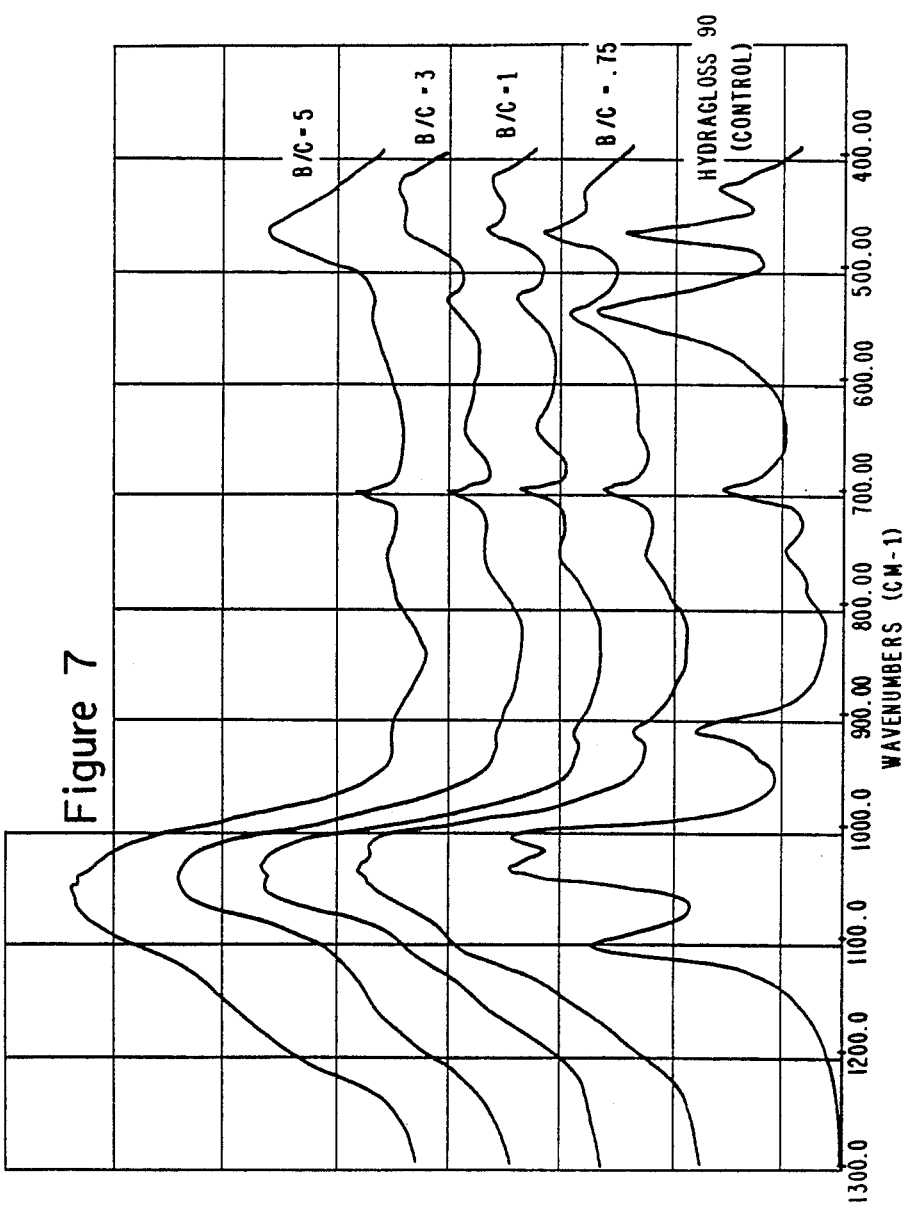
FIG. 7 Shows the comparison of the FT-IR scans of the SAMS compositions of Example Nine prepared from Hydragloss 90 and 2.5 mole ratio sodium silicate at B/C ratios of 0.75 to 5.0

FIG. 7 compares the spectra of the silicate reaction products in Table XXIII, The spectra show the presence of SAMS but also show the increase in zeolite formation at the higher B/C ratios as the Si—O stretching peak (1200-950 wavenumber) becomes sharper and the peaks typical of kaolin located between 800 and 400 wavenumbers disappear.

Figure 8:
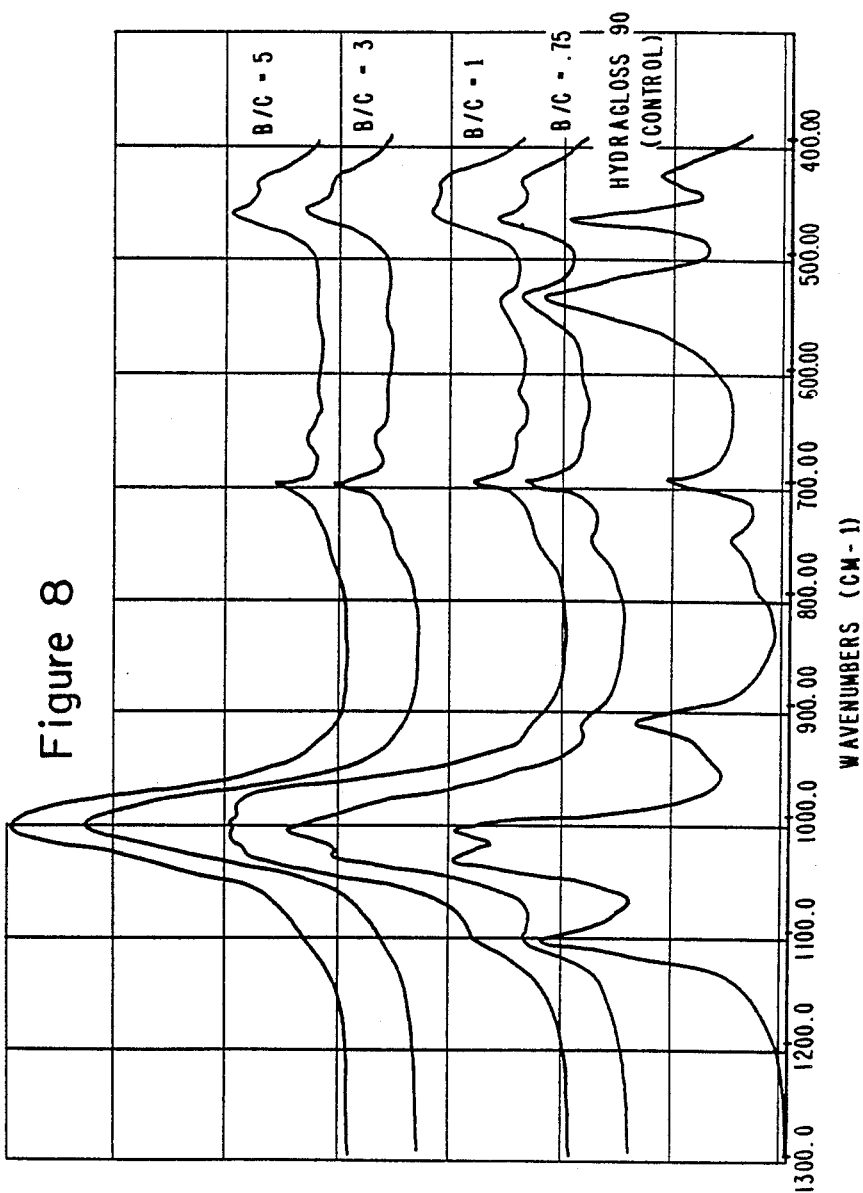
FIG. 8 Shows the comparison of the FT-IR scans of the SAMS compositions of Example Nine prepared by the reaction of Hydragloss 90 and sodium hydroxide at B/C ratios of 0.75 to 5.0
Figure 9:
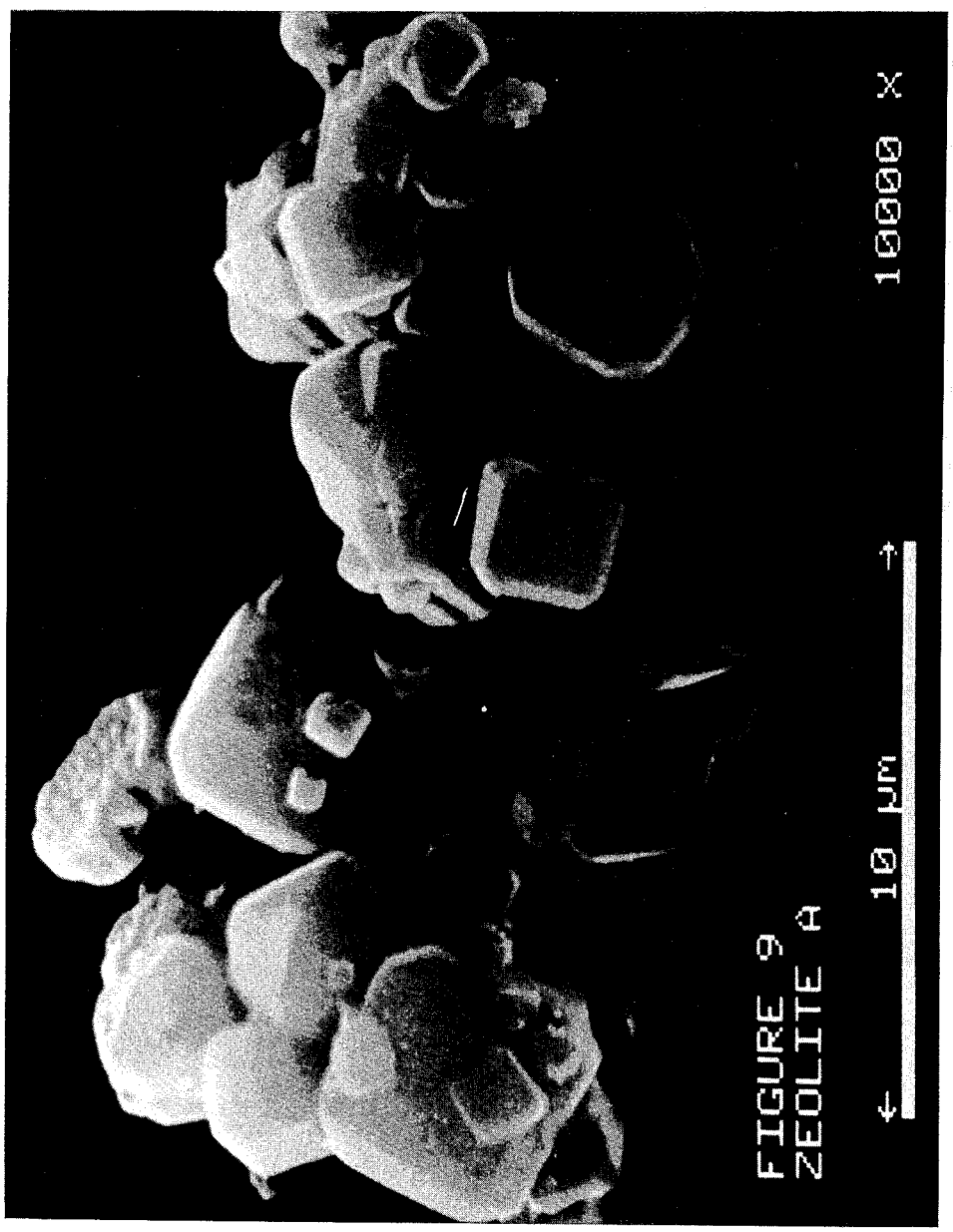
FIG. 9 Shows the scanning electron microscope (SEM) photograph of Zeolite A
Figure 10:
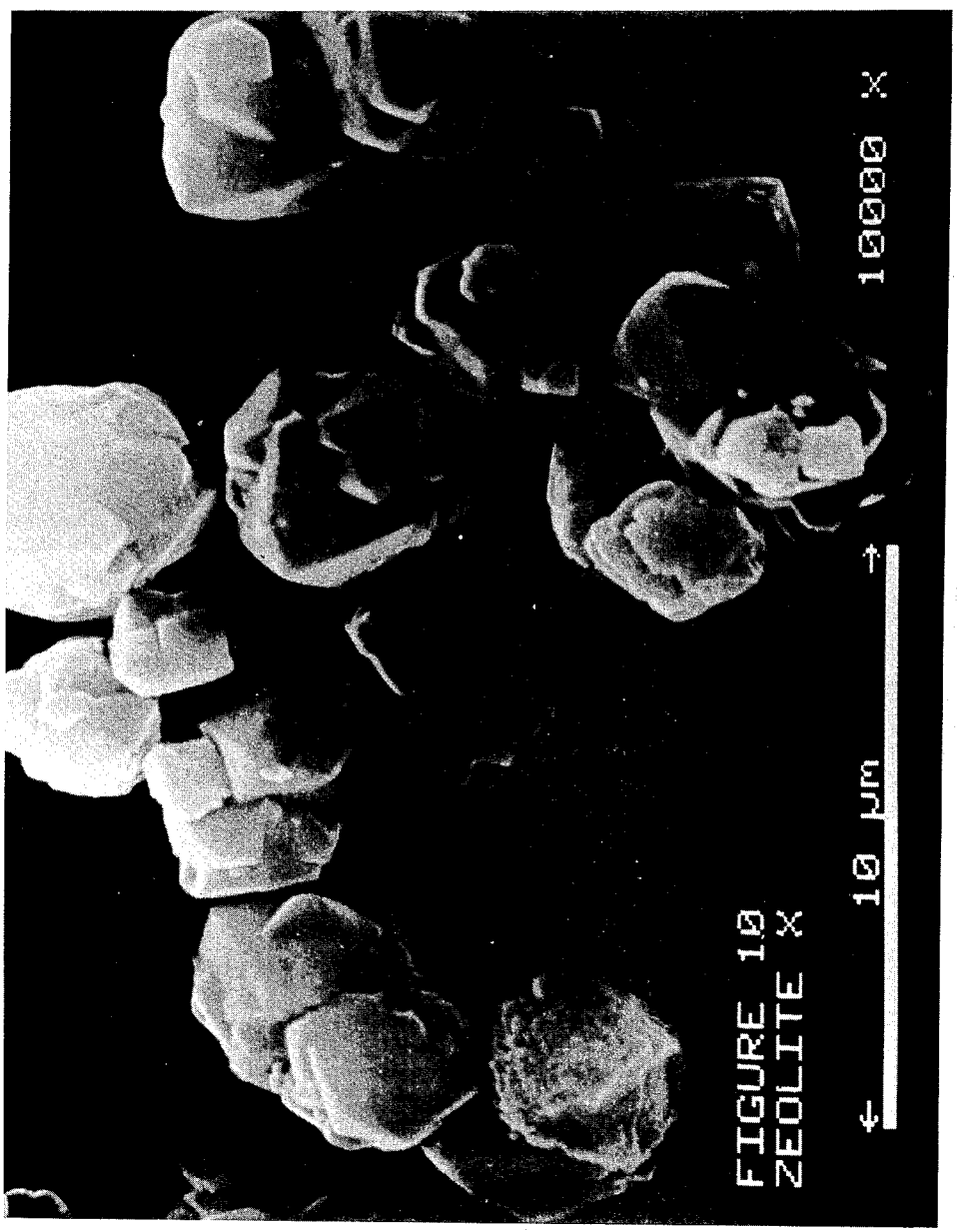
FIG. 10 Shows the SEM photograph of zeolite X
Figure 11:
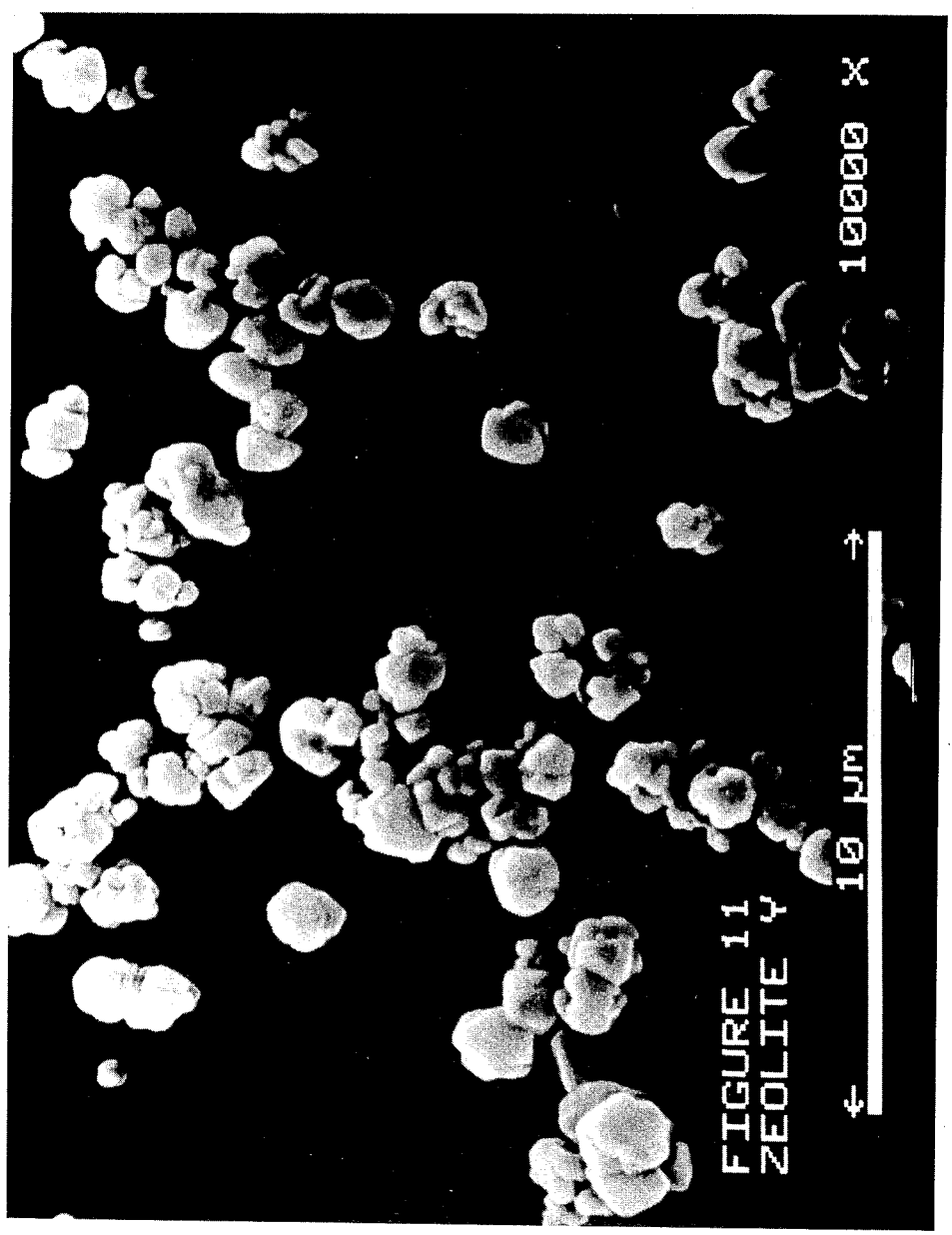
FIG. 11 Should the SEM photograph of zeolite Y
Figure 12:
FIG. 12 Shows the SEM photograph of analcime
Figure 13:
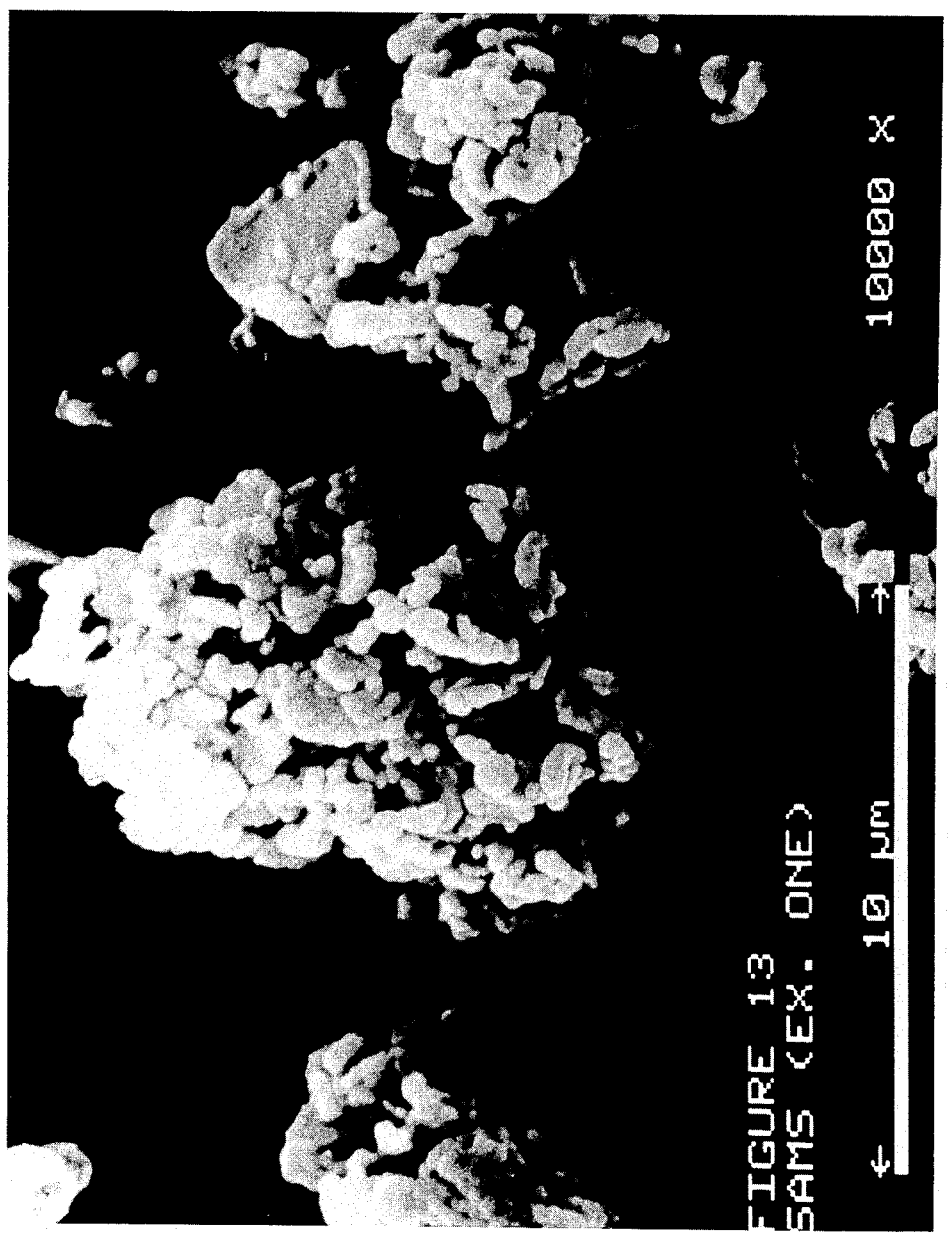
FIG. 13 Shows the SEM photograph of the SAMS composition of Example One
Figure 14:
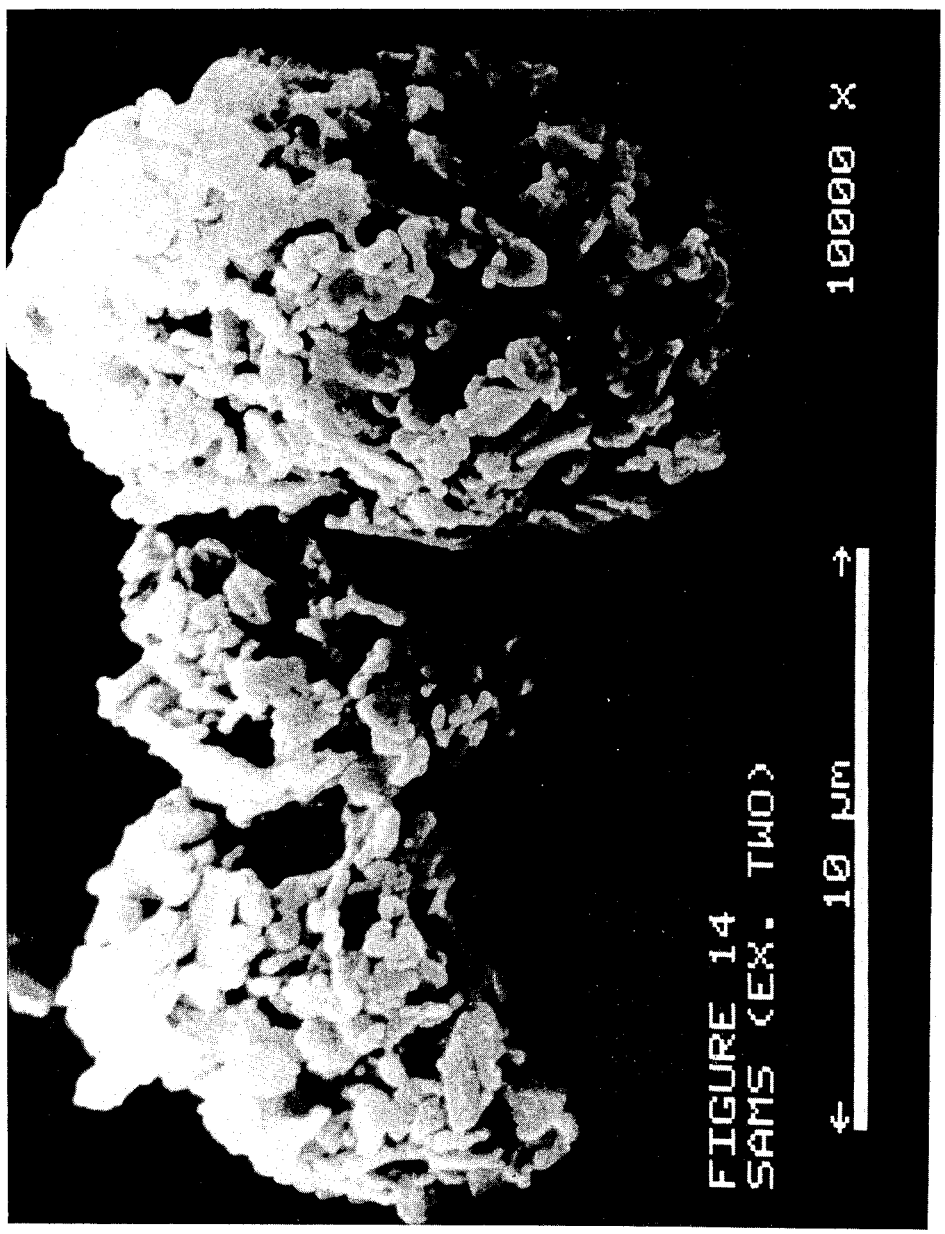
FIG. 14 Shows the SEM photograph of the SAMS composition of Example Two
Figure 15:
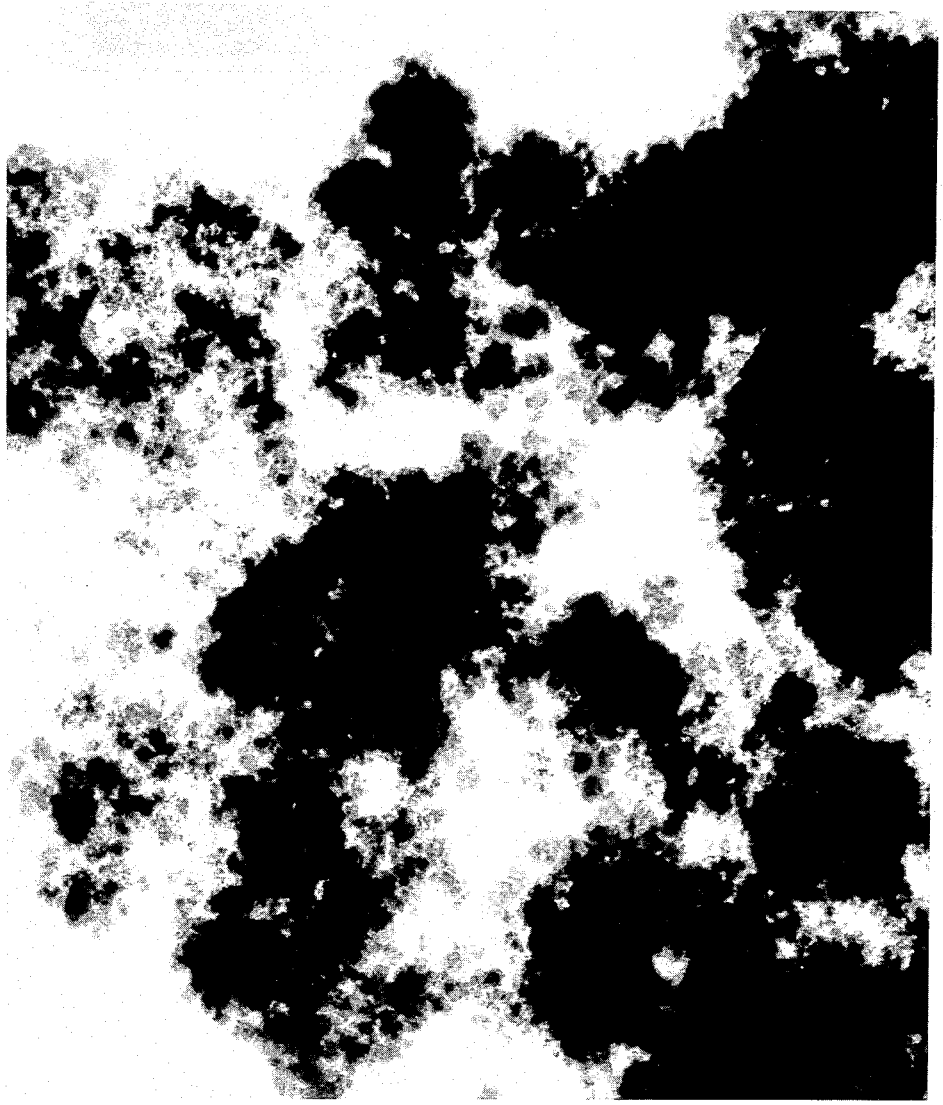
FIG. 15 Shows the TEM photograph of prior art amorphous sodium alumino-silicate, Zeolex 23
Figure 16:
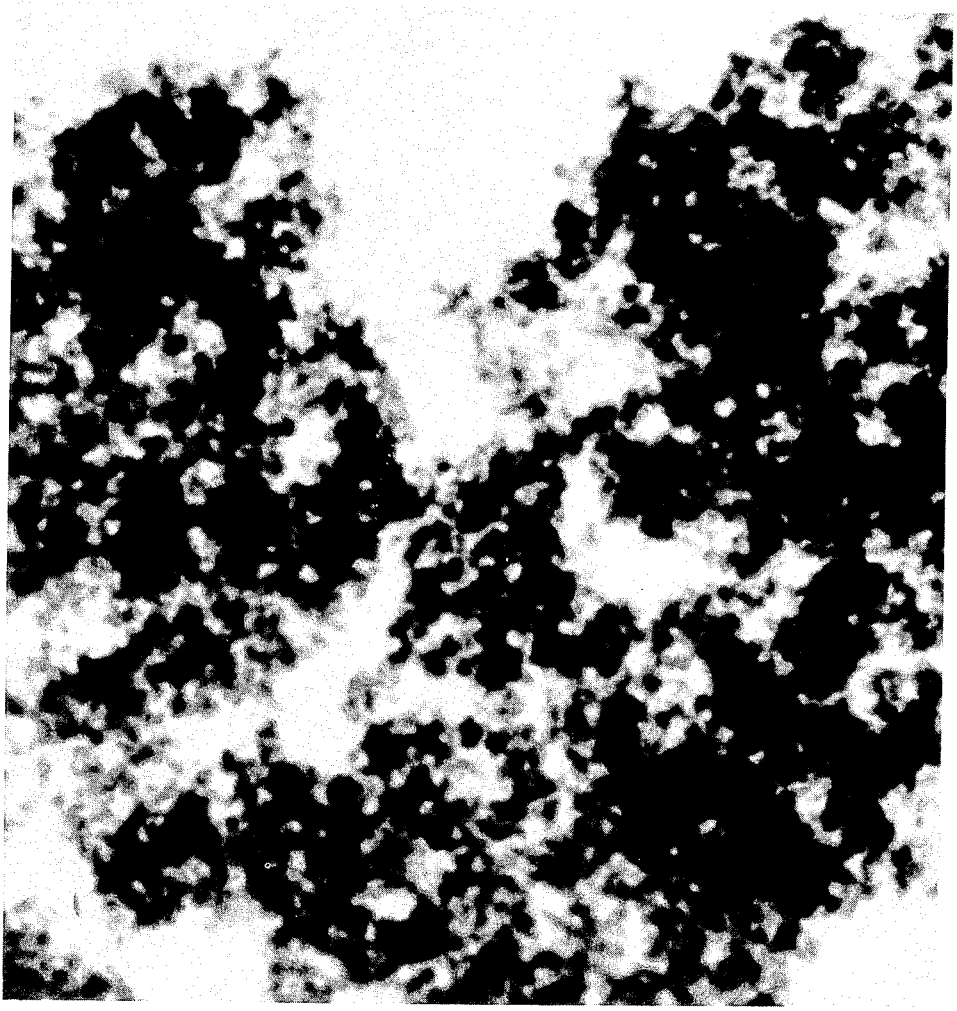
FIG. 16 Shows the TEM photograph of prior art amorphous synthetic silica, Hi-Sil 233
Figure 17:
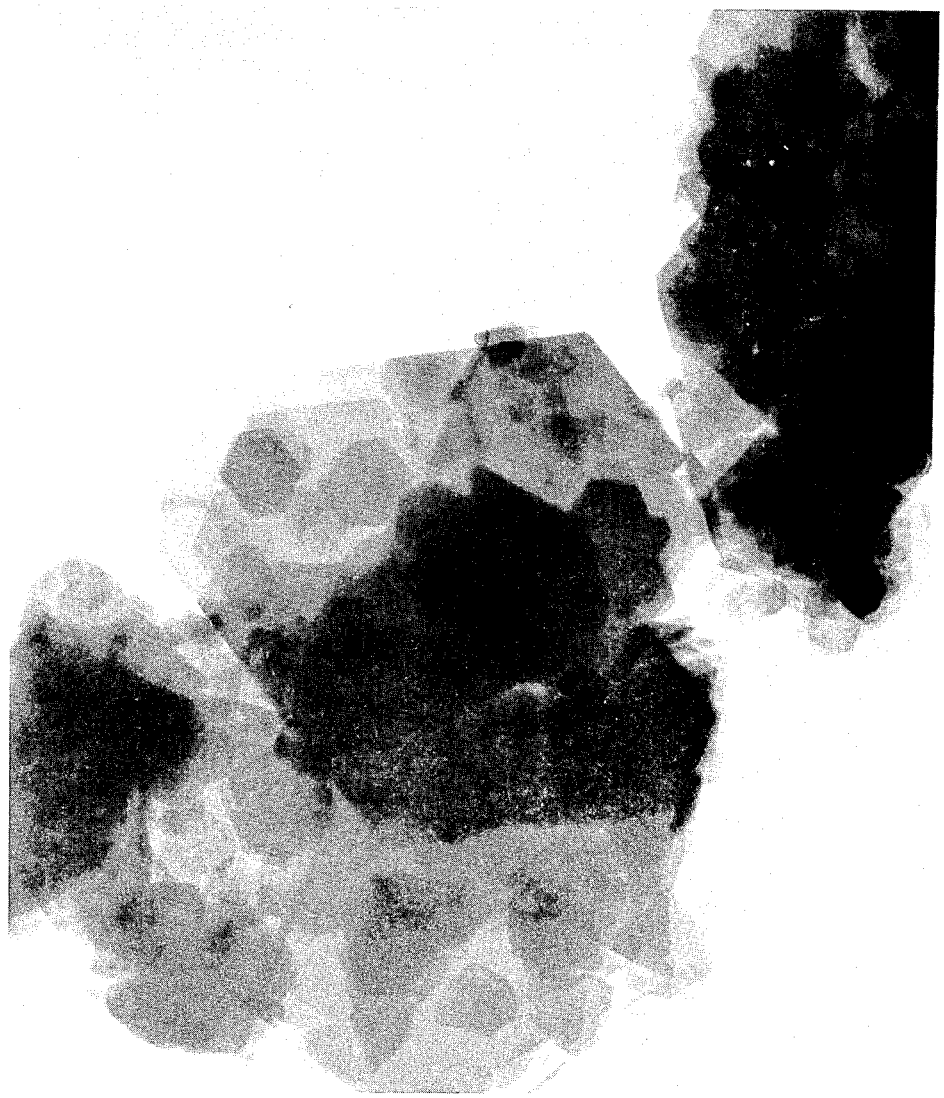
FIG. 17 Shows the TEM photograph of prior art calcined clay, Hycal
Figure 18:
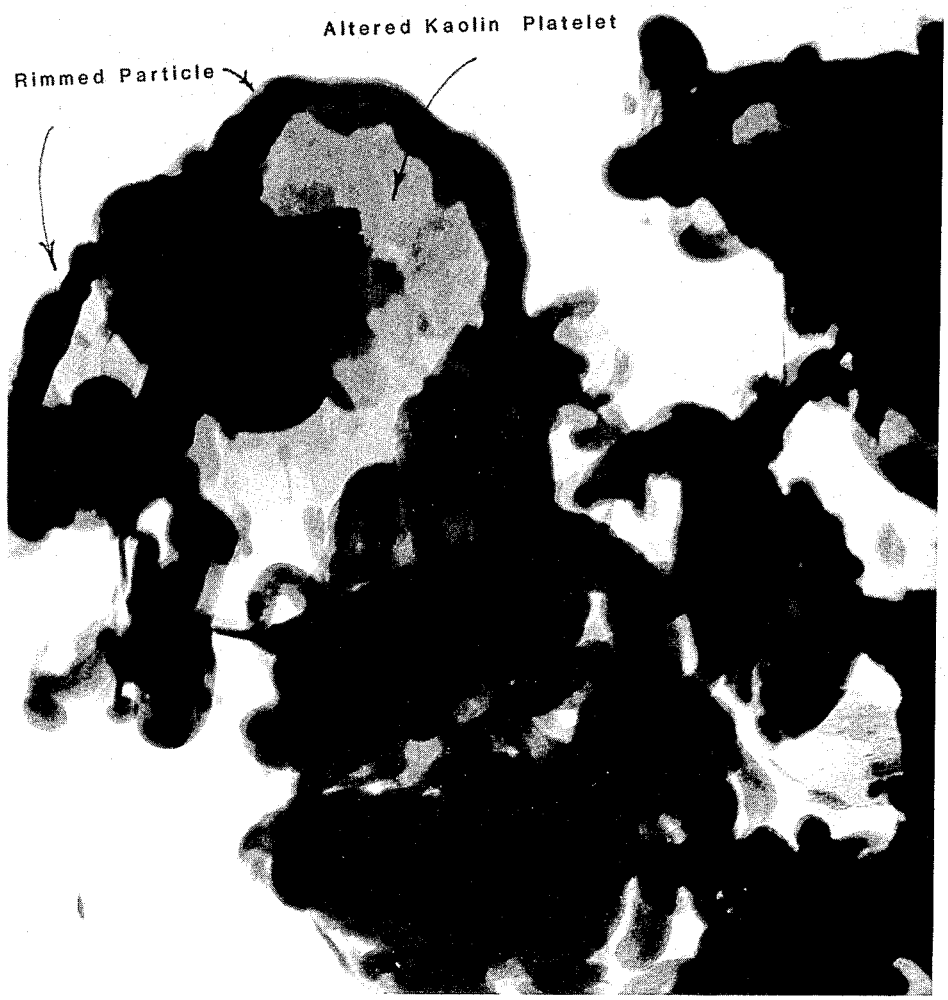
FIG. 18 Shows the TEM photograph of the SAMS composition of the present invention derived from Omnifil east Georgia clay at a B/C ratio of 0.75 (Example One)
Figure 19:
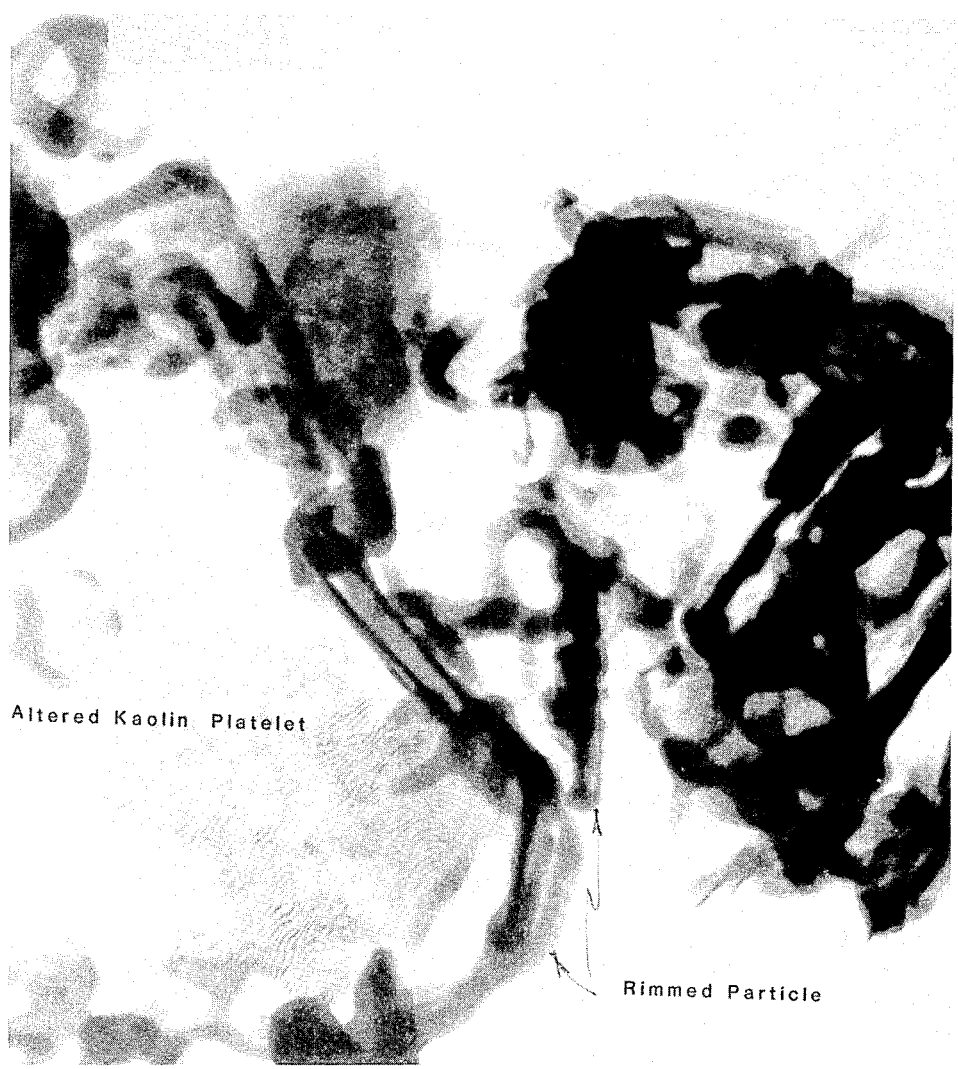
FIG. 19 Shows the TEM photograph of SAMS composition of Example One
Figure 20:
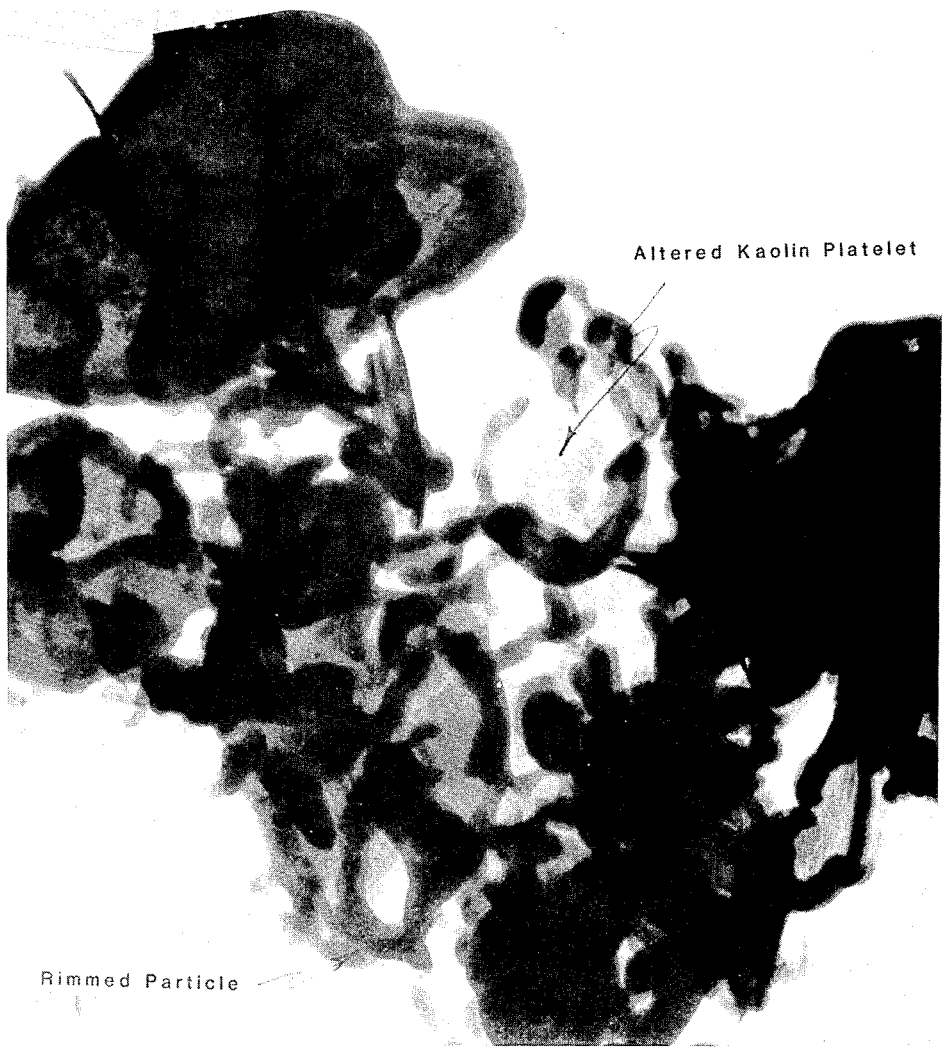
FIG. 20 Shows the TEM photograph of the SAMS composition of the present invention derived from Hydragloss 90 east Georgia clay at a B/C ratio of 0.5 (Example Two)
Figure 21:
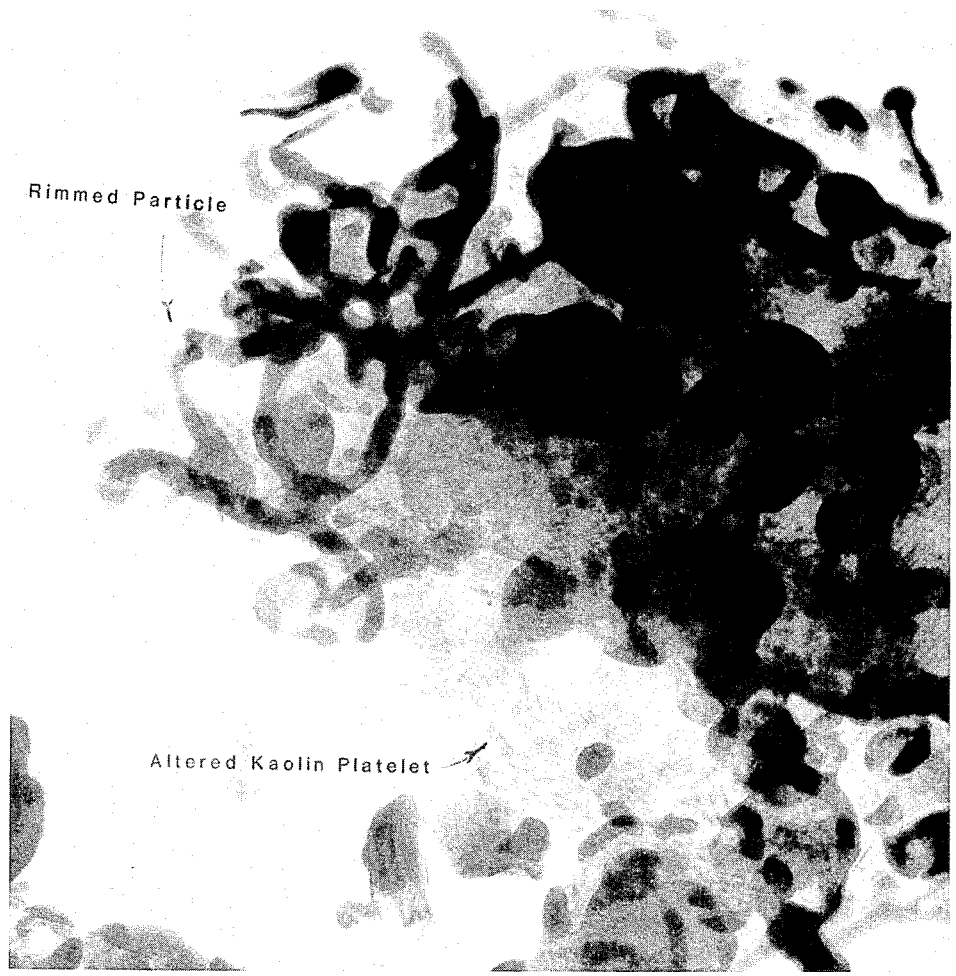
FIG. 21 Shows the TEM photograph of the SAMS composition of Example Two
Figure 22:
FIG. 22 Shows the TEM photograph of the SAMS composition of the present invention derived from Hydragloss 90 at a B/C ratio cf 1.0 (Example Five, Test No. 1)
Figure 23:
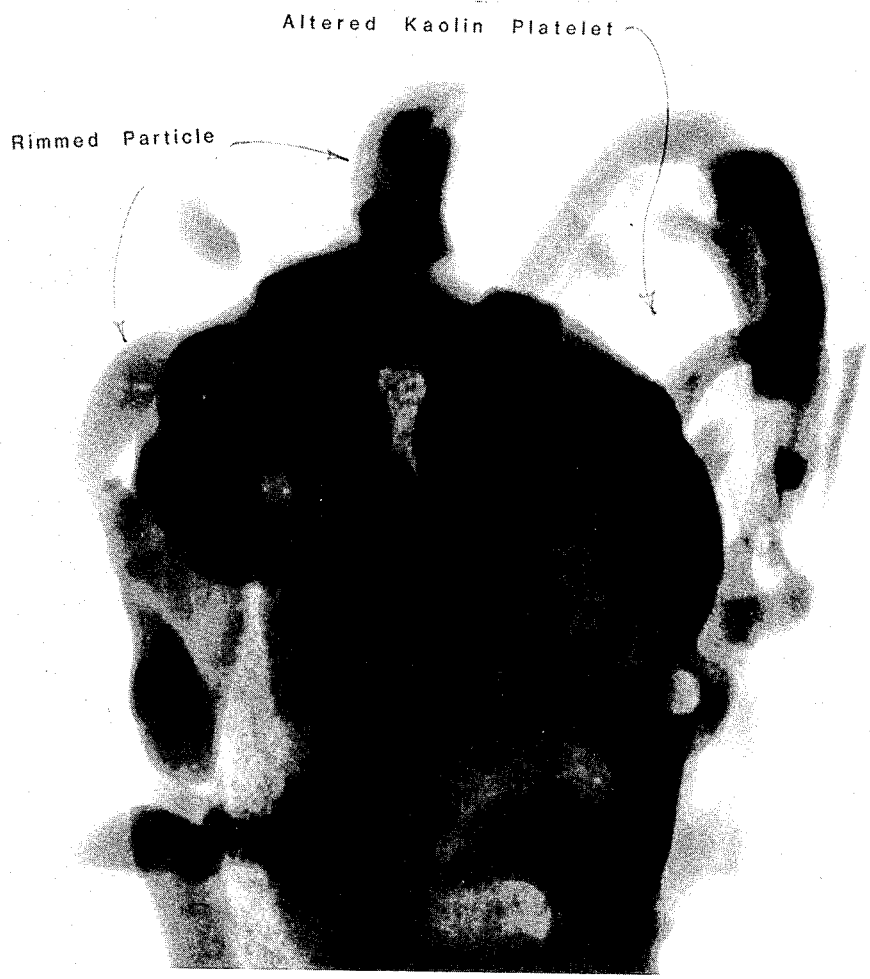
FIG. 23 Shows the TEM photograph of the SAMS composition of the present invention derived from Hydragloss 90 at a B/C ratio of 2.0 (Example Five, Test No. 2)

FIG. 8, likewise, compares the IR spectra of the sodium hydroxide reaction products. The Si—O stretching peak (1200-950 wavenumbers) is sharper, indicating the formation of a crystalline phase (hydroxy sodalite), and the loss of peaks in the 800-400 wavenumber region is observed at lower B/C ratios than for the silicate reaction.

EXAMPLE TEN
Nylon Plastic Compositions Containing SAMS

Fillers are added to plastics to provide reinforcement or to act as an inexpensive diluent without resulting loss of physical properties. The SAMS product of Example 2 was evaluated as a reinforcing filler in amorphous Nylon 66 at loadings of 5, 10 and 20% respectively. The physical properties of these filled compositions were then compared to those of an unfiled Nylon plastic to assess the reinforcing potential of SAMS.

Evaluation results for SAMS as a filler in amorphous nylon are tabulized below:

values versus the unfilled control. Impact properties were also excellent even at a 20% loading of SAMS. HOwever, advantages in the above physical properties were not obtained at the expense of any tensile yield or flexural strength. It is remarkable that the conversion of an inexpensive clay into a SAMS results in such a unique functional filler for nylon.

EXAMPLE ELEVEN
Conduit Pipe Composition Containing SAMS

To further illustrate the plastic reinforcement properties of SAMS, the SAMS of Example One was evaluated as a filler in a conduit pipe composition which utilizes a high-density polyethylene base resin (Phillips C-568). In this particular application, the SAMS of Example One was surface modified with a standard, commercial-grade azido silane coupling agent (Hercules AZ-CUP MC) at a 0.75% treatment level. The modified SAMS was then incorporated into the HDPE resin at a 25% loading level. The silane was added as in known clay technology by adding the azido silane in its pure form in up to 10% liquid involving dilution of the silane with methylene chloride or methanol followed to low shear solid-liquid mixing with the SAMS using a device such as a Sigma Blade Mixer. The physical properties of the SAMS/HDPE composite were then compared to those of an unfilled HDPE control. Intergral Corporation's (of Dallas, Texas) criteria for their conduit compounds include good processiblity, high tensile and stiffness properties and a minimum Izod Impact of 2.7 ft-lbs/in. Test results 1 ⅝ inch O. D. pipe produced from each composition are tabulized below.

TABLE XXIV
Nylon Reinforcing Properties of SAMS

| | Nylon Control (unfilled) | SAMS from Example 2 @ | | |
|---|---|---|---|---|
| | | 5% | 10% | 20% |
| Tensile Modulus, psi | 33880 | 54080 | 56850 | 103600 |
| Tensile Yield, psi | 4405 | 5057 | 5035 | 4214 |
| Elong. @ Peak, % | 371 | 324 | 297 | 114 |
| Flesural Modulus, psi | 47160 | 54670 | 64020 | 88590 |
| Flexural Strength, psi | 1933 | 2226 | 2491 | 3191 |
| Izod Impact, ft-lbs/in | 11.47 NB | 14.12 NB | 13.59 NB | 13.40 NB |
| Gardner Drop Wt., in/lbs | >160 | >160 | >160 | >160 |

It should be noted that the filled compositions show marked advantages in their tensile and flexural modulus

TABLE XXV

Reinforcing Properties of Modified SAMS* in a Conduit Pipe Composition

|  | HDPE Control (Phillips C-568) | HDPE with SAMS/AZ-CUP At 25% Loading |
|---|---|---|
| Tensile Modulus, psi | 157800 | 223500 |
| Tensile Yield, psi | 5407 | 5269 |
| Elong. @ Peak, % | 11.57 | 12.41 |
| Flexural Modulus, psi | 105600 | 224100 |
| Flexural Strength, psi | 3393 | 5015 |
| Izod Impact, ft-lbs/in | 13.66 | 15.72 |

*SAMS of Example One surface modified with Hercules axido silane (AZ - CUP MC) at 0.75% treatment level.

The test data clearly show that the SAMS/HDPE composition satisfies all the physical property criteria needed by Integral Corporation their conduit applications. Versus the unfilled HDPE control, one will note that modified SAMS addition provides notable improvements in the tensile and flexural modulus, flexural strength and izod impact properties. It is therefore obvious that SAMS serves as a highly functional filler in this plastic system.

EXAMPLE TWELVE

In accordance with the teachings of this invention, SAMS products were evaluated as reinforcing fillers for high-density polyethylene at a 25% loading. The SAMS products for this filler application were prepared from a coarse particle size, Middle Georgia delaminated clay (i.e., Hydraprint) in combination with a 3.3 mole ratio sodium silicate used at B/C ratios of 0.25, 0.50 and 0.75 respectively in accordance with the procedure of Example 8. SAMS products were produced from the above batch compositions by reaction at 120 psig for one hour at 10% solids. The agglomerate products were in the form of platelets. The reinforcement properties of these platey SAMS in HDPE were compared to those of hydrous clays. The results are set forth in the table below.

The test data clearly indicates that platey SAMS products, when used as fillers for HDPE, provide physical properties essentially equivalent to those provided by hydrous clays, except with respect to Izod Impact which was improved. The platey SAMS provided notable advantages in Izod Impact, particularly as their B/C ratio increased from 0.25 to 0.75. It is truly unexpected that the conversion of a delaminated clay into a platey SAMS product of high B/C should produce a unique functional filler for HDPE. An increase in impact strength from approximately 5 up to 12 ft-lbs/in is considered very significant.

EXAMPLE THIRTEEN

Platey SAMS products of B/C ratios of 0.25, 0.50 and 0.75, respectively, prepared as in Example Twelve, were evaluated as coating pigments for paper that was used in a printing application by the rotogravure method. All pigment coatings were applied to the paper substrate at a coat weight of 5.0 #/R using a Keegan laboratory blade coater. Following supercalendering, coated sheets were tested for sheet smoothness and for various optical properties (including brightness, opacity and printed gloss) in accordance with standard TAPPI test methods. Test coating compositions containing platey SAMS were prepared by simply replacing 5% of the standard, commercial-grade of delaminated clay (Hydraprint) with the desired SAMS product. Coating compositions containing 100% Hydraprint, 90% Hydraprint/10% calcined clay (Hycal) for their pigment portions were also prepared and evaluated as comparative controls. The rotogravure printing results are tabulized below.

TABLE XXVII

Sheet Properties for SAMS Paper Coating Compositions* (Rotogravure Printing)

|  | 100% HP-Clay | 90% HP-Clay + 10% Calcined Clay | 95% HP-Clay + 5% Platey SAMS Product | | |
|---|---|---|---|---|---|
|  |  |  | SAMS of 0.25 B/C | SAMS of 0.50 B/C | SAMS of 0.75 B/C |
| Brightness, % | 70.0 | 72.6 | 71.1 | 70.7 | 70.6 |
| Opacity, % | 85.2 | 86.8 | 86.1 | 85.7 | 85.9 |
| Printed Gloss, % | 60.8 | 56.1 | 59.9 | 56.7 | 57.1 |
| Missing Dots/Sheet** | 48 | 40 | 27 | 28 | 24 |

*Coating Parameters were as follows:
Base Stock = 24 #/R St. Regis Offset (wire side)
Application = Keegan Trailing Blade Coater
Coat Weight = 5.0 #/R
Calender Conditions = Supercalendered using 800 PLI at 150° F. and 2 Nips
**Diamond National Smoothness Test The observed sheet properties indicate that the replacement of only 5% delaminated clay with platey SAMS results in several notable performance improvements. Versus a straight delaminated clay composition, 5% of a platey SAMS significantly improved brightness, opacity and sheet smoothness. Although platey

TABLE XXVI

Reinforcing Properties of SAMS in Allied HDPE 7-731, 25% Loadings

|  | HDPE Control | Filled HDPE Compositions at 25% Filler Loading | | | |
|---|---|---|---|---|---|
|  |  | HP-Clay | "Platelet" SAMS Products | | |
|  |  |  | 0.25 B/C | 0.50 B/C | 0.75 B/C |
| Tensile Modulus, psi | 165500 | 312500 | 314400 | 295400 | 289700 |
| Tensile @ Yield, psi | 4359 | 4748 | 4762 | 4921 | 4969 |
| Elong. @ Peak, % | 11.2 | 7.6 | 6.8 | 7.6 | 8.1 |
| Flexural-Modulus, psi | 144000 | 303800 | 303500 | 289700 | 279300 |
| Flexural-Strength, psi | 4097 | 5929 | 6048 | 6014 | 5890 |
| Izon Impact, ft-lbs/in | 15.5 | 5.9 | 7.2 | 8.5 | 12.1 |
| Gardner Drop Wt., in/lbs | >160 | 131 | 160 | >160 | >160 |

SAMS at 5% replacement did not provide quite the level of sheet brightness and opacity provided by the 10% calcined clay, the printed gloss and sheet smoothness properties provided by platey SAMS were far superior. Consequently, in those printing applications where printed gloss and sheet smoothness are of utmost importance, platey SAMS will out perform calcined clay used at double the concentration level. The above test data also clearly indicate that platey SAMS products of low B/C ratio (i.e., about 0.25) are preferred coating pigments on the basis of their overall performance properties.

Figure 40:
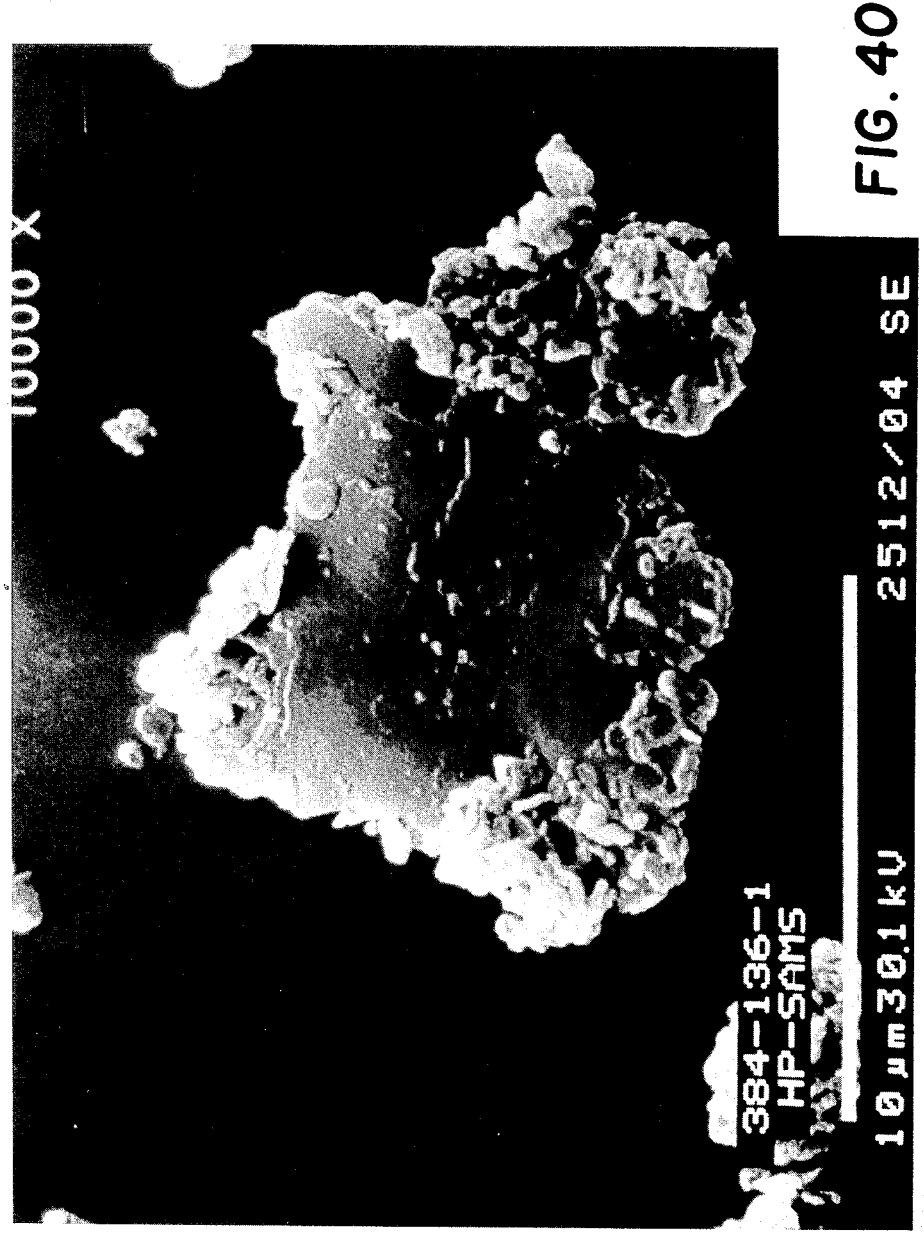
FIG. 40 shows the SEM photograph of plate SAMS composition derived from Hydraprint clay at a B/C ratio of 0.25 (Example Eleven)
Figure 41:
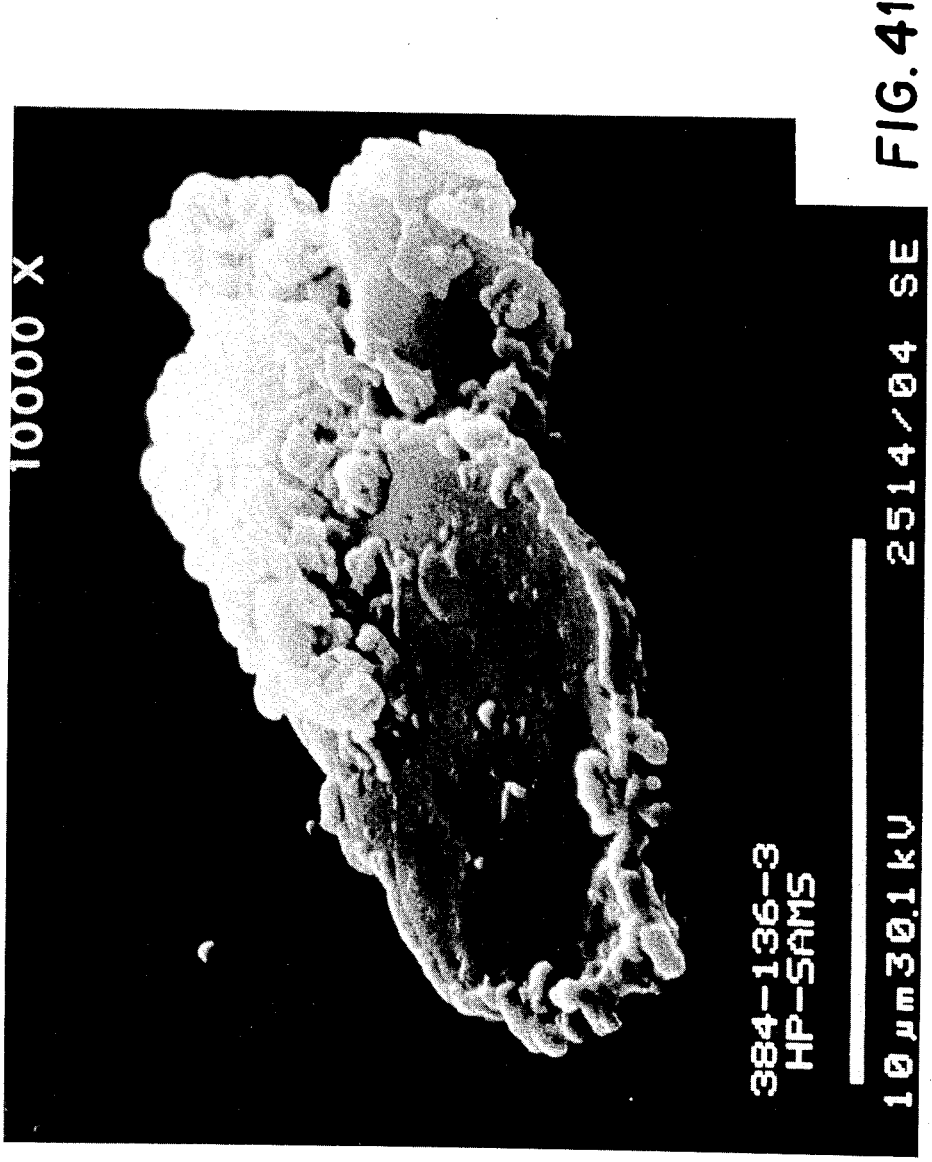
FIG. 41 shows the SEM photograph of plate SAMS composition derived from Hydraprint clay at a B/C ratio of 0.75 (Example Thirteen)
Figure 42:
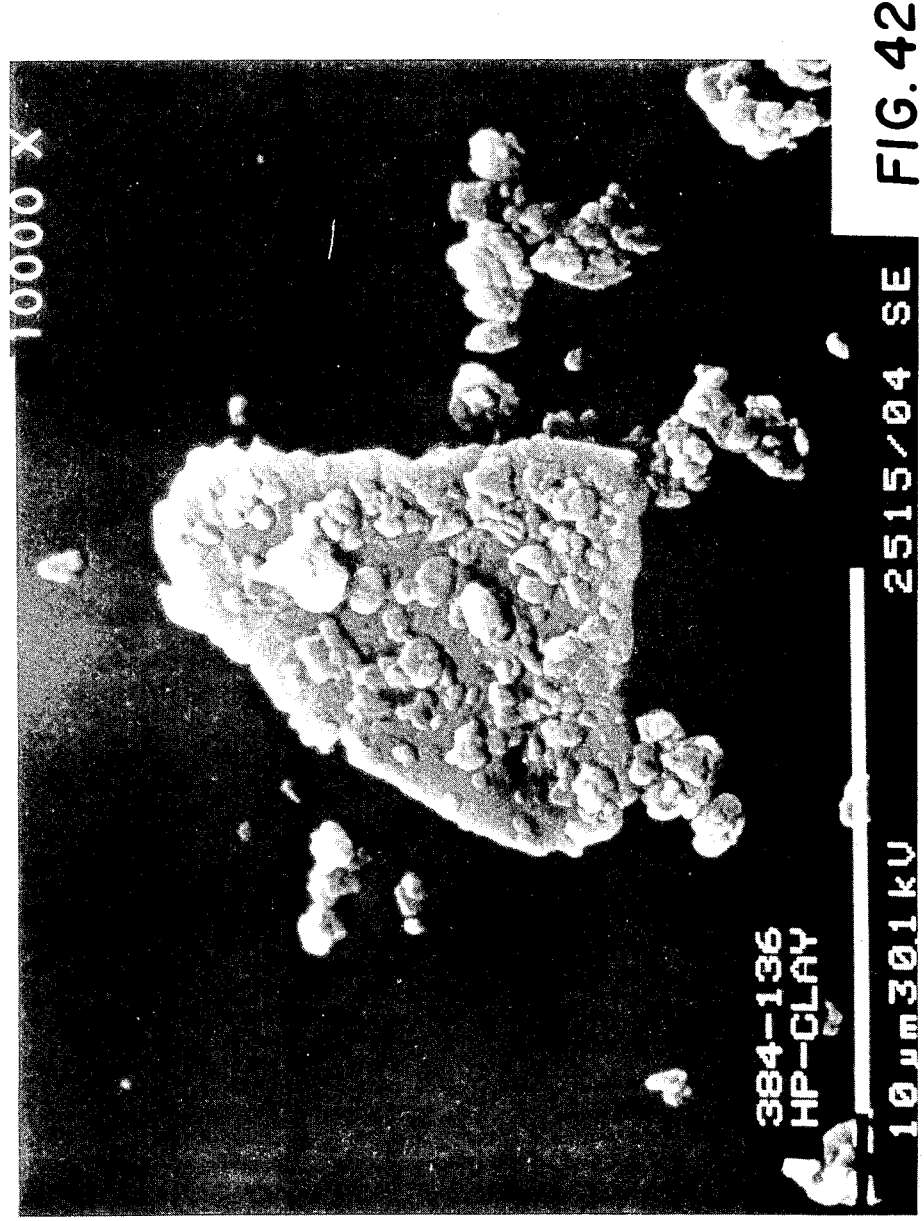
FIG. 42 shows the SEM photograph of Hydraprint clay used in the preparation of platey SAMS composition derived from Hydraprint clay at a B/C ratio of 0.75 (Example Thirteen)

The platey morphology of the sodium SAMS products prepared from delaminated clay (i.e. Hydraprint) is clearly seen in their SEM photographs presented in FIGS. 40–41. A comparative SEM photograph of the starting Hydraprint clay is shown in FIG. 42. The above photographs suggest that SAMS prepared from Hydraprint largely maintain the flat, platey structure inherent in the delaminated clay. The unique physical properties exhibited by such platey SAMS are therefore a consequence of the observed rim alteration material. The degree of rim alteration (i.e., the rim width) can be easily varied on platey SAMS depending on the specific synthesis conditions employed. Comparison of the platey SAMS prepared at B/C ratios of 0.25 and 0.75 (FIG. 40 versus FIG. 41) shows that increased rim alteration occurs at the higher B/C ratio. The physical properties of these two SAMS therefore differ significantly, as shown below:

TABLE XXVIII

Comparison of Properties for Two Platey SAMS of Different B/C

| | Platey SAMS Product* | |
|---|---|---|
| | SAMS of 0.25 B/C | SAMS of 0.75 B/C |
| Brightness, % | 89.7 | 90.9 |
| Oil Absorption, ml/100 g | 97 | 117 |
| BET Surface Area, m$^2$g | 15.7 | 9.3 |
| Na$_2$O Content, % | 3.75 | 6.93 |
| LOI (@ 1000° C.), % | 11.45 | 8.97 |
| Kaolin Content (XRD), % | 55.2 | 18.1 |
| Rim Alteration | thin | thick |

*Platey SAMS prepared in accordance with reactions described in Example Twelve.

Platey SAMS are not as structured as agglomerates of SAMS of Examples One and Two. The apparent reluctance of large, delaminated clay platelets to agglomerate upon hydrothermal alteration further lends itself to platey SAMS formation. Given the flat, platey structure of SAMS prepared from Hydraprint, it is not surprising that these products impart excellent sheet smoothness and printed gloss when used as paper coating pigments.

EXAMPLE FOURTEEN

This example further illustrates the present invention with regard to the use of lithium silicates as an appropriate alkali metal silicate base for producing SAMS products. Reactions between a lithium silicate (Lithsil 4) and Hydragloss 90 clay were thereby conducted at 120 psig for 1.5 hours at 10% reaction solids using B/C ratios of 0.25, 0.50 and 0.75 respectively. Results from these lithium silicate/clay reactions are set forth in the table below.

TABLE XXVIV

SAMS Synthesis from Lithium Silicate

| | | Li - SAMS Products | | |
|---|---|---|---|---|
| Selected Properties | Hydragloss 90 (Clay Control) | 0.25 B/C | 0.50 B/C | 0.75 B/C |
| Oil Absorption, ml/100 g | 43 | 81 | 92 | 97 |
| BET Surface Area, m$^2$g | 22 | 28 | 22 | 25 |
| Brightness, % | 91.0 | 88.9 | 90.1 | 91.2 |
| Specific Gravity g/ml | 2.60 | 2.53 | 2.50 | 2.45 |
| LOI (@ 100° C.), % | 13.86 | 12.17 | 11.61 | 11.11 |
| Li$_2$O Content, % | 0.0 | 0.89 | 1.26 | 1.47 |

*The lithium silicate employed had a 4.8 SiO$_2$/Li$_2$O mole ratio composition (Lithsil 4 of Lithium Corporation)

The above data clearly shows that a lithium silicate can be used in the synthesis of unique SAMS compositions.

Examination of the lithium SAMS compositions by TEM and STEM/EDAX methods revealed that an alteration product was indeed produced as a consequence of the lithium silicate/clay reaction. The TEM photograph of the 0.75 B/C product (FIG. 43) clearly shows the presence of some dark, blobby masses or protuberances on the kaolinite platelets. Electron diffraction analysis indicates that these protuberances or blobby masses are totally amorphous, while the remaining platelet areas show the typical diffraction pattern for the remaining platelet show the typical diffraction pattern for kaolinite. Most importantly, one should note that the blobby masses or protuberances did not form exclusively on the clay platelet edges, but appear in a more or less random fashion about the platelets. Several pseudo-hexagonal clay platelets are still clearly evident in the TEM photograph which indicates great heterogeneity of reaction. Elemental mapping of the Si and Al content within a lithium SAMS material, by STEM/EDAX analysis, has indicated that the alteration product (i.e., the blobby masses) is much higher in silicon and deficient in aluminum relative to the unaltered kaolinite regions. Elemental mapping of lithium was not possible because its atomic weight is below the detection limit of the instrument.

SUMMARY

As suggested by the above examples, the materials of the present invention may be used as effective pigment (titanium dioxide) extenders in paint and paper applications, as functional fillers or reinforcing agents in plastics and elastomers, as a catalyst support and carrier in catalyst preparation, as a thixotrope, as a conditioning and free flow agent, and in defoamer compositions. Because of their low abrasion characteristics, the materials of the present invention may be used to fill Xerox and electrostatic copier papers. Products of the present invention can also be used in a variety of specialty applications and as an opacifier, a diazo paper filler, a flatting agent, in silicone rubbers and other applications.

In addition, the SAMS compositions, because of their unique physical and chemical properties, may be used in certain catalytic applications if they are first exchanged with hydrogen, ammonium or other suitable cation, i.e., either as a separate particle or intimately mixed with the components of a hydrocarbon conversion catalyst. Moreover, the wide variation one can achieve in surface area, pore volume, SiO$_2$/Al$_2$O$_3$ ratio, and ion exchange capacity (solution or gas phase) suggest their application for emission control catalysts and in metal scavenging, and in the clean-up of residue materials and/or resid-type feeds to fluid catalytic cracking units in particular.

In the preferred embodiment of the invention, x is an integer of 0.01 to 2.0, y is an integer of at least 2.0 and preferably 2.0 to 20.0 and z is an integer of 1.0 to 5.0.

The terms Hydraprint, Hydragloss, Huber 90C, Omnifil, Hydrasperse, Hycal, Zeolex 23, Hydrex, Zeolex, Zeolex 23P, Zeo, Zeosyl, Zeofree and Zeodent used herein are trademarks of the J. M. Huber Corporation. Hi—Sil is a registered trademark of PPG and Ansilex is a registered trademark of Engelhard Corporation.

Although a specific preferred embodiment of the present invention has been described in the detailed description above, the description is not intended to limit the invention to the particular forms or embodiments disclosed herein. The present disclosure is to be recognized as illustrative rather than restrictive. It will further be obvious to those skilled in the art that the invention is not so limited. The invention is declared to cover all changes and modifications of the specific examples of the invention herein disclosed for purposes of illustration, which do not constitute departures from the spirit and scope of the invention.

What is claimed is:

1. A rubber composition which contains a filler comprising an alkali metal alumino-silicate having a composition in terms of mole ratio of oxides as follows:

$$xM_2O:Al_2O_3:ySiO_2:zH_2O$$

wherein x is the number of moles of alkali metal oxide and is an integer of 0.01 to 2.0, M is an alkali metal, y is the number of moles of $SiO_2$ associated with the compositions and is an integer of 2.0 to 20.0, and z is the number of moles of bound water and is an integer of 1.0 to 5.0, wherein primary particles of said alkali metal alumino-silicate comprise a core of clay platelets having an integral adjacent area of essentially amorphous alkali metal silicate base-kaolin clay reaction product.

2. A rubber composition according to claim 1 wherein the rubber is a natural or synthetic rubber.

3. A rubber compositions according to claim 2 wherein the rubbers are selected from the group consisting of styrene-butadiene, butyl rubber, nitrile rubber, neoprene rubber, polybutadiene, polyisoprene, ethylene propylene, acrylic, fluorocarbon rubbers, polysulfide rubbers, silicone rubbers, mixtures of copolymers of these synthetic rubbers along or in combination with natural rubber.

4. A rubber composition according to claim 2 wherein the alkali metal alumino-silicate is present as a filler in admixture with carbon block.

5. A rubber composition according to claim 1 wherein the alkali metal alumino silicate has the morphology of the integral rimmed particles as depicted in TEM FIGS. 18-23.

6. A rubber which contains a filler which comprises an alkali metal alumino-silicate comprising a core of kaolin clay platelets which have been altered at their edges by reaction so as to be integral with one or more adjacent areas of essentially amorphous alkali metal silicate-base kaolin clay reaction product having a composition in terms of mole ratio of oxides as follows:

$$xM_2O:Al_2O_3:ySiO_2:zH_2O$$

where M is sodium or potassium, x is the number of moles of sodium oxide or potassium oxide and is an integer of 0.01 to 2.0, y is the number of moles of $SiO_2$ in the composition and is an integer greater than 2.0, and z is the number of moles of bound water and is an integer of 1.0 to 5.0; wherein the primary particles of said alkali metal alumino-silicate have attenuated kaolin peaks as compared to kaolin in x-ray diffraction patterns from the kaolin remnants in the compositions, and have the IR scan shown in FIGS. 3-6.

7. A rubber composition according to claim 1 wherein the alkali metal silicate is sodium silicate, and the silicate product has a rimmed structure comprising silica.

8. A rubber composition according to claim 1 wherein the alkali metal silicate is potassium silicate and the silicate product has a rimmed structure comprising silica and potassium.

9. A rubber composition according to claim 1 wherein the alkali metal silicate is lithium silicate and the silicate product comprises a platelet area with amorphous protuberances thereon.

10. A rubber composition according to claim 1 wherein the silicate composition also contains at least a trace of a zeolite composition.

11. A rubber composition according to claim 1 wherein the silicate composition has an oil absorption value having a range between about 40 to 220 ml/100g, and a surface area of about 2 to 300 m²/g.

12. A rubber composition according to claim 1 wherein the silicate compositions have an oil absorption range of between 80 to 160 ml/100g and a surface area range between 10 to 30 m²/g.

* * * * *

UNITED STATES PATENT AND TRADEMARK OFFICE
CERTIFICATE OF CORRECTION

PATENT NO. : 4,968,728      Page 1 of 2

DATED : November 6, 1990

INVENTOR(S) : Satish K. WASON

It is certified that error appears in the above-identified patent and that said Letters Patent is hereby corrected as shown below:

IN THE ABSTRACT:

Line 9, delete "an integer";
    Line 12, delete "an integer ranging";

Column 7, line 62, delete "an integer with";
        Line 63, delete "an integer with";
        Line 63, delete "an" (second occurrence);
        Line 64, delete "integer".

Column 43, line 3, delete "an";
        Line 4, delete "integer of";
        Line 4, delete "an integer of";
        Line 5, delete "an integer of".

UNITED STATES PATENT AND TRADEMARK OFFICE
CERTIFICATE OF CORRECTION

PATENT NO. : 4,968,728

DATED : November 6, 1990

INVENTOR(S) : Satish K. Wason

It is certified that error appears in the above-identified patent and that said Letters Patent is hereby corrected as shown below:

<u>IN THE CLAIMS</u>:

Column 43, line 33, delete "an integer of";
    Line 35, delete "an integer of";
    Line 36, delete "an integer of".

Column 44, line 19, delete "an";
    Line 20, delete "integer of";
    Line 21, delete "an integer";
    Line 22, delete "an";
    Line 23, delete "integer of".

Signed and Sealed this

Twenty-fourth Day of November, 1992

Attest:

DOUGLAS B. COMER

*Attesting Officer*    *Acting Commissioner of Patents and Trademarks*